(12) United States Patent
Takeda et al.

(10) Patent No.: US 11,408,045 B2
(45) Date of Patent: *Aug. 9, 2022

(54) STEEL SHEET

(71) Applicant: NIPPON STEEL CORPORATION, Tokyo (JP)

(72) Inventors: Kengo Takeda, Tokyo (JP); Riki Okamoto, Tokyo (JP); Kazuo Hikida, Tokyo (JP); Katsuya Nakano, Tokyo (JP); Yuya Suzuki, Tokyo (JP); Genki Abukawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 30 days.

This patent is subject to a terminal disclaimer.

(21) Appl. No.: 16/487,009

(22) PCT Filed: Feb. 20, 2018

(86) PCT No.: PCT/JP2018/006023
§ 371 (c)(1),
(2) Date: Aug. 19, 2019

(87) PCT Pub. No.: WO2018/151318
PCT Pub. Date: Aug. 23, 2018

(65) Prior Publication Data
US 2020/0232058 A1    Jul. 23, 2020

(30) Foreign Application Priority Data
Feb. 20, 2017 (JP) .............................. JP2017-029319

(51) Int. Cl.
*B32B 15/01*    (2006.01)
*C21D 6/00*    (2006.01)
(Continued)

(52) U.S. Cl.
CPC .............. *C21D 9/46* (2013.01); *B32B 15/011* (2013.01); *C21D 6/004* (2013.01); *C21D 6/005* (2013.01);
(Continued)

(58) Field of Classification Search
CPC .......... C21D 9/46; C21D 6/004; C21D 6/005; C21D 6/008; C21D 8/0205;
(Continued)

(56) References Cited

U.S. PATENT DOCUMENTS 3,694,174 A    9/1972  Briggs
10,858,719 B2 *  12/2020  Takeda ................ C21D 8/0236
(Continued)

FOREIGN PATENT DOCUMENTS

CN       105543649 A    5/2016
DE   102014114365 A1 *  4/2016  ............. C22C 38/38
(Continued)

OTHER PUBLICATIONS

International Search Report for PCT/JP2018/006023 dated May 1, 2018.
(Continued)

*Primary Examiner* — Daniel J. Schleis
*Assistant Examiner* — Kevin Ct Li
(74) *Attorney, Agent, or Firm* — Birch, Stewart, Kolasch & Birch, LLP

(57) ABSTRACT

There is provided a steel sheet including an inner layer and a hard layer formed on one or both surfaces of the inner layer, wherein each content of C and Mn in the hard layer is more than each content of C and Mn in the inner layer, a thickness of the hard layer is 20 μm or more and a total of the thickness of the hard layer is ⅖ or less of the entire sheet thickness, an average micro-Vickers hardness of the hard layer is 400 HV or more and less than 800 HV, an average
(Continued)

micro-Vickers hardness of the inner layer is 350 HV or more and is 50 HV or more smaller than a hardness of the hard layer, and a screw dislocation density of the inner layer is $2.0 \times 10^{13}$ m/m$^3$ or more.

2 Claims, 3 Drawing Sheets

(51) Int. Cl.

| | | |
|---|---|---|
| C21D 9/46 | (2006.01) | |
| C22C 38/00 | (2006.01) | |
| C22C 38/06 | (2006.01) | |
| C22C 38/34 | (2006.01) | |
| C22C 38/42 | (2006.01) | |
| C22C 38/46 | (2006.01) | |
| C22C 38/48 | (2006.01) | |
| C22C 38/50 | (2006.01) | |
| C22C 38/54 | (2006.01) | |
| C22C 38/58 | (2006.01) | |
| C22C 38/60 | (2006.01) | |
| C21D 8/02 | (2006.01) | |
| C22C 38/44 | (2006.01) | |

(52) U.S. Cl.
CPC ............ *C21D 6/008* (2013.01); *C21D 8/0205* (2013.01); *C22C 38/001* (2013.01); *C22C 38/002* (2013.01); *C22C 38/005* (2013.01); *C22C 38/008* (2013.01); *C22C 38/06* (2013.01); *C22C 38/34* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C22C 38/60* (2013.01); *C21D 2211/001* (2013.01); *C21D 2211/002* (2013.01); *C21D 2211/005* (2013.01); *C21D 2211/008* (2013.01); *C21D 2211/009* (2013.01)

(58) Field of Classification Search
CPC ........ C21D 2211/001; C21D 2211/002; C21D 2211/005; C21D 2211/008; C21D 2211/009; B32B 15/011; C22C 38/001
See application file for complete search history.

(56) References Cited

U.S. PATENT DOCUMENTS

| | | | |
|---|---|---|---|
| 2016/0312326 A1* | 10/2016 | Drillet | ............ C23C 2/06 |
| 2017/0297304 A1 | 10/2017 | Becker et al. | |

FOREIGN PATENT DOCUMENTS

| | | | | |
|---|---|---|---|---|
| EP | 0 698 670 A1 | 2/1996 | | |
| JP | 62-30041 B2 | 6/1987 | | |
| JP | 3-227233 A | 10/1991 | | |
| JP | 6-73494 A | 3/1994 | | |
| JP | 6-287686 A | 10/1994 | | |
| JP | 9-256045 A | 9/1997 | | |
| JP | 10-92395 A | 4/1998 | | |
| JP | 10-286681 A | 10/1998 | | |
| JP | 2000-129347 A | 5/2000 | | |
| JP | 2008-156729 A | 7/2008 | | |
| JP | 2010-242130 A | 10/2010 | | |
| JP | 2012-132077 A | 7/2012 | | |
| JP | 2013-198708 A | 10/2013 | | |
| WO | WO-2015041159 A1 * | 3/2015 | ............ C22C 38/20 | |
| WO | WO 2016/050417 A1 | 4/2016 | | |

OTHER PUBLICATIONS

Kumagai et al., "Microstructural Features of Cold-Rolled Carbon Steel Evaluated by X-ray Diffraction Line Profile Analysis and Their Correlation with Mechanical Properties", ISIJ International, 2014, vol. 54, No. 1, pp. 206-211.

Written Opinion of the International Searching Authority for PCT/JP2018/006023 (PCT/ISA/237) dated May 1, 2018.

* cited by examiner

STEEL SHEET

FIELD

The present invention relates to a steel sheet and a method for producing the same, more particularly relates to a high strength steel sheet excellent in bending resistance for auto parts and infrastructure members as main applications.

BACKGROUND

In undercarriage parts and framework parts of automobiles and columnar members etc. of ferrous metal structures, securing bending resistance is sought. The bending resistance of such parts and members changes mainly depending on the strength of the material and the thickness of the steel sheet used for the parts and members. In particular, the greater the strength and thickness, the larger the bending resistance that can be secured. Note that in recent years, in the field of automobiles and ferrous metal structures, parts and members have increasingly been made lighter in weight. Along with this, applications of steel sheet with small thicknesses have been increasing. Therefore, demand for steel sheet having a high bending resistance even if small in thickness has been rising.

Up until now, much art has been proposed for improving the bending resistance of steel parts and members (for example, see PTLs 1 to 5).

For example, PTL 1 discloses to design suitable shapes for spikes in baseball shoes which are provided with the same extent of or more bending stress resistance and torsional moment resistance compared with spikes formed of conventional steel materials having 1.4 to 2.0 mm thick, and which hold the grip on the ground surface by virtue of the spikes anchoring at the time of athlete workout while preventing plastic deformation of the substrate and the detachment between the root parts of the spikes and the hole parts.

Further, PTL 2 discloses steel excellent in pitting strength, bending fatigue strength, and torsional fatigue strength containing, by mass %, C: 0.10 to 0.35%, Si: 0.40 to 1.50%, Mn: 0.10 to 1.50%, P: 0.030% or less, S: 0.030% or less, Cr: 0.50 to 3.0%, Al: 0.020 to 0.200%, and N: 0.01 to 0.03%, having a balance of Fe and unavoidable impurities, having a content of sol. Al found from the value of the content (mass %) of Al minus 27/14 of the content (mass %) of N satisfying 0.020% or more, and suppressing incompletely hardened structures at the core part of the product after quenching and tempering.

Furthermore, PTL 3 discloses steel containing C: 0.50 to 0.70%, Si: 1.2 to 2.5%, Mn: 0.4 to 1.0%, P: 0.02% or less (not including 0%), S: 0.03% or less (not including 0%), Cr: 0.5 to 2%, Al: 0.10% or less (not including 0%), and N: 0.03% or less (not including 0%) and having a balance of Fe and unavoidable impurities. The steel disclosed in PTL 3 is characterized in that even with just quenching and tempering or carburized quenching and tempering, it can exhibit excellent bending fatigue resistance, bending resistance, and indentation resistance. It is steel for gear shaft optimum as a material for pinion shaft members and other shaft members and has a bending resistance necessary for a gear shaft obtained from such a steel material.

PTL 4 discloses the bending resistance of Zn—Al plated coated steel sheet excellent in unbending resistance in coated steel sheet comprising steel sheet on the surface of which a plated layer comprising Al: 50 to 60 mass % and a balance of substantially Zn and a coating film at a layer above that plated layer, wherein a cross-sectional hardness $H_M$ of the matrix (HV) and a cross-sectional hardness $H_P$ of the plated layer (HV) are adjusted to satisfy the formula (1) and formula (2), preferably to further satisfy the formula (3): $H_M > H_P$ ... (1), $H_P \geq 90$ ... (2), $H_M \leq 145$ ... (3)

PTL 5 discloses a method for producing a high strength part comprising using steel containing C: 0.05 to 0.5% (mass %, same below), Si: 3% or less (not including 0%), Mn: 2.5% or less (not including 0%), and Cr: 2.5 to 15% and treating it by a heat treatment process consisting of, immediately after carburizing, carbonitriding, or carburized nitriding or after cooling once to the $A_1$ transformation point or less, again $A_1$ heating to the transformation point to 1100° C. in temperature for decarburizing to thereby make the average particle size of the carbides at the cross-section from the surface to within 0.1 mm a size of 5 μm or less.

PTL 6 discloses hot dip galvanized steel sheet provided with steel A containing C: 0.05 to 0.2 mass % and Mn: 0.5 to 3% positioned at the top layer and bottom layer and steel B containing C: 0.01 mass % or less and Mn: 0.5 mass % or less positioned between the top layer and bottom layer. The hot dip galvanized steel sheet disclosed in PTL 6 is characterized by securing indentation resistance and surface strain resistance and workability and by securing corrosion resistance by hot dip galvanization since being provided with the steel B of the soft inner layer and the high strength steel A arranged at the two sides of the inner layer.

PTL 7 discloses a method for producing a steel material for soft nitriding use comprising hot working steel containing, by wt %, C: 0.15 to 0.45% and Mn: 0.2 to 2.5%, then spheroidally annealing it to make the hardness Hv180 or less, then cold working it to make the hardness Hv250 or more. Furthermore, PTL 7 discloses that it is possible to produce a soft nitrided part having a surface hardness after soft nitriding of Hv600 or more and an effective hardened depth of 0.1 mm or more.

CITATION LIST

Patent Literature

[PTL 1] Japanese Unexamined Patent Publication No. 2013-198708

[PTL 2] Japanese Unexamined Patent Publication No. 2012-132077

[PTL 3] Japanese Unexamined Patent Publication No. 2010-242130

[PTL 4] Japanese Unexamined Patent Publication No. 2008-156729

[PTL 5] Japanese Unexamined Patent Publication No. 2000-129347

[PTL 6] Japanese Unexamined Patent Publication No. 6-287686

[PTL 7] Japanese Unexamined Patent Publication No. 9-256045

Nonpatent Literature

[NPL 1] Masayoshi KUMAGAI, et al., ISIJ International, Vol. 54 (2014), No. 1, PP. 206-201

SUMMARY

Technical Problem

Note that, each of the above-mentioned prior art is art specially modifying the shape of the part or reforming the top layer by heat treatment so as to improve the bending resistance. On the other hand, there are issues in application of these arts in cases where the shapes of the parts are difficult to change or cases where changes in the dimensions and shapes of the steel parts at the time of heat treatment are not allowed.

Further, none of the above-mentioned prior art sufficiently satisfy the demands on steel sheet having high bending resistance even when small in thickness. In conventional clad steel sheet, there is a tradeoff between the hardness of the top layer and the bending resistance. There is the technical problem that if raising the hardness of the top layer, the bending resistance deteriorates. The above prior art does not sufficiently solve such a technical issue and does not disclose clad steel sheet having a top layer having an average micro-Vickers hardness of 400 HV or more while being excellent in bending resistance.

Solution to Problem

The inventors engaged in intensive studies on a method for solving the above technical issue. As a result, they found that by forming on one or both surfaces of steel sheet a hard layer with an average micro-Vickers hardness of 400 HV or more and less than 800 HV and by controlling the average micro-Vickers hardness of the inner layer to 350 HV or more and to a value 50 HV or more smaller than the hardness of the hard layer and, furthermore, the screw dislocation density of the inner layer to $2.0 \times 10^{13}$ m/m$^3$ or more, the bending resistance is secured at a high level.

NPL 1 reports that by heat treating S45C carbon steel at 680° C. for 5 hours to remove stress and cold rolling the carbon steel after the heat treatment by 40%, the dislocation density increased to $7.0 \times 10^{13}$ m/m$^3$ to $2.0 \times 10^{15}$ m/m$^3$ and the yield strength, hardness, and tensile strength increased.

However, through various repeated research, the inventors found that even if simply individually changing the hot rolling conditions, annealing conditions, etc., production of the steel sheet satisfying the above-mentioned hardness and bending resistance is difficult, and they found that production of the steel sheet satisfying the above-mentioned hardness and bending resistance is only possible by optimizing the hot rolling and annealing steps etc. by a so-called integrated process, and thereby they completed the present invention.

The gist of the present invention is as follows:
(1) A steel sheet comprising an inner layer and a hard layer formed on one or both surfaces of the inner layer, the steel sheet, wherein
a content of C in the hard layer is more than a content of C in the inner layer, and a content of Mn in the hard layer is more than a content of Mn in the inner layer,
a thickness of the hard layer is 20 µm or more and a total of the thicknesses of hard layers is ⅖ or less of an entire sheet thickness,
an average micro-Vickers hardness of the hard layer is 400 HV or more and less than 800 HV,
an average micro-Vickers hardness of the inner layer is 350 HV or more and is 50 HV or more smaller than a hardness of the hard layer, and
a screw dislocation density of the inner layer is $2.0 \times 10^{13}$ m/m$^3$ or more.
(2) The steel sheet according to (1), wherein the hard layer and the inner layer comprises, by mass %,
C: 0.10 to 0.60%,
Si: 0.01 to 3.00%, and
Mn: 1.000 to 10.00%,
are restricted to
P: 0.0200% or less,
S: 0.0200% or less,
N: 0.0200% or less, and
O: 0.0200% or less, and
comprises a balance of Fe and impurities.
(3) The steel sheet according to (2), wherein at least one of the hard layer and the inner layer furthermore comprises, by mass %, one or more of
Al: 0.500% or less,
Cr: 2.000% or less,
Mo: 1.000% or less,
Ti: 0.500% or less,
B: 0.0100% or less,
Nb: 0.500% or less,
V: 0.500% or less,
Cu: 0.500% or less,
W: 0.100% or less,
Ta: 0.100% or less,
Ni: 0.500% or less,
Sn: 0.050% or less,
Sb: 0.050% or less,
As: 0.050% or less,
Mg: 0.0500% or less,
Ca: 0.050% or less,
Y: 0.050% or less,
Zr: 0.050% or less,
La: 0.050% or less, and
Ce: 0.050% or less.

Advantageous Effects of Invention

The steel sheet of the present invention is excellent in bending resistance regardless of an extremely high hardness hard layer being formed at a top layer. That is, according to the present invention, by forming a hard layer with an average micro-Vickers hardness of 400 HV or more and less than 800 HV on one or both surfaces of steel sheet and by controlling the average micro-Vickers hardness of the inner layer to 350 HV or more and a value 50 HV or more smaller than the hardness of the hard layer and, furthermore, the screw dislocation density of the inner layer to $2.0 \times 10^{13}$ m/m$^3$ or more, it is possible to provide steel sheet excellent in bending resistance and provide a method for producing the same.

DESCRIPTION OF EMBODIMENTS

Figure 1:
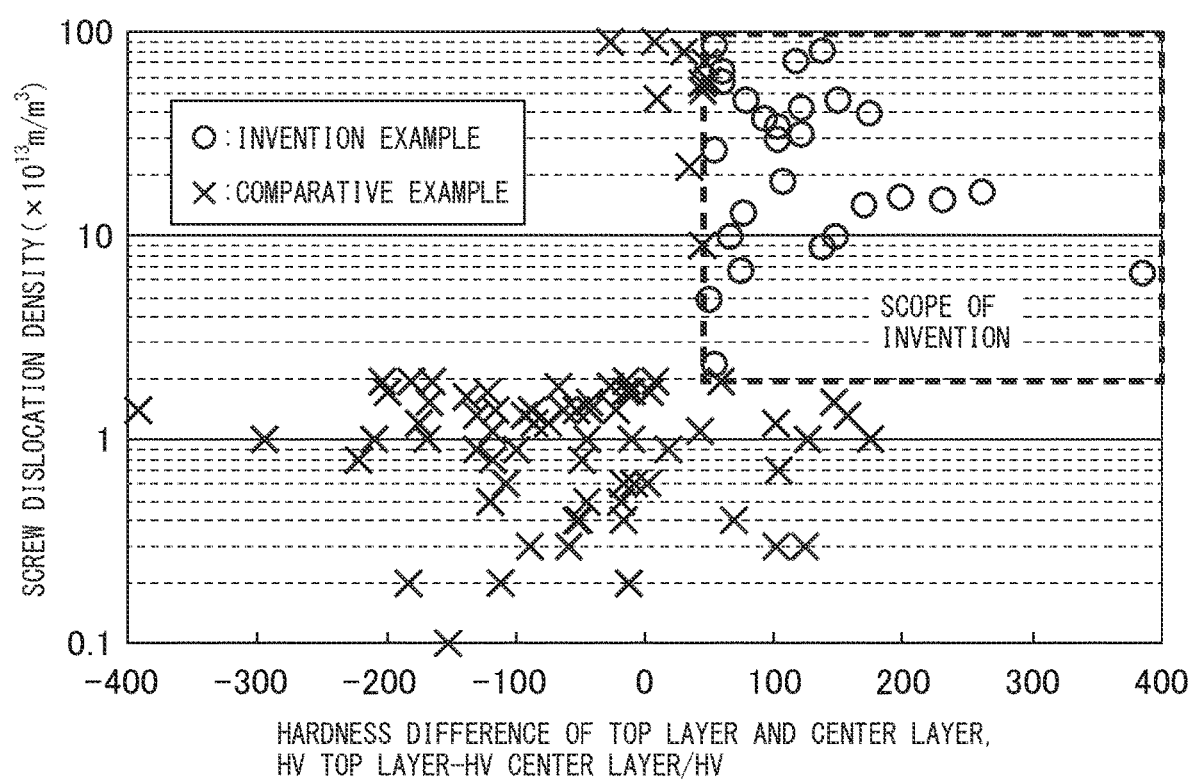
FIG. 1 a graph showing a relationship between a difference of hardness of a top layer (hard layer) and a center layer (inner layer) and a screw dislocation density.

The steel sheet of the present invention comprises a hard layer and an inner layer with a lower average micro-Vickers hardness than the hard layer and is a two-layer or three-layer structure steel sheet provided with the hard layer at least at one of the surfaces.

First, the reason for limiting the thicknesses and the average micro-Vickers hardnesses of the hard layer and the inner layer is explained, as follows.

Thicknesses of Hard Layer and Inner Layer

The thickness of the hard layer present at one or both of the surfaces of the inner layer is made 20 μm or more per surface or 2/5 or less of the total sheet thickness. If the thickness of the hard layer is less than 20 μm, the thickness of the hard layer is thin. If applying a bending moment to the steel sheet, peel-off of the hard layer is easily invited and excellent bending resistance can no longer be obtained. For example, even if there is a 20 μm or more hard layer at one surface of the inner layer, in a structure having a less than 20 μm hard layer at the other surface of the inner layer, when applying bending moment to the steel sheet, the less than 20 μm hard layer is liable to peel off. For this reason, the thickness of the hard layer is made 20 μm or more per surface of the inner layer.

Further, if the total of the thicknesses of the hard layers formed at one or both surfaces of the inner layer exceeds 2/5 of the entire sheet thickness, at the time of bending, the stress applied to each hard layer increases, cracks in the hard layer are caused, and the bending resistance remarkably deteriorates, so the merit of improvement of the bending resistance by way of use of multiple layers can no longer be obtained. For this reason, the total of the thicknesses of the hard layers is made 2/5 or less of the entire sheet thickness. More preferably, the thickness of each hard layer is made 30 μm or more, and the total of the thicknesses is made 3/10 or less of the entire sheet thickness.

The method of measuring the thicknesses of the hard layer and the inner layer is not particularly limited so long as able to accurately measure them. For example, they may be measured by an optical microscope. If using an optical microscope to measure the thicknesses of the hard layer and the inner layer, it is preferable to measure them by the following routine.

First, a sample covered by the measurement is buried in diameter 30 mm cylindrically shaped epoxy resin. #80 to 1000 polishing paper is used for rough polishing by wet polishing, then diamond abrasives having 3 μm and 1 μm average particle sizes are used for finishing this to a mirror surface. Note that, the polishing by the 1 μm diamond particles is performed under the conditions of applying a 1N to 10N load and holding for 30 to 600 seconds on a polishing table rotating by a 30 to 120 mpm speed. At the hard layer and the inner layer, there is a difference in hardness, so in the polishing by the above 1 μm diamond particles, a difference arises in the amount of polishing.

Due to this, a slight step difference is formed at the boundary of the hard layer and the inner layer. By examination using an optical microscope, it is possible to more accurately find the boundary between the hard layer and the inner layer and the thicknesses of the layers and their respective ratios in the sheet thickness. Note that, if the step difference caused by the finish polishing is slight, examination by differential interference contrast of the optical microscope is preferable.

Average Micro-Vickers Hardness of Hard Layer and Inner Layer

The average micro-Vickers hardness of the hard layer is made 400 HV or more and less than 800 HV. When the average micro-Vickers hardness is less than 400 HV, the hardness of the hard layer is low and excellent bending resistance can no longer be obtained. For this reason, the average micro-Vickers hardness of the hard layer is made 400 HV or more. On the other hand, when the average micro-Vickers hardness of the hard layer is 800 HV or more, the hard layer is excessively high in strength, so when applying a bending moment, the hard layer brittlely fractures, so the bending resistance remarkably deteriorates. For this reason, the average micro-Vickers hardness of the hard layer is made less than 800 HV. More preferably, it is 450 HV to 780 HV.

The average micro-Vickers hardness of the inner layer is made 350 HV or more and a value 50 HV or more smaller than the hardness of the hard layer. If the average micro-Vickers hardness is less than 350 HV, the difference in hardness with the hard layer becomes larger, so when applying a bending moment, strain excessively concentrates at the inner layer side, the inner layer easily deforms, and a drop in the bending resistance is invited. For this reason, the average micro-Vickers hardness of the inner layer is made 350 HV or more. Further, when the average micro-Vickers hardness exceeds a value 50 HV smaller than the hardness of the hard layer, the difference in hardness of the hard layer and the inner layer becomes smaller. Therefore, when applying a bending moment, elastic strain is greatly applied to the hard layer, so the bending resistance deteriorates. For this reason, the average micro-Vickers hardness of the inner layer is made a value of 50 HV or more smaller than the hardness of the hard layer. More preferably, it is 400 HV or more and is a value 100 HV or more smaller than the hardness of the hard layer.

The average micro-Vickers hardness of the steel sheet is found by measuring the load 0.098N micro-Vickers hardnesses at 1/4 thickness positions from the surface sides of the hard layer and the inner layer at respectively 12 points and determining the average values of 10 points which have been obtained by discarding the hardest data and the softest data from the 12 points. The micro-Vickers hardnesses are measured based on the Vickers hardness test defined in JIS Z 2244: 2009. Note that, with a load of 0.098N, the diagonal length of the indentation in the case of 400 HV is about 7 μm and the length in the case of 800 HV is about 5 μm. The hardness of the hard layer having a 20 μm or so thickness can be suitably evaluated.

The standard deviation in the nanohardness of the hard layer is preferably 2.0 or less. This is because by suppressing variations in the nanohardness of the hard layer, the bending resistance is remarkably improved. If the standard deviation exceeds 2.0, the variation in hardness in the hard layer becomes larger, so, for example, when applying a bending moment, sometimes fractures occur in the hard layer. From this viewpoint, the standard deviation is preferably 2.0 or less, more preferably 1.6 or less. The lower limit of the standard deviation is not designated, but suppression to 0.2 or less is technically difficult.

Note that, variation of the nanohardness in the sheet thickness direction of the hard layer does not affect the bending resistance. Even if there is a gradient in hardness in the sheet thickness direction, the effect of the present invention is not inhibited. In actuality, if the variation in nanohardness in the width direction of the steel sheet is large, that is, if the variation in nanohardness on the line vertical to the sheet thickness direction and the rolling direction is large, the bending resistance falls. Therefore, the standard deviation of the nanohardness has to be found from the hardness on the line vertical to the sheet thickness direction in the cross-section in thickness and the rolling direction. However, the initial position of the measurement of the nanohardness may be either direction of the right side and left side starting from the center position in the width direction of the steel sheet.

In the present invention, "the standard deviation of the nanohardness of the hard layer" means the standard deviation of a fitting curve when measuring the nanohardness at 100 locations at intervals of 3 μm on the line vertical to the sheet thickness direction of the cross-section in thickness and the rolling direction at the ¼ position of thickness from the surface side of the hard layer under conditions of a pressed depth of 80 nm, preparing a histogram from the obtained hardness data, and approximating the histogram by normal distribution.

Screw Dislocation Density of Inner Layer

The screw dislocation density of the inner layer is measured by the modified-Williamson-Hall/Warren-Averbach method using a micro X-ray diffractometer provided with a Cu or Co tube. For the sample used for X-ray diffraction, the sample used for measurement of sheet thickness by an optical microscope explained above may be used. Before being used for X-ray diffraction, the mirror polished surface is chemically etched or electrolytically polished to remove the strain introduced by the mechanical polishing. The measurement surface is made the surface parallel to the rolling direction and the sheet thickness direction. The X-ray diameter is adjusted by a collimator etc. so that the range of irradiation by the X-rays is kept within the thickness of the inner layer. Further, if using a Cu tube as the X-ray source, a monochromator etc. is set to keep down detection of fluorescent X-rays as much as possible. For the procedure of the modified-Williamson-Hall/Warren-Averbach method, for example, see T. Ungar and A. Borbely: Appl. Phys. Lett., 69 (1996), 3173 or Masayoshi Kumagai, Muneyuki Imafuku, Shin-ichi Ohya: ISIJ International, Vol. 54 (2014), No. 1, p. 206-211.

The screw dislocation density of the inner layer is made $2.0 \times 10^{13}$ m/m$^3$ or more. Screw dislocations cause cross slip and raise the yield strength of the steel due to the entanglement thereof. That is, an increase in the screw dislocation density in the inner layer causes an increase in load required for causing the plastic deformation called "bending", so there is an action and effect of increasing the bending resistance. If the screw dislocation density is less than $2.0 \times 10^{13}$ m/m$^3$, the effect of improvement of the bending resistance is not be obtained, so the lower limit is made $2.0 \times 10^{13}$ m/m$^3$ or more. Note that, the more the screw dislocation density, the more preferable, but if exceeding $1 \times 10^{17}$ m/m$^3$, voids form at the sites of entanglement of dislocations and brittle fracture of the steel sheet is invited. Therefore, the upper limit is preferably $1 \times 10^{17}$ m/m$^3$. For this reason, the lower limit of the screw dislocation density of the inner layer is made $2.0 \times 10^{13}$ m/m$^3$ or more. More preferably, it is $5 \times 10^{13}$ m/m$^3$ or more.

Relationship of Contents of C and Mn at Hard Layer and Contents of C and Mn at Inner Layer In addition to the above-mentioned requirement of the average micro-Vickers hardness of the hard layer and the inner layer and the requirement of the screw dislocation density of the inner layer, it is essential to make the contents of C and Mn in the hard layer greater than the C and Mn in the inner layer so as to obtain the effect of the present invention. Both C and Mn are elements affecting the micro-yield of the steel. Along with the increase in contents, there is the effect of suppressing micro-yield. "Micro-yield" is, for example, a phenomenon of yielding occurring in crystal grain units inside the material in the region of strain-stress which is macroscopically observed as elastic deformation at the time of a tensile test. Micro-yield basically occurs when a dislocation occurring inside a crystal grain or from the grain boundary is propagated to an adjoining crystal grain. The phenomenon of yielding occurring in such crystal grain units, that is, micro-yield, being propagated to the sheet thickness as a whole is the macroscopic yielding phenomenon observed in tensile tests. C segregates at the crystal grain boundaries and thereby has the effect of suppressing propagation of dislocations to adjoining particles, that is, the occurrence of micro-yield. Further, Mn is believed to have the effect of promoting cross slip of dislocations moving inside the grains. By suppressing buildup of dislocations at the crystal grain boundaries at the time of applying external force, it has the action of suppressing propagation of dislocations to the adjoining particles, that is, the occurrence of micro-yield. To secure the bending resistance, it is necessary to keep micro-yield from occurring at the hard layer. For this, it is necessary to make up for the easing of strain when applying external force to the multilayer steel sheet by the micro-yield of the inner layer. Therefore, to keep micro-yield from occurring at the hard layer and promote the occurrence of micro-yield at the inner layer, it is necessary to make the contents of C and Mn in the hard layer greater than the contents of C and Mn in the inner layer.

The chemical ingredients optimal for steel sheet having a hard layer and inner layer is explained, as follows. Below, the "%" of the constituents means mass %.

C: 0.10 to 0.60%

C is an element effective for strengthening steel. To secure bending resistance of a part, a 0.10% or more amount of C is required. If less than 0.10%, the hardness of the material is insufficient and an excellent bending resistance can no longer be obtained. For this reason, the lower limit is made 0.10% or more. On the other hand, if over 0.60%, formation of carbides inside the material is promoted and brittle fracture starting from the carbides is invited when applying a bending moment, so the upper limit is made 0.40% or less. More preferably, the content is 0.15% to 0.59%.

Si: 0.01 to 3.00%

Si is an element which acts as a deoxidant and has an effect on the control of the morphology of the carbides and increase of strength of the steel. If less than 0.01%, formation of carbides is promoted, a large amount of carbides becomes present in the steel, and the bending resistance deteriorates. Note that, keeping down the Si to a content of less than 0.01% invites an increase in costs in current refining processes. For this reason, the lower limit of Si is made 0.01% or more. On the other hand, if the content of Si exceeds 3.0%, brittleness of the steel part is invited and the bending resistance is lowered, so the upper limit is made 3.0%. Preferably, the content is 0.01% to 2.5%. More preferably, it is 0.2% to 2.0%.

Mn: 1.00 to 10.00%

Mn is an element which acts as a deoxidant and further is effective for control of the pearlite transformation of steel. If less than 1.00%, in the cooling process from the austenite region, it becomes difficult to suppress pearlite transformation. Along with this, the ratio of martensite structures falls, so a drop in strength and deterioration of the bending resistance are caused. For this reason, the lower limit is made 1.0% or more. On the other hand, if over 10.00%, coarse Mn oxides become present in the steel and become starting points of fracture at the time of bending, so the bending resistance deteriorates. For this reason, the upper limit is made 10.00%. Preferably, it is 2.0% to 9.0% or less.

P: 0.0001 to 0.0200%

P is an element strongly segregating at the ferrite grain boundaries and promoting the embrittlement of the grain boundaries. The smaller, the more preferable, but to improve the purity to less than 0.0001% in the refining step, the time required for refining becomes greater and a large increase in costs is invited. For this reason, the lower limit may be made 0.0001% or more. On the other hand, if over 0.0200%, grain boundary embrittlement invites a drop in bending resistance, so the upper limit is made 0.0200% or less. Preferably, the content is 0.0010% to 0.0190%.

S: 0.0001 to 0.0200%

S is an element forming MnS and other nonmetallic inclusions in the steel and invites a drop in the ductility of the steel sheet part. The smaller, the more preferable, but to improve the purity to less than 0.0001% of this in the refining process, the time required for refining becomes great and a large increase in costs is invited. For this reason, the lower limit may also be made 0.0001% or more. On the other hand, if exceeding 0.0200%, fracture starting from the nonmetallic inclusions is invited when applying a bending moment and the bending resistance falls, so the upper limit is made 0.0200% or less. Preferably, the content is 0.0010% to 0.0190%.

N: 0.0200% or Less

N, like C, is an element effective for strengthening steel. From the viewpoint of securing the bending resistance, the smaller the content, the more preferable. 0% is also possible. However, reducing this to less than 0.0001% would invite an increase in the refining costs, so if N is included, the lower limit is made 0.0001% or more. On the other hand, with content exceeding 0.0200%, embrittlement of the steel is caused, so the bending resistance remarkably falls. For this reason, the upper limit is made 0.0200%. Preferably, the content is 0.0010% to 0.0150%.

O: 0.0200% or Less

O is an element promoting the formation of oxides in the steel. The oxides present in the ferrite grains become sites for formation of voids, so the fewer, the more preferable. 0% is also possible. However, reduction to less than 0.0001% invites an increase in refining costs, so if O is included, 0.0001% or more is made the lower limit. On the other hand, with a content exceeding 0.0200%, the bending resistance is lowered, so the upper limit is made 0.0200% or less. Preferably, the content is made 0.0005% to 0.0170%.

Al: 0.500% or Less

Al is an element acting as a deoxidant of steel and stabilizing the ferrite and is added in accordance with need. If adding Al, with less than 0.001%, the effect of addition is not sufficiently obtained, so the lower limit is made 0.001% or more. On the other hand, if exceeding 0.500%, coarse Al oxides are formed and a drop in the bending resistance is caused. For this reason, the upper limit is made 0.500% or less. Preferably, the content is 0.010% to 0.450%.

Ti: 0.500% or Less

Ti is an element important for control of the morphology of the carbides and an element promoting an increase of strength of the ferrite due to inclusion in a large amount. From the viewpoint of securing the bending resistance, the smaller the content, the more preferable. 0% is also possible. However, reducing this to less than 0.001% invites an increase in the refining costs, so if Ti is included, the lower limit is made 0.001% or more. On the other hand, with an over 0.500% content, coarse Ti oxides or TiN become present in the steel and the bending resistance is lowered. For this reason, the upper limit is made 0.500% or less. Preferably, the content is 0.005% to 0.450%.

B: 0.0100% or Less

B is an element suppressing the formation of ferrite and pearlite in the process of cooling from austenite and promoting the formation of bainite or martensite or other low temperature transformed structures. Further, B is an element advantageous for increasing the strength of steel and is added in accordance with need. If adding B, with less than 0.0001%, the effect of addition in increasing the strength or improving the bending resistance cannot be sufficiently obtained. Furthermore, for identifying less than 0.0001%, careful attention must be paid in analysis. Depending on the analysis device, the lower limit of detection may be reached. For this reason, 0.0001% or more is made the lower limit. On the other hand, with a content exceeding 0.0100%, formation of coarse B oxides in the steel is invited and the bending resistance deteriorates. For this reason, the upper limit is made 0.0100% or less. More preferably, the content is 0.0005% to 0.0050%.

Cr: 2.000% or Less

Cr, like Mn, is an element suppressing pearlite transformation and effective for increasing the strength of steel and is added in accordance with need. If adding Cr, with less than 0.001%, the effect of addition is not obtained, so the lower limit is made 0.001% or more. On the other hand, with addition exceeding 2.000%, coarse Cr carbides are formed at the center segregated part and the bending resistance is lowered, so the upper limit is made 2.000% or less. Preferably, the content is 0.010% to 1.500%.

Mo: 1.000% or Less

Mo, like Mn and Cr, is an element effective for strengthening steel and is added in accordance with need. If adding Mo, with less than 0.001%, the effect is not obtained, so the lower limit is made 0.001% or more. On the other hand, if exceeding 1.000%, coarse Mo carbides are formed and a drop in the bending resistance is invited, so the upper limit is made 1.000% or less. More preferably, the content is 0.010% to 0.700%.

Nb: 0.500% or Less

Nb, like Ti, is an element effective for control of the morphology of carbides. It is an element effective also for improving the toughness since refining the structure due to its addition and is added in accordance with need. If adding Nb, with less than 0.001%, the effect is not obtained, so the lower limit is made 0.001% or more. On the other hand, if exceeding 0.500%, a large number of fine, hard Nb carbides precipitate, a remarkable deterioration of the ductility is invited along with the rise in strength of the steel sheet, and the bending resistance is lowered. For this reason, the upper limit is made 0.500% or less. Preferably the content is 0.002% to 0.200%.

V: 0.500% or Less

V also, like Nb, is an element effective for control of the morphology of the carbides and an element effective for improving the toughness since addition refines the structure and is added in accordance with need. If adding V, with less than 0.001%, the effect is not obtained, so the lower limit is made 0.001% or more. On the other hand, if over 0.500%, a large number of fine V carbides precipitate, a rise in strength and drop in ductility of the steel sheet are invited, and the bending resistance falls. For this reason, the upper limit is made 0.500% or less. More preferably, the content is 0.002% to 0.400%.

Cu: 0.500% or Less

Cu is an element effective for increasing the strength of steel sheet and is added in accordance with need. If adding Cu, to effectively obtain the effect of increase of strength, a 0.001% or more content is preferable. On the other hand, if over 0.500%, hot shortness is invited and the productivity in hot rolling is lowered, so the upper limit is made 0.500% or less. More preferably, the content is 0.002% to 0.400%.

W: 0.100% or Less

W also, like Nb and V, is an element effective for control of the morphology of the carbides and increase of the strength of steel and is added in accordance with need. If adding W, with less than 0.001%, the effect is not obtained, so the lower limit is made 0.001% or more. On the other hand, if over 0.100%, a large number of fine W carbides precipitate, a rise in strength and drop in ductility of the steel sheet are invited, and the bending resistance falls. For this reason, the upper limit is made 0.100% or less. More preferably, the content is 0.002% to 0.100%.

Ta: 0.100% or Less

Ta also, like Nb, V, and W, is an element effective for control of the morphology of carbides and increase of the strength and is added in accordance with need. If adding Ta, with less than 0.001%, the effect is not obtained, so the lower limit is made 0.001% or more. On the other hand, if over 0.100%, a large number of fine Ta carbides precipitate, a rise in strength and drop in ductility of the steel sheet are invited, and the bending resistance falls. For this reason, the upper limit is made 0.100% or less. More preferably, the content is 0.002% to 0.100%.

Ni: 0.500% or Less

Ni is an element effective for improvement of the bending resistance of a part and is added in accordance with need. If adding Ni, to enable the effect to be effectively manifested, inclusion of 0.001% or more is preferable. On the other hand, if over 0.500%, the ductility falls and a drop in the bending resistance is invited, so the upper limit is made 0.500% or less. More preferably, the content is 0.002% to 0.400%.

Sn: 0.050% or Less

Sn is an element contained in steel when using scrap as a raw material. The smaller the content, the more preferable. 0% is also possible. However, reduction to less than 0.001% invites an increase in refining costs, so if Sn is contained, the lower limit is made 0.001% or more. Further, with a content over 0.050%, ferrite embrittlement causes a drop in the bending resistance, so the upper limit is made 0.050% or less. More preferably, the content is 0.001% to 0.040%.

Sb: 0.050% or Less

Sb, like Sn, is an element contained in the case of using scrap as a raw material of the steel. Sb strongly segregates at the grain boundaries and invites embrittlement of the grain boundaries and a drop in ductility, so the smaller the content, the more preferable. 0% is also possible. However, reduction to less than 0.001% invites an increase in refining costs, so if Sb is contained, the lower limit is made 0.001% or more. Further, with a content over 0.050%, a drop in the bending resistance is caused, so the upper limit is made 0.050% or less. More preferably, the content is 0.001% to 0.040%.

As: 0.050% or Less

As, like Sn and Sb, is an element contained in the case of using scrap as a raw material of the steel and strongly segregates at the grain boundaries. The smaller the content, the more preferable. 0% is also possible. However, reduction to less than 0.001% invites an increase in refining costs, so if As is contained, the lower limit is made 0.001% or more. Further, with a content over 0.050%, a drop in the bending resistance is caused, so the upper limit is made 0.050% or less. More preferably, the content is 0.001% to 0.040%.

Mg: 0.0500% or Less

Mg is an element able to control the morphology of sulfides by addition in a trace amount and is added in accordance with need. If adding Mg, with less than 0.0001%, that effect cannot be obtained, so the lower limit is made 0.0001% or more. On the other hand, if excessively adding it, coarse inclusions are formed and consequently a drop in the bending resistance is caused, so the upper limit is made 0.0500%. More preferably, the content is 0.0005% to 0.0400%.

Ca: 0.050% or Less

Ca, like Mg, is an element able to control the morphology of sulfides by addition in a trace amount and is added in accordance with need. If adding Ca, with less than 0.001%, that effect cannot be obtained, so the lower limit is made 0.001% or more. On the other hand, if excessively adding it, coarse Ca oxides are formed and a drop in the bending resistance is invited, so the upper limit is made 0.050%. More preferably, the content is 0.001% to 0.040%.

Y: 0.050% or Less

Y, like Mg and Ca, is an element able to control the morphology of sulfides by addition in a trace amount and is added in accordance with need. If adding Y, with less than 0.001%, that effect cannot be obtained, so the lower limit is made 0.001% or more. On the other hand, if excessively adding it, coarse Y oxides are formed and the bending resistance drops, so the upper limit is made 0.050%. Preferably, the content is 0.001% to 0.040%.

Zr: 0.050% or Less

Zr, like Mg, Ca, and Y, is an element able to control the morphology of sulfides by addition in a trace amount and is added in accordance with need. If adding Zr, with less than 0.001%, that effect cannot be obtained, so the lower limit is made 0.001% or more. On the other hand, if excessively adding it, coarse Zr oxides are formed and the bending resistance drops, so the upper limit is made 0.050%. Preferably, the content is 0.001% to 0.040%.

La: 0.050% or Less

La is an element effective for control of the morphology of sulfides by addition in a trace amount and is added in accordance with need. If adding La, with less than 0.001%, that effect cannot be obtained, so the lower limit is made 0.001% or more. On the other hand, if adding over 0.050%, La oxides are formed and a drop in the bending resistance is invited, so the upper limit is made 0.050%. More preferably, the content is 0.001% to 0.040%.

Ce: 0.050% or Less

Ce, like La, is an element able to control the morphology of sulfides by addition in a trace amount and is added in accordance with need. If adding Ce, with less than 0.001%, that effect cannot be obtained, so the lower limit is made 0.001% or more. On the other hand, if adding over 0.050%, Ce oxides are formed and a drop in the bending resistance is invited, so the upper limit is made 0.050%. More preferably, the content is 0.001% to 0.046%.

Note that, in the hard layer and the inner layer of the steel sheet of the present invention, the balance of chemical ingredients other than the above consists of Fe and unavoidable impurities, but other elements may also be contained in trace amounts so long as not hindering the effect of the present invention.

Next, the method of examination and measurement of the steel sheet structure is explained, as follows.

The structure is examined by a scan type electron microscope. Before examination, the sample for structural examination is wet polished by emery paper and polished by diamond abrasives having 1 μm average particle size. The examined surface was polished to a mirror finish, then a 3% nitric acid alcohol solution was used to etch the structures. The magnification of the examination was made 3000×. Ten 30 μm×40 μm fields at the thickness ¼ layers of the hard layer and the inner layer were randomly captured. The ratios of the structures was found by the point count method. In the obtained structural images, lattice points arrayed at intervals of a vertical 3 μm and horizontal 4 μm were set at a total of 100 points. The structures present under the lattice points were judged and the ratios of the structures contained in the steel sheet were found from the average value of the 10 images.

The volume rate of carbides is measured based on structural images taken by a scan type electron microscope. Before examination, the sample for structural examination was wet polished by emery paper and polished by diamond abrasives having 1 μm average particle size. The examined surface was polished to a mirror finish, then a saturated picric acid alcohol solution was used to etch the structures. The magnification of the examination was made 3000×. Eight 30 μm×40 μm fields at the thickness ¼ layer were randomly captured. The obtained structural images were analyzed by image analysis software such as Win ROOF made by Mitani Corporation to measure in detail the areas of the carbides contained in the regions. The ratio of the total area of the carbides to the total area of the examined fields is found and this used as the volume rate of the carbides. Note that, to keep down the effect of noise on measurement error, carbides with an area of 0.01 $\mu m^2$ or less are excluded from the evaluation.

In the steel sheet of the present invention, the volume rates of the carbides in the hard layer and the inner layer are preferably 2.0% or less. Carbides are the hardest structures in steel. Even if the stress given to steel is a small one of about 0.5 time the tensile strength, due to the difference in hardness with respect to other structures, the strain concentrates at the matrix interface of the steel contacting the carbides. Concentration of strain invites plastic deformation and causes a drop in bending resistance and fatigue resistance. Therefore, the smaller the carbides, the more preferable. In volume rate, 2.0 or less is preferable. More preferably it is 1.6% or less.

As explained above, the steel sheet of the present invention is provided with the inner layer and the hard layer, so the tensile strength of the steel is improved. Along with the improvement in the tensile strength, the yield point also is caused to rise, so the steel sheet has excellent bending resistance. The bending resistance can be confirmed by the following method of evaluation. That is, a Schenk type test piece is fabricated from each sample. A strain gauge is attached to the surface of the test piece in the state with no stress, then $10^3$ repeated planar bending is given by a load stress of 0.5 time the tensile strength. The residual plastic strain after detaching the test piece from the tester is measured. According to the present invention, the residual plastic strain can be made 0.1% or less.

Furthermore, according to the present invention, it is possible to produce high strength steel sheet excellent in fatigue fracture characteristics. Such high strength steel sheet is further excellent in bending resistance, so is excellent in fatigue strength. Further, the fatigue resistance can be confirmed by the following method of evaluation. That is, a Schenk type test piece is fabricated from each sample, a strain gauge is attached to the surface of the test piece in the state of no stress, and $10^4$ repeated plane bending is given by a load stress of 0.5 time the tensile strength. According to the present invention, even after $10^4$ repeated plane bending, no fatigue fracture (fracture) occurs. It is possible prepare material excellent in fatigue fracture characteristics. The steel sheet excellent in fatigue strength according to the present invention must at least satisfy the above-mentioned optimal compositions of chemical ingredients in both of the hard layer and inner layer steel sheets forming this steel sheet.

Steel sheet excellent in bending resistance cannot be obtained by just the conventional top layer reforming of application of general carburizing, nitriding, soft nitriding, induction surface hardening, etc. The reason is that carburizing, nitriding, soft nitriding, and other heat treatment techniques just form a hard layer on the top layer. It is difficult to control the screw dislocation density of the inner layer to $2.0 \times 10^{13}$ $m/m^3$ and a drop in the bending resistance is invited.

Method for Producing Steel Sheet of Present Invention

Next, the method for producing the steel sheet of the present invention is explained, as follows. The following explanation is meant to illustrate the characteristic method for producing the steel sheet of the present invention and is not meant to limit the steel sheet of the present invention to multilayer steel sheet obtained by joining an inner layer and hard layer such as explained below. For example, at the time of production of the steel sheet, by treating the surface of a single layer of steel sheet and hardening the top layer part, it is possible to produce steel sheet provided with an inner layer and hard layer according to the present invention. By hardening the top layer part by surface treatment at the time of production of the steel sheet in this way, it is possible to solve the problem of the drop in dimensional precision due to the heat treatment strain occurring when treating the surface of a part after formation.

The method of production of the present invention is characterized by bonding a hard layer with a hardness 50 HV or more harder than a hardness of an inner layer to one or both surfaces of the inner layer and controlling the dislocations, constituents, and morphology of the structures of the inner layer to the optimum states. Further, as such a method of production, while not particularly limited, for example, diffusion heat treatment using blank sheets of thin steel sheets, hot rolling, cold rolled annealing, and plating using a slab comprising types of steel of the hard layer and inner layer joined by electron beam welding, and other treatment may be mentioned. The characteristics of the specific method of production of the present invention are as follows:

The method for producing the multilayer slab is not particularly an issue. For example, either the continuous casting method or slab welding method may be used. In the continuous casting method, a casting machine provided with two tundishes is used to first produce a casting of the inner layer side positioned in the center part, then pour molten steel of constituents corresponding to the hard layer different from the inner layer side from the second tundish so as to cover the inner layer side casting and continuously solidify it to obtain a slab in the multilayer state. Alternatively, in the slab welding method, slabs cast to have predetermined compositions or rough rolled materials produced from the slabs are polished at the joining surfaces by machine scarfing etc. then are washed by acid and alcohol to remove oxides and contaminants and are stacked together. Furthermore, the stacked slabs are joined by electron beam welding to obtain a multilayer slab for hot rolling use.

By using a slab produced by the method illustrated above and producing a multilayer steel sheet by the following hot rolling step, the steel sheet of the present invention can be produced.

Features of hot rolling: The above-mentioned multilayer slab is hot rolled as it is or after being cooled once, then heated. The finish hot rolling is ended at the 650° C. to 950° C. temperature region. The finish hot rolled steel sheet is cooled on a runout table (ROT), then coiled in the 700° C. or less temperature range to obtain a hot rolled coil. Furthermore, in the not pickled state or after pickling, the hot rolled coil is temper rolled by an elongation rate of 0.1% or more (also called "skin pass rolling"). Below, the method of production of the present invention is explained in detail, as follows.

Preferably, the heating temperature at the time of hot rolling the multilayer slab is made 1100° C. to 1300° C. and the heating time in this heating temperature range is made 15 minutes to 300 minutes. When the heating temperature exceeds 1300° C. or the heating time exceeds 300 minutes, remarkable oxidation proceeds between the hard layer and the inner layer, and the hard layer and the inner layer more easily peel apart, so sometimes a drop in the bending resistance is caused. As the more preferable upper limits, the heating temperature is 1250° C. or less and the heating time in that temperature range is 270 minutes or less. On the other hand, when the heating temperature at the time of hot rolling of the multilayer slab is less than 1100° C. or the heating time is less than 15 minutes, sometimes the solidification segregation caused in the hard layer and the inner layer is not sufficiently dissolved and the tensile strengths of the hard layer and the inner layer become insufficient. For this reason, as the more preferable lower limits, the heating temperature is 1150° C. or more and the heating time in that temperature range is 30 minutes or more.

The finish hot rolling is ended at 650° C. to 950° C. If the finish hot rolling temperature is less than 650° C., due to the increase of the deformation resistance of the steel sheet, the rolling load remarkably rises and further sometimes an increase in the amount of roll wear is invited and a drop in productivity is caused. For this reason, the lower limit is made 650° C. or more. Further, if the finish hot rolling temperature exceeds 950° C., flaws caused by the thick scale formed while passing through the ROT are formed on the steel sheet surface and surface cracks are caused due to the scale, so cause a drop in the bending resistance. For this reason, the upper limit is made 950° C. or less. More preferably, it is 800° C. to 930° C. Further, to make the standard deviation of the nanohardness of the hard layer 2.0 or less, in addition to the above temperature range of finish rolling, it is further preferable to make the steel sheet of the hard layer the above-mentioned optimum chemical ingredients.

The cooling rate of the steel sheet at the ROT after finish hot rolling is preferably 10° C./s to 100° C./s. With a cooling rate of less than 10° C./s, it is not possible to prevent the formation of thick scale in the middle of cooling and the occurrence of flaws due to the thick scale, and a drop in the surface appearance is invited. For this reason, the lower limit is preferably made 10° C./s or more. Further, when cooling the steel sheet from the surface to the inside of the steel sheet by a cooling rate exceeding 100° C./s, the surface-most layer is excessively cooled and bainite, martensite, and other low temperature transformed structures are formed. When paying out a coil cooled to room temperature after coiling, fine cracks form at the above-mentioned low temperature transformed structures. It is difficult to remove these cracks even in the succeeding pickling step. These cracks become starting points of fracture and cause fracture of the steel sheet in production and a drop in productivity. For this reason, the upper limit is preferably made 100° C./s or less. Note that the cooling rate defined above indicates the cooling ability obtained by virtue of the cooling facilities between the spray zones from the point of time (spray start point) when the finish hot rolled steel sheet is water cooled in a spray zone after passing through a non-spray zone to the point of time when it is cooled on the ROT to the target temperature of coiling. The cooling rate does not specify the average cooling rate from the spray start point to the temperature of coiling by the coiling machine. More preferably, it is 20° C./s to 90° C./s.

The coiling temperature is made 700° C. or less. When the coiling temperature exceeds 700° C., after hot rolling, the predetermined strengths cannot be secured at the hard layer and the inner layer. In addition, formation of a large amount of carbides is invited and a drop in the bending resistance is caused. For this reason, the upper limit of the coiling temperature is made 700° C. or less. Further, to increase the strength of the hard layer, the lower the coiling temperature, the more preferable, but when applying deep cooling (sub zero) of a temperature lower than room temperature, sometimes the hot rolled sheet becomes remarkably brittle, so the lower limit of the coiling temperature is preferably 0° C. or more. More preferably, it is 10° C. to 680° C.

Figure 5:
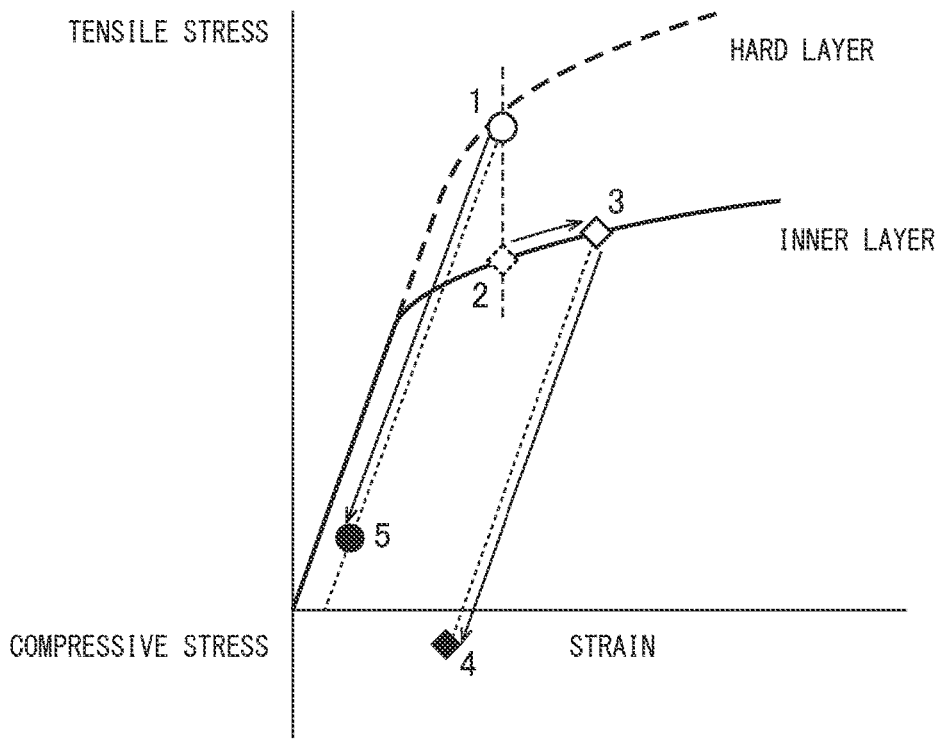
FIG. 5 is a view showing the occurrence of residual stress of compression at an inner layer by skin pass rolling of the invention steel.

To obtain the morphology of the present invention, control at the skin pass rolling is extremely important. When applying a load to the multilayer steel sheet to cause plastic deformation, as shown in FIG. 5, stress and strain are distributed at the hard layer and the inner layer along the stress-strain curve of the hard layer and the inner layer. For example, when applying plastic strain corresponding to the coordinates 1 and 2 in FIG. 5, deformation of the inner layer is easy, so as shown at the coordinate 3, large plastic strain is introduced to the inner layer. When removing the load from this state, contraction due to plastic deformation occurs from the stress-strain curves of the coordinates 1 and 3. Note that, when the stress at the coordinates 1 is higher than the coordinates 3, the amount of contraction due to plastic deformation also becomes larger at the coordinates 1 than the coordinates 3. As a result, the state of stress after removal of the load, as shown by the coordinates 4 and 5, becomes one where tension acts on the hard layer and places of compressive stress are created at the inner layer.

By leaving compressive stress after applying plastic deformation to the inner layer in this way, it becomes possible to control the screw dislocation density of the inner layer to $2.0 \times 10^{13}$ m/m³ or more. That is, when applying stress in the reverse direction from deformation (here, from tension to compression) to dislocations grown due to plastic deformation, due to application of the compressive stress, the dislocations introduced due to tension try to return toward the original sources of the dislocations. Further, when a large amount of dislocations are introduced due to the skin pass rolling, the dislocations entangle with each other. Due to this entanglement, movement of dislocations is suppressed and return to the sources of the dislocations becomes no longer possible. Note that, when trying to ease the compressive stress caused at the inner layer, movement of dislocations to other slip systems different from the original slip system of the main slip system, so-called "cross slip", occurs. This cross slip is a phenomenon arising only in screw dislocations, so by skin pass rolling the multilayer steel sheet, it is possible to preferentially increase the screw dislocation density.

The skin pass applied to the multilayer steel sheet is made one of an elongation rate of 0.1% or more. If the elongation rate, that is, the amount of plastic deformation given to the multilayer steel sheet, is less than 0.1%, the amount of plastic deformation of the inner layer is small and the screw dislocation density cannot be controlled to $2.0 \times 10^{13}$ m/m$^3$ or more. For this reason, the lower limit of the skin pass elongation rate is made 0.1% or more. Further, the higher the skin pass rolling rate, the more preferable, but giving over 5.0% applies a large load on the rolling mill and invites a drop in productivity, so an upper limit of 5.0% or less is preferred. More preferably, it is 0.2% to 4.0%.

Further, by pickling the hot rolled steel strip after the above skin pass rolling or without skin pass rolling and by performing cold rolling or further cold rolled annealing or both cold rolling and cold rolled annealing after hot rolled annealing, it is possible to produce cold rolled steel strip provided with bending resistance as well.

Pickling step: The type of the acid used in the pickling step is not particularly designated. The purpose of the pickling is the removal of the oxide scale formed on the surface of the steel strip after hot rolling. Either hydrochloric acid pickling or sulfuric acid pickling may be performed. Furthermore, to promote pickling, it is possible to add a chemical pickling promoter into the pickling solution or to adjust the vibration or tension or apply other mechanical action. Even if doing these procedures, there is no effect at all on the basic art of the present invention.

Cold rolling: The rolling reduction in cold rolling is preferably 20% to 80%. With a rolling reduction of less than 20%, the load applied at each stand of the tandem rolling mill becomes smaller, so obtaining a grasp of and controlling the sheet shape become difficult and a drop in productivity is invited. Further, if the rolling reduction exceeds 80%, the load applied at each stand remarkably increases. Along with this, the Hertz stress occurring at the rolls excessively rises, so a drop in the roll lifetime is invited and a drop in productivity is caused. For this reason, the rolling reduction is preferably 20% to 80%. More preferably, it is 25% to 70%.

Hot rolled annealing step: Before supplying the hot rolled steel strip for cold rolling, the strip may also be annealed. The purpose of hot rolled annealing is to secure productivity in cold rolling by softening the steel strip before cold rolling and obtain excellent bending resistance in the steel strip after cold rolled annealing by controlling the ratios of structures at the stage after hot rolled annealing. As the step of hot rolled annealing, either the box annealing (BAF) or conventional continuous annealing method (C-CAL) may be used. The steps of the box annealing method (BAF) and conventional continuous annealing method (C-CAL) are respectively shown in brief in FIG. 2 and FIG. 3.

The heating rate and cooling rate in the box annealing are preferably 5° C./h to 80° C./h. With a heating rate of less than 5° C./h, the time required for the hot rolled annealing step increases and a drop in productivity is invited. On the other hand, if the heating rate exceeds 80° C./h, the temperature difference between the inner circumference side and the outer circumference side of the steel strip taken up in a coil rises. Due to sliding of the steel strip caused by the difference in heat expansion of this difference, flaws are formed at the surface of the steel strip. These flaws invite a drop in the bending resistance in addition to a drop in the surface appearance of the product. For this reason, the heating rate is preferably 5° C./h to 80° C./h. More preferably, it is 10° C./s to 60° C./s.

Preferably, the annealing temperature in the box annealing is 400° C. to 720° C. and the holding time is 1 hour to 150 hours. With an annealing temperature of less than 400° C. or a holding time of less than 1 hour, the steel strip is not sufficiently softened and there is no effect on improvement of productivity in cold rolling. Further, if the annealing temperature exceeds 720° C., austenite is formed during the annealing and flaws are caused in the steel strip due to changes due to heat expansion. Furthermore, if the holding time exceeds 150 hours, the surface of the steel strip becomes adhesive and seizing occurs, so the surface appearance falls. For this reason, preferably the annealing temperature in the box annealing is 400° C. to 720° C. and the holding time is 1 hour to 150 hours. More preferably, the annealing temperature is 420° C. to 700° C., while the holding time is 3 hours to 100 hours.

The heating rate and cooling rate in continuous annealing are preferably 5° C./s or more. With a heating rate of less than 5° C./s, a drop in the productivity is invited. On the other hand, there are no upper limits on the heating rate and cooling rate. They may be over 80° C./s as well. More preferably, the rates are 10° C./s or more.

Preferably, the annealing temperature in the continuous annealing is 650° C. to 900° C. and the holding time is 20 seconds to 300 seconds. When the annealing temperature is less than 650° C. or the holding time is less than 20 seconds, with the continuous annealing method, the steel strip is not sufficiently softened and there is no effect of improvement of productivity in the cold rolling. Further, when the annealing temperature exceeds 900° C., the strength of the steel strip remarkably falls, sheet fracture in the furnace is invited, and a drop in productivity is caused. Furthermore, when the holding time exceeds 300 seconds, the impurities in the furnace deposit on the surface of the steel strip and the surface appearance falls. For this reason, the annealing temperature in the continuous annealing is preferably 650° C. to 900° C. and the holding time 20 seconds to 300 seconds. The more preferable annealing temperature is 680° C. to 850° C. and the holding time is 30 seconds to 240 seconds.

Preferably, the temperature at the overaging zone in continuous annealing is 200° C. to 500° C. and the holding time is 50 seconds to 500 seconds. By making the austenite formed in the stage of the heating transform to bainite or martensite in the overaging zone and suitably controlling the amount and morphology of the residual austenite, an excellent bending resistance is obtained. With an aging temperature of less than 200° C. and a holding time of less than 50 seconds, the amount of transformation of bainite becomes insufficient. Further, with an aging temperature of 500° C. or more and a holding time of less than 500 seconds, the amount of residual austenite remarkably falls, so bending resistance can no longer be simultaneously obtained. For this reason, preferably the temperature in the overaging zone in usual continuous annealing is 200° C. to 500° C. and the holding time 50 is seconds to 500 seconds. More preferably, the temperature is 250° C. to 450° C. and the holding time is 60 seconds to 400 seconds.

Cold rolled annealing step: The purpose of cold rolled annealing is the restoration of the bending resistance of the steel strip lost due to cold rolling. By further optimizing the ratios of the structures of ferrite, pearlite, bainite, martensite, and residual austenite, excellent bending resistance is obtained. As the cold rolled annealing step, either the conventional continuous annealing method (C-CAL) or reheat type continuous annealing method (R-CAL) may be used.

The heating and the holding and cooling steps in the conventional continuous annealing method (C-CAL) in cold rolled annealing can be performed under similar conditions to the above-mentioned continuous annealing relative to the hot rolled annealing step.

Figure 4:
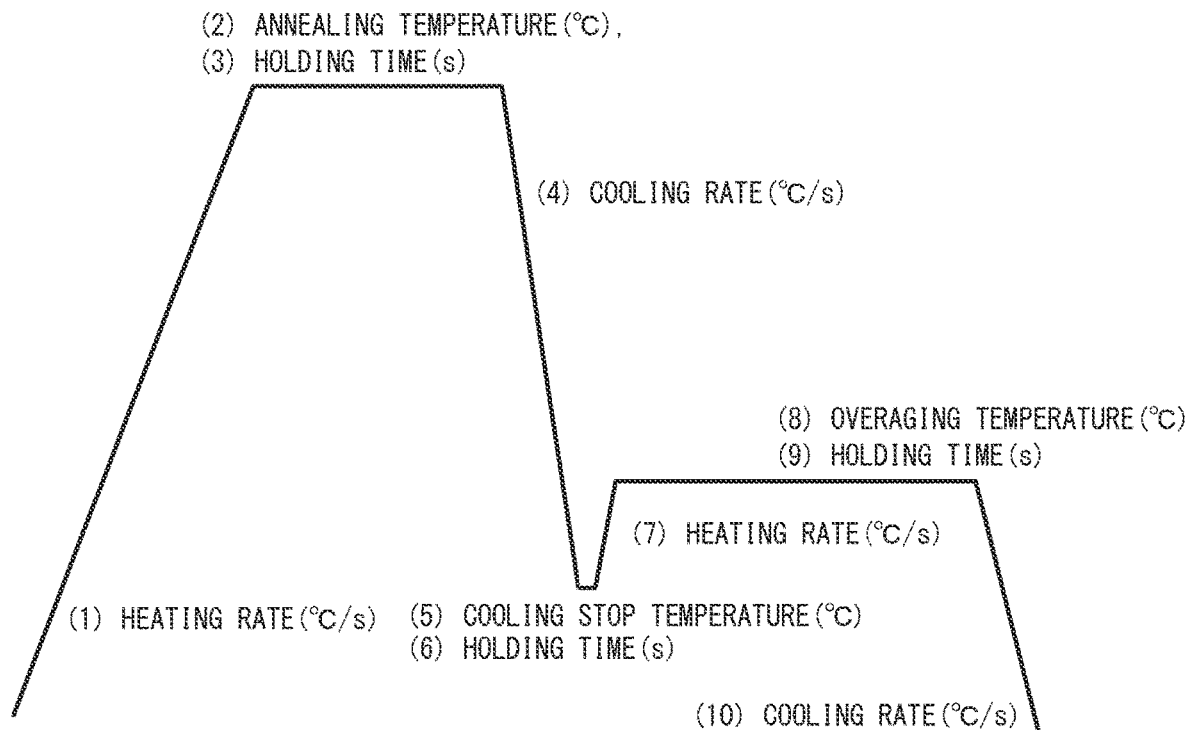
FIG. 4 is a view showing an annealing pattern of reheat type annealing of cold rolled sheet suitable for cold rolled annealing after cold rolling.

An outline of the steps in the reheat type continuous annealing is shown in FIG. 4. The heating rate and cooling rate in the reheat type continuous annealing are preferably 5° C./s or more. With a heating rate of less than 5° C./s, a drop in the productivity is invited. On the other hand, there are no upper limits on the heating rate and cooling rate. 80° C./s may be exceeded as well. More preferably, the rates are 10° C./s or more.

Preferably, the annealing temperature in reheat type continuous annealing is 700° C. to 900° C. and the holding time is 20 seconds to 300 seconds. If the annealing temperature is less than 700° C. or the holding time is less than 20 seconds, the amount of austenite transforming in continuous annealing is not sufficient and the desired ratios of structures can no longer be controlled to in the subsequent quenching and distribution. Further, if the annealing temperature exceeds 900° C., the strength of the steel strip remarkably falls, sheet fracture in the furnace is invited, and a drop in productivity is caused. Furthermore, if the holding time exceeds 300 seconds, the impurities in the furnace deposit on the surface of the steel strip and the surface appearance falls. For this reason, preferably the annealing temperature in continuous annealing is 700° C. to 900° C. and the holding time is 20 seconds to 300 seconds. More preferably, the annealing temperature is 720° C. to 850° C. and the holding time is 30 seconds to 240 seconds.

Preferably, the cooling stop temperature in reheat type continuous annealing is 100° C. to 340° C. and the holding time is 5 seconds to 60 seconds. In the process of this cooling, part of the austenite is transformed to martensite and the strength of the steel material is increased. If the cooling stop temperature is less than 100° C., the amount of transformation to martensite becomes excessive and the ductility and bending resistance of the steel material are impaired. For this reason, the lower limit of the cooling stop temperature is preferably 100° C. or more. If the cooling stop temperature exceeds 340° C. or the holding time is less than 5 seconds, only a small amount of martensite is obtained and it becomes difficult to increase the strength of the steel. Therefore, the upper limit of the cooling stop temperature is 340° C. or less and the lower limit of the holding time is 5 seconds or more. Further, even if holding for over 60 seconds, no large change occurs structurally, so the upper limit of the holding time is preferably 60 seconds. More preferably, the temperature is 150° C. to 320° C. and the holding time is 6 seconds to 50 seconds.

Preferably, the temperature in the overaging zone in reheat type continuous annealing is 350° C. to 480° C. and the holding time is 50 seconds to 500 seconds. In the overaging zone, by using some of the martensite formed at the time of stopping cooling as nuclei and promoting transformation of the balance of austenite to bainite and suitably controlling the amount and morphology of the residual austenite, an excellent bending resistance is obtained. If the aging temperature is less than 350° C. and the holding time is less than 50° C., the amount of transformation of bainite is insufficient. Further, if the aging temperature is 480° C. or more and the holding time is less than 500 seconds, the amount of residual austenite remarkably falls, so the bending resistance can no longer be simultaneously realized. For this reason, the temperature in the overaging zone in reheat type continuous annealing is preferably 350° C. to 480° C. and the holding time is 50 seconds to 500 seconds. The more preferable temperature is 380° C. to 460° C. and the holding time is 60 seconds to 400 seconds.

According to the above method of production of the present invention, it is possible to produce steel sheet comprising steel sheet on one or both surfaces of which a hard layer with an average micro-Vickers hardness of 400 HV or more and less than 800 HV is formed, controlled to an average micro-Vickers hardness of the inner layer of 350 HV to a value 50 HV or more smaller than the hardness of the hard layer and a screw dislocation density of the inner layer of $2.0 \times 10^{13}$ m/m$^3$ or more, and having excellent bending resistance. According to the method of production of the present invention, it is possible to produce steel sheet with a residual plastic strain in the above-mentioned residual plastic strain test of 0.1% or less.

EXAMPLES

Next, working examples is used to explain the effect of the present invention.

The levels of the examples are illustrations of the conditions employed for confirming the workability and effects of the present invention. The present invention is not limited to this illustration of conditions. The present invention is assumed to be able to employ various conditions so long as not departing from the gist of the present invention and achieving the object of the present invention.

Example Nos. 1 to 113

Slabs having the compositions of Compositions A to BA of Table 1-1 and Table 1-2 were produced by the continuous casting method. The produced slabs of the compositions were used to form multiple layers of the "layer configurations" of Table 2-1 to Table 2-6 in the order of the "top layer", "center layer", and "bottom layer" to produce stacked slabs of two-layer structures or three-layer structures. The obtained stacked slabs were heated and worked by a hot rolling step, finish rolling step, ROT cooling step, and coiling step under the following conditions. The multilayer steel sheets after the coiling step were rolled by skin pass rolling under the following conditions to produce the multilayer steel sheets as the final products of Example Nos. 1 to 113. The item "top layer" and "bottom layer" of Table 2-1 to Table 2-6 respectively refer to layers formed at the top surface and bottom surface of the inner layer (item "center" in Table 2-1 to Table 2-6).

Production Conditions

Heating condition at time of hot rolling step of stacked slab: Holding at 1200° C. for 50 minutes Finish rolling temperature of stacked slab: 920° C.

ROT cooling rate: 55° C./s

Coiling temperature: 220° C.

Elongation rate of multilayer steel sheet at time of skin pass rolling step: 0.3%

Thickness of multilayer steel sheet as final product: 2.4 mm

Thicknesses of top layer and bottom layer: 480 μm (⅕ of sheet thickness)

The multilayer steel sheets of Example Nos. 1 to 113 were measured for the difference in hardness of the top layer and center layer, the difference in hardness of the bottom layer and center layer, the tensile strength, the screw dislocation density, the bending resistance, and the fatigue resistance.

The fatigue resistance, as explained before, was determined by fabricating Schenk type test pieces from the multilayer steel sheets, giving $10^4$ times or more repeated plane bending to the test pieces by a load stress of 0.5 time the tensile strength, then judging any fatigue fracture (fracture) by a strain gauge. If the number of repetitions until fracture exceeded $10^4$ times, the sample was judged to be good (passing) while if the number was $10^4$ times or less, it was judged to be poor (failing).

Further, the bending resistance was determined by fabricating Schenk type test pieces from the examples of Table 2-4 to Table 2-6, attaching strain gauges to the surfaces of the test pieces in a state of no stress, then giving $10^3$ repeated plane bending by a load stress of 0.5 time the tensile strength, detaching the test pieces from the tester, then measuring the residual plastic strain. If the residual plastic strain was 0.1% or less, it was judged that the plastic deformation due to the repeated bending was suppressed and the bending resistance was excellent and the case was indicated as "good". Further, if the residual plastic strain exceeded 0.1%, it was judged that the plastic deformation due to the repeated bending could not be suppressed and the case was indicated as "poor".

It is clear that among the examples of Table 2-4 to Table 2-6, in all of the examples with a content of C in the center layer (inner layer) more than the content of C in the top layer or the bottom layer and examples with a content of Mn in the inner layer more than the content of Mn in the top layer or the bottom layer, the bending resistances were "poor".

The invention steels all had standard deviations of nano-hardness of the hard layers of 2.0 or less.

Further, the Multilayer Steel Sheet Nos. 15 and 26 and No. 99 of the comparative examples had hardnesses of both the inner layers and hard layers satisfying the requirements of the present invention and had screw dislocation densities of the inner layers satisfying the requirement of the present invention, yet despite this, the bending resistances were "poor". The reason is believed to be that the Multilayer Steel Sheet Nos. 15 and 26 and No. 99 have contents of C and Mn in the hard layers lower than the contents of C and Mn in the inner layers, so it became difficult to suppress the occurrence of micro-yield in the hard layers. In this way, in addition to the above-mentioned requirement of the average micro-Vickers hardnesses of the hard layer and the inner layer and the requirement of the screw dislocation density of the inner layer, making the contents of C and Mn in the hard layer greater than C and Mn in the inner layer is essential for obtaining the effect of the present invention.

The bottom layers of the comparative examples of the Multilayer Steel Sheet Nos. 17 and 32 are the steel sheets of Composition I. The carbon content of the Steel Sheet I is high, so the hardnesses of the bottom layers of the Multilayer Steel Sheet Nos. 17 and 32 all exceeded 800 HV. For this reason, the Multilayer Steel Sheet Nos. 17 and 32 both became susceptible to brittle fracture and the bending resistances dropped.

In Example Nos. 1 to 113, the "hardness difference" and "screw dislocation density" were studied for all of the examples other than Example Nos. 15, 26, and 99. The results are shown in FIG. 1. From the positions of the comparative examples "x" and the invention example "o" in FIG. 1, it is clear that to improve the bending resistance, the screw dislocation density of the inner layer has to be $2.0 \times 10^{13}$ m/m$^3$ or more and the hardness difference between the top layer and the center layer has to be 50 HV or more.

Example Nos. 114 to 126

To investigate the effects of the thickness of the top and bottom layers (hard layers) on the bending resistance and fatigue resistance, stacked slabs were produced while changing the thicknesses of the top and bottom layers of the layer configurations of the examples with bending resistances and fatigue resistances all "good" in Table 2-4 to Table 2-6. The stacked slabs were used to produce multilayer steel sheets of Example Nos. 114 to 126 under the same production conditions as Example Nos. 1 to 113. Further, the thicknesses of the multilayer steel sheets of Example Nos. 114 to 126 were all 2.4 mm. The multilayer steel sheets of Example Nos. 114 to 126 had the layer configurations shown in Table 3. Slabs of the invention steel having the steel compositions of the above-mentioned optimal chemical ingredients in Compositions A to BA of Table 1-1 and Table 1-2 were used for production.

The column of the item "Target thickness of top/bottom layers" of Table 3 shows the target values of the ratios of the thicknesses of the top layers and bottom layers with respect to the sheet thicknesses which were set at the time of production. Further, the item "Actual thickness" of Table 3 shows the actual thicknesses of the bottom layers and top layers of the multilayer steel sheets of Example Nos. 114 to 126. As evidenced by Example Nos. 114 to 116 of Table 3, if the thickness of the hard layer is less than 20 μm and the total of the thicknesses of hard layers is less than 1/100 of the total sheet thickness, the bending resistance is insufficient. Further, it is clear that even if the thickness of the hard layer is 20 μm or more, if the total of the thicknesses of hard layers exceeds 2/5 of the total sheet thickness, the bending resistance becomes insufficient.

Example Nos. 127 to 169

To investigate the effects of the hot rolling conditions on the bending resistance and fatigue resistance, slabs of the invention steel in Compositions A to BA of Table 1-1 and Table 1-2 were used to produce multilayer steel sheets of Example Nos. 127 to 169 under the hot rolling conditions shown in Table 4-1 to Table 4-2. The multilayer steel sheets of Example Nos. 127 to 169 have the layer configurations shown in Table 4-1 and Table 4-2. Except for Example No. 147 of the multilayer steel sheet with a hard layer formed on only one surface, the same types of slabs were used to configure the top layers and bottom layers. In each of Example Nos. 127 to 169, the sheet thickness was 2.4 mm and the thicknesses of the top layer and bottom layer were 240 μm (1/10 of sheet thickness).

As evidenced by Example No. 132, it is clear that even if the contents of C and Mn in the hard layer are more than the contents of C and Mn in the inner layer, if the coiling temperature exceeds 700° C., the difference in hardness of the hard layer and the inner layer becomes less than 50 Hv and the screw dislocation density becomes less than $2.0 \times 10^{13}$ m/m$^3$, so the bending resistance becomes insufficient. Further, as evidenced by Example Nos. 138 and 157, it is clear that even if the contents of C and Mn in the hard layer are more than the contents of C and Mn in the inner layer, if the finish hot rolling temperature is less than 650° C. or over 950° C., the difference in hardness of the hard layer and the inner layer becomes less than 50 Hv and the screw dislocation density becomes less than $2.0 \times 10^{13}$ m/m$^3$, so the bending resistance becomes insufficient. Further, as evidenced by Example No. 154, it is clear that even if the contents of C and Mn in the hard layer are more than the contents of C and Mn in the inner layer, if the skin pass rolling has an elongation rate of less than 0.1%, the screw dislocation density becomes less than $2.0 \times 10^{13}$ m/m$^3$, so the bending resistance becomes insufficient.

Example Nos. 170 to 192

In the Compositions A to BA of Table 1-1 and Table 1-2, slabs of the invention steels were used to produce multilayer steel sheets of Example Nos. 170 to 192 having the layer configurations shown in Table 5-1. Except for Example No. 179 of the multilayer steel sheet with a hard layer formed at only one surface, the multilayer steel sheets shown in Table 5-1 had top layers and bottom layers formed using the same types of slabs. In each of the multilayer steel sheets of Examples Nos. 170 to 192, the thickness at the time of coiling was 2.4 mm and the thicknesses of the top layer and bottom layer were 240 μm. After the coiling step, the multilayer steel sheets were pickled, then were treated by hot rolled annealing, cold rolling, and cold rolled annealing under the conditions of Table 5-2, then were rolled by skin pass rolling with an elongation rate of 0.3% to thereby produce the multilayer steel sheets of Example Nos. 170 to 192.

Figure 2:
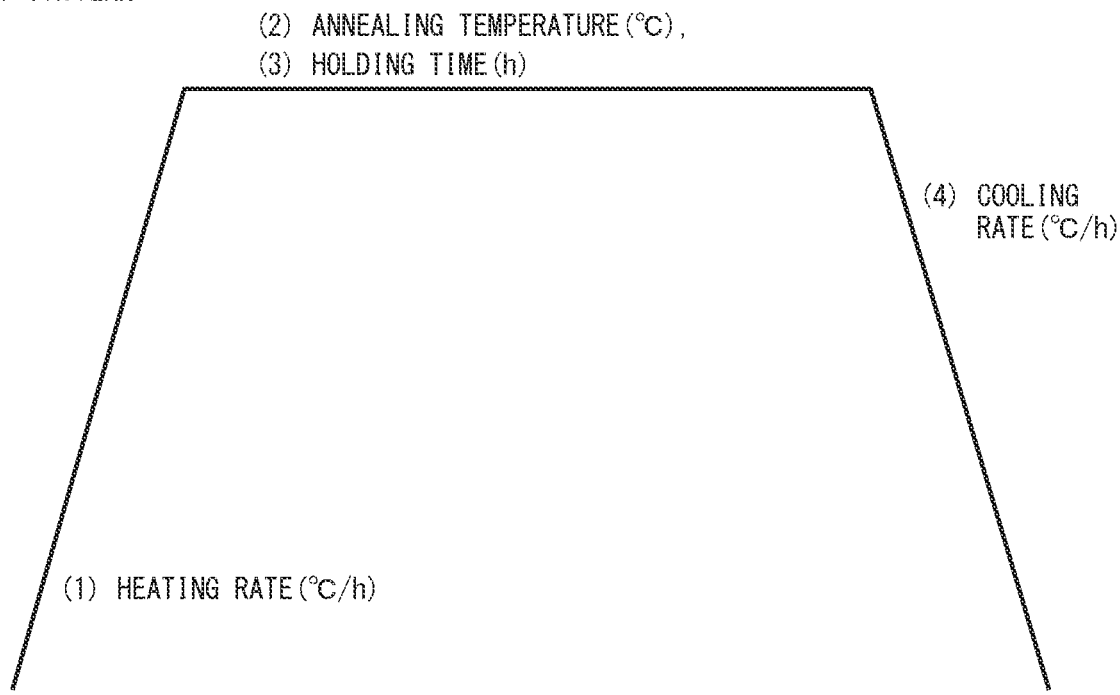
FIG. 2 is a view showing an annealing pattern of box annealing suitable for hot rolled annealing before cold rolling.
Figure 3:
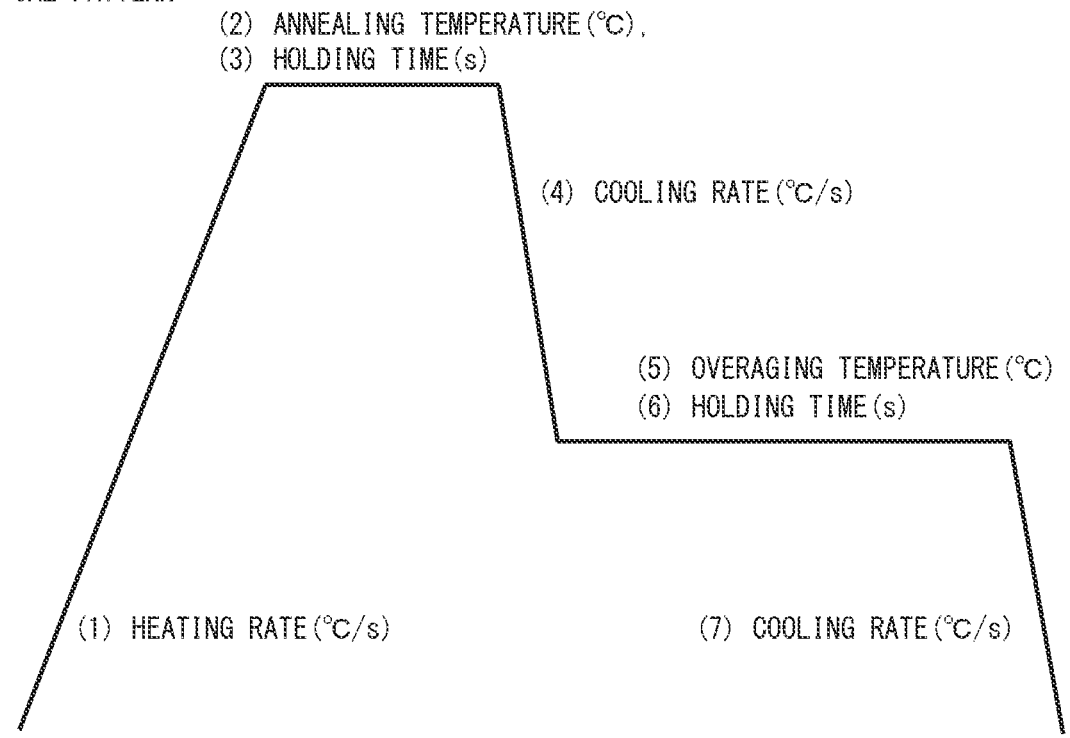
FIG. 3 is a view showing an annealing pattern of continuous annealing suitable for hot rolled annealing before cold rolling and cold rolled annealing after cold rolling.

The pattern "BAF" of Table 5-2 shows the performance of box annealing by the annealing pattern shown in FIG. 2. The specific values of (1) heating rate (° C./h), (2) annealing temperature (° C.), (3) holding time (hr), and (4) cooling rate (° C./h) indicated in FIG. 2 were respectively shown in the conditions (1) to (4) corresponding to the column of the pattern "BAF" of Table 5-2. Further, the pattern "C-CAL" of Table 5-2 shows continuous annealing by the annealing pattern shown in FIG. 3. The specific values of (1) heating rate (° C./h), (2) annealing temperature (° C.), (3) holding time (hr), (4) cooling rate (° C./h), (5) over-aging temperature (° C.), (6) holding time (s), and (7) cooling rate (° C./s) indicated in FIG. 3 were respectively shown in the conditions (1) to (7) corresponding to the column of the pattern "C-CAL" of Table 5-2. Further, the pattern "R-CAL" of Table 5-2 shows performance of continuous annealing by the annealing pattern shown in FIG. 4. The specific values of (1) heating rate (° C./h), (2) annealing temperature (° C.), (3) holding time (hr), (4) cooling rate (° C./h), (5) cooling stop temperature (° C.), (6) holding time (s), (7) heating rate (° C./s), (8) over-aging temperature (° C.), (9) holding time (s), and (10) cooling rate (° C./s) indicated in FIG. 4 were respectively shown in the conditions (1) to (10) corresponding to the column of the pattern "R-CAL" of Table 5-2.

Under the manufacturing conditions shown in Table 5-1 and Table 5-2, the multilayer steel sheets of Example Nos. 170 to 192 were formed into the metal structures shown in Table 5-3. These examples all show manufacture under suitable conditions. As shown in Table 5-4, the bending resistances and the fatigue resistances were excellent.

Example Nos. 193 to 215

Stacked slabs having the same layer configurations as the multilayer steel sheets of Example Nos. 170 to 192 of Table 5-1 were produced. The obtained stacked slabs were worked by a hot rolling step, finish rolling step, ROT cooling step, and coiling step under the same manufacturing conditions as Example Nos. 1 to 113 and further bright annealed and plated under the conditions shown in Table 6-1, then were skin pass rolled with an elongation rate of 0.3% to produce the multilayer steel sheets of Example Nos. 193 to 215. The item "Plating species" of Table 6-1 shows the compositions of the plating layers formed on the surfaces of Example Nos. 193 to 215. The thicknesses of the plating species were 12 μm or so. Further, the item "Alloying" of Table 6-1 shows whether the plated layer and the top layer and/or bottom layer were alloyed or were not alloyed. Except for Example No. 202 of the multilayer steel sheet with a hard layer formed at only one surface, the multilayer steel sheets shown in Table 6-1 and Table 6-2 had top layers and bottom layers made using the same types of slabs (item of "Top/bottom layer" of Table 6-1). Further, the thicknesses of the multilayer steel sheets of Example Nos. 193 to 215 were 2.4 mm while the thicknesses of the top layers and bottom layers were 240 μm (1/10 of sheet thicknesses).

Table 6-2 shows the results of measurement of the hardness of the hard layer, hardness of the center layer, screw dislocation density, bending resistance, etc. of the multilayer steel sheets of Examples Nos. 193 to 215. In each of the multilayer steel sheets of Examples Nos. 193 to 215, the average micro-Vickers hardness of the hard layer was 400 HV or more and less than 800 HV, the average micro-Vickers hardness of the inner layer was 350 HV or more and was 50 HV or more smaller than the average micro-Vickers hardness of the hard layer, and the screw dislocation density of the inner layer was $2.0 \times 10^{13}$ m/m$^3$ or more. The multilayer steel sheet of these examples were all excellent in bending resistance and fatigue resistance.

TABLE 1-1

| | Constituents (mass %) | | | | | | | | | | | | |
|---|---|---|---|---|---|---|---|---|---|---|---|---|---|
| Comp. | C | Si | Mn | P | S | Al | N | Cr | Mo | O | Ti | B | Remarks |
| A | 0.119 | 1.68 | 2.12 | 0.0109 | 0.0027 | 0.084 | 0.0081 | 0.039 | 0.056 | 0.0019 | 0.064 | 0.0009 | Inv. steel |
| B | 0.198 | 1.64 | 2.32 | 0.0147 | 0.0099 | 0.006 | 0.0036 | 0.051 | 0.033 | 0.0014 | 0.018 | 0.0016 | Inv. steel |
| C | 0.234 | 0.25 | 1.25 | 0.0034 | 0.0008 | 0.047 | 0.0045 | 0.201 | 0.043 | 0.003 | 0.029 | 0.0002 | Inv. steel |
| D | 0.288 | 0.44 | 5.66 | 0.0040 | 0.0133 | 0.012 | 0.0033 | 0.098 | 0.043 | 0.0038 | 0.040 | 0.0018 | Inv. steel |
| E | 0.082 | 0.45 | 2.27 | 0.0109 | 0.0088 | 0.023 | 0.0067 | 0.042 | 0.020 | 0.0029 | 0.021 | 0.0012 | |
| F | 0.307 | 0.21 | 1.73 | 0.0103 | 0.0071 | 0.021 | 0.0082 | 0.232 | 0.043 | 0.0044 | 0.002 | 0.0023 | Inv. steel |
| G | 0.324 | 0.42 | 8.92 | 0.0184 | 0.0195 | 0.481 | 0.0180 | 0.383 | 0.623 | 0.0074 | 0.024 | 0.0090 | Inv. steel |
| H | 0.325 | 1.07 | 4.37 | 0.0062 | 0.0200 | 0.021 | 0.0080 | 0.517 | 0.529 | 0.0098 | 0.232 | 0.0089 | Inv. steel |
| I | 0.619 | 1.66 | 2.46 | 0.0177 | 0.0018 | 0.043 | 0.0011 | 0.121 | 0.034 | 0.0017 | 0.024 | 0.0007 | |
| J | 0.326 | 1.62 | 3.06 | 0.0092 | 0.0008 | 0.008 | 0.0151 | 0.056 | 0.042 | 0.0007 | 0.033 | 0.0013 | Inv. steel |
| K | 0.302 | 3.13 | 1.07 | 0.0095 | 0.0123 | 0.033 | 0.0081 | 0.291 | 0.028 | 0.0013 | 0.042 | 0.0021 | |
| L | 0.358 | 2.97 | 9.59 | 0.0070 | 0.0062 | 0.375 | 0.0111 | 1.308 | 0.535 | 0.0078 | 0.204 | 0.0023 | Inv. steel |
| M | 0.387 | 0.78 | 2.77 | 0.0070 | 0.0151 | 0.396 | 0.0189 | 1.828 | 0.763 | 0.0008 | 0.151 | 0.0077 | Inv. steel |
| N | 0.239 | 0.08 | 10.27 | 0.0112 | 0.0088 | 0.049 | 0.0041 | 0.118 | 0.071 | 0.0024 | 0.041 | 0.0021 | |
| O | 0.360 | 1.37 | 0.83 | 0.0024 | 0.0093 | 0.036 | 0.0047 | 0.105 | 0.069 | 0.0058 | 0.022 | 0.0016 | |
| P | 0.389 | 0.04 | 4.62 | 0.0177 | 0.0162 | 0.021 | 0.0041 | 0.125 | 0.075 | 0.0038 | 0.026 | 0.0019 | Inv. steel |
| Q | 0.358 | 1.37 | 2.26 | 0.0225 | 0.0025 | 0.024 | 0.0099 | 0.084 | 0.071 | 0.0053 | 0.018 | 0.0009 | |
| R | 0.408 | 0.77 | 2.84 | 0.0101 | 0.0210 | 0.039 | 0.0078 | 0.094 | 0.034 | 0.0066 | 0.032 | 0.0011 | |
| S | 0.498 | 0.10 | 6.84 | 0.0143 | 0.0066 | 0.518 | 0.0048 | 1.345 | 0.665 | 0.0173 | 0.371 | 0.0091 | |
| T | 0.375 | 1.89 | 4.57 | 0.0078 | 0.0067 | 0.307 | 0.0280 | 1.739 | 0.926 | 0.0082 | 0.295 | 0.0030 | |
| U | 0.388 | 2.25 | 1.93 | 0.0064 | 0.0005 | 0.005 | 0.0065 | 2.055 | 0.139 | 0.0147 | 0.470 | 0.0010 | |
| V | 0.411 | 2.67 | 4.72 | 0.0173 | 0.0065 | 0.327 | 0.0137 | 1.117 | 1.046 | 0.0034 | 0.100 | 0.0044 | |

TABLE 1-1-continued

| | Constituents (mass %) | | | | | | | | | | | | |
|---|---|---|---|---|---|---|---|---|---|---|---|---|---|
| Comp. | C | Si | Mn | P | S | Al | N | Cr | Mo | O | Ti | B | Remarks |
| W | 0.423 | 2.58 | 6.36 | 0.0171 | 0.0165 | 0.268 | 0.0044 | 0.764 | 0.297 | <u>0.0209</u> | 0.122 | 0.0026 | |
| X | 0.475 | 2.49 | 3.80 | 0.0153 | 0.0031 | 0.377 | 0.0078 | 1.485 | 0.826 | 0.0025 | <u>0.538</u> | 0.0087 | |
| Y | 0.421 | 1.88 | 9.35 | 0.0024 | 0.0146 | 0.092 | 0.0094 | 1.993 | 0.887 | 0.0143 | 0.153 | <u>0.0117</u> | |
| Z | 0.424 | 0.94 | 8.26 | 0.0019 | 0.0030 | 0.493 | 0.0086 | 0.303 | 0.693 | 0.0030 | 0.249 | 0.0003 | |
| AA | 0.327 | 2.63 | 3.20 | 0.0190 | 0.0197 | 0.184 | 0.0182 | 1.927 | 0.835 | 0.0041 | 0.291 | 0.0026 | |
| AB | 0.430 | 1.10 | 3.26 | 0.0081 | 0.0114 | 0.150 | 0.0068 | 1.853 | 0.272 | 0.0055 | 0.193 | 0.0021 | |
| AC | 0.362 | 0.67 | 5.32 | 0.0164 | 0.0047 | 0.185 | 0.0051 | 1.504 | 0.227 | 0.0017 | 0.066 | 0.0036 | |
| AD | 0.342 | 1.43 | 4.00 | 0.0003 | 0.0022 | 0.196 | 0.0108 | 1.853 | 0.630 | 0.0133 | 0.129 | 0.0027 | |
| AE | 0.308 | 2.61 | 2.33 | 0.0166 | 0.0140 | 0.266 | 0.0077 | 1.860 | 0.025 | 0.0014 | 0.112 | 0.0069 | |
| AF | 0.352 | 1.55 | 9.11 | 0.0094 | 0.0040 | 0.163 | 0.0058 | 0.511 | 0.778 | 0.0111 | 0.329 | 0.0052 | |
| AG | 0.388 | 1.08 | 5.12 | 0.0056 | 0.0198 | 0.361 | 0.0065 | 0.436 | 0.951 | 0.0199 | 0.017 | 0.0034 | |
| AH | 0.454 | 2.34 | 8.43 | 0.0163 | 0.0007 | 0.232 | 0.0083 | 0.340 | 0.357 | 0.0143 | 0.037 | 0.0086 | |
| AI | 0.316 | 1.98 | 9.51 | 0.0086 | 0.0133 | 0.290 | 0.0080 | 1.359 | 0.172 | 0.0030 | 0.282 | 0.0036 | |
| AJ | 0.478 | 1.89 | 4.45 | 0.0038 | 0.0149 | 0.434 | 0.0132 | 0.344 | 0.537 | 0.0131 | 0.046 | 0.0073 | |
| AK | 0.386 | 2.22 | 9.54 | 0.0088 | 0.0189 | 0.452 | 0.0131 | 0.779 | 0.709 | 0.0173 | 0.205 | 0.0010 | |
| AL | 0.322 | 0.5 | 5.16 | 0.0095 | 0.0052 | 0.288 | 0.0009 | 0.262 | 0.094 | 0.0195 | 0.109 | 0.0014 | |
| AM | 0.470 | 1.44 | 8.13 | 0.0145 | 0.0032 | 0.145 | 0.0161 | 1.609 | 0.894 | 0.0084 | 0.202 | 0.0015 | |
| AN | 0.312 | 1.93 | 3.44 | 0.0019 | 0.0147 | 0.403 | 0.0105 | 1.450 | 0.701 | 0.0142 | 0.440 | 0.0075 | |
| AO | 0.395 | 1.69 | 8.77 | 0.0200 | 0.0056 | 0.093 | 0.0091 | 1.579 | 0.490 | 0.0198 | 0.302 | 0.0052 | Inv. steel |
| AP | 0.400 | 2.25 | 4.88 | 0.0140 | 0.0095 | 0.111 | 0.0128 | 1.398 | 0.414 | 0.0128 | 0.161 | 0.0047 | Inv. steel |
| AQ | 0.408 | 2.85 | 7.44 | 0.0191 | 0.0045 | 0.314 | 0.0062 | 0.999 | 06.34 | 0.0096 | 0.453 | 0.0096 | Inv. steel |
| AR | 0.415 | 0.10 | 4.84 | 0.0066 | 0.0138 | 0.309 | 0.0102 | 1.597 | 0.662 | 0.0148 | 0.046 | 0.0060 | Inv. steel |
| AS | 0.430 | 2.32 | 9.67 | 0.0159 | 0.0003 | 0.018 | 0.0037 | 0.107 | 0.092 | 0.0017 | 0.045 | 0.0013 | Inv. steel |
| AT | 0.430 | 2.69 | 1.17 | 0.0085 | 0.0175 | 0.118 | 0.0020 | 0.488 | 0.200 | 0.0055 | 0.209 | 0.0060 | Inv. steel |
| AU | 0.437 | 2.92 | 4.86 | 0.0106 | 0.0003 | 0.236 | 0.0149 | 0.728 | 0.764 | 0.0164 | 0.097 | 0.0028 | Inv. steel |
| AV | 0.451 | 0.95 | 9.42 | 0.0008 | 0.0008 | 0.402 | 0.0066 | 0.776 | 0.644 | 0.0039 | 0.346 | 0.0023 | Inv. steel |
| AW | 0.470 | 2.14 | 8.18 | 0.0133 | 0.0100 | 0.454 | 0.0006 | 1.201 | 0.456 | 0.0078 | 0.482 | 0.0085 | Inv. steel |
| AX | 0.470 | 0.35 | 6.38 | 0.0066 | 0.0067 | 0.157 | 0.0172 | 0.492 | 0.692 | 0.0144 | 0.383 | 0.0095 | Inv. steel |
| AY | 0.473 | 0.83 | 2.30 | 0.0141 | 0.0119 | 0.037 | 0.0017 | 0.036 | 0.064 | 0.022 | 0.034 | 0.0017 | Inv. steel |
| AZ | 0.544 | 2.75 | 7.37 | 0.0029 | 0.0178 | 0.038 | 0.0092 | 0.136 | 0.081 | 0.0016 | 0.047 | 0.0016 | Inv. steel |
| BA | 0.581 | 1.28 | 1.15 | 0.0023 | 0.0103 | 0.043 | 0.0058 | 0.151 | 0.021 | 0.0016 | 0.076 | 0.0017 | Inv. steel |

\* Underlines show not included in optimum range of composition of present invention.
\* "Inv. steel" shows steel included in optimum range of composition of present invention.

TABLE 1-2

| | Constituents (mass %) | | | | | | | | | | | | | |
|---|---|---|---|---|---|---|---|---|---|---|---|---|---|---|
| Comp. | Nb | V | Cu | W | Ta | Ni | Sn | Sb | As | Mg | Ca | Y | Zr | La | Ce |
| A | 0.016 | 0.008 | 0.021 | 0.065 | 0.080 | 0.016 | 0.012 | 0.010 | 0.001 | 0.0015 | 0.008 | 0.004 | 0.017 | 0.006 | 0.015 |
| B | 0.011 | 0.035 | 0.004 | 0.020 | 0.012 | 0.007 | 0.003 | 0.009 | 0.004 | 0.0014 | 0.003 | 0.002 | 0.004 | 0.002 | 0.004 |
| C | 0.006 | 0.024 | 0.002 | 0.003 | 0.015 | 0.011 | 0.007 | 0.009 | 0.006 | 0.0039 | 0.003 | 0.002 | 0.005 | 0.001 | 0.004 |
| D | 0.037 | 0.023 | 0.045 | 0.016 | 0.039 | 0.021 | 0.023 | 0.004 | 0.002 | 0.0018 | 0.011 | 0.001 | 0.009 | 0.017 | 0.006 |
| E | 0.030 | 0.025 | 0.003 | 0.016 | 0.015 | 0.001 | 0.005 | 0.001 | 0.010 | 0.0012 | 0.002 | 0.003 | 0.002 | 0.002 | 0.002 |
| F | 0.033 | 0.017 | 0.016 | 0.011 | 0.004 | 0.013 | 0.008 | 0.008 | 0.002 | 0.0005 | 0.002 | 0.003 | 0.005 | 0.001 | 0.005 |
| G | 0.127 | 0.453 | 0.313 | 0.002 | 0.050 | 0.206 | 0.016 | 0.021 | 0.028 | 0.0093 | 0.004 | 0.045 | 0.046 | 0.048 | 0.036 |
| H | 0.045 | 0.016 | 0.022 | 0.039 | 0.067 | 0.428 | 0.043 | 0.039 | 0.037 | 0.0464 | 0.046 | 0.002 | 0.043 | 0.038 | 0.005 |
| I | 0.026 | 0.085 | 0.012 | 0.013 | 0.045 | 0.018 | 0.021 | 0.023 | 0.003 | 0.0015 | 0.003 | 0.011 | 0.002 | 0.014 | 0.014 |
| J | 0.035 | 0.026 | 0.008 | 0.008 | 0.005 | 0.003 | 0.008 | 0.007 | 0.010 | 0.0021 | 0.004 | 0.001 | 0.002 | 0.004 | 0.004 |
| K | 0.026 | 0.016 | 0.015 | 0.015 | 0.044 | 0.019 | 0.023 | 0.015 | 0.003 | 0.0035 | 0.004 | 0.017 | 0.005 | 0.009 | 0.012 |
| L | 0.021 | 0.025 | 0.023 | 0.009 | 0.005 | 0.013 | 0.014 | 0.012 | 0.015 | 0.0017 | 0.013 | 0.006 | 0.008 | 0.013 | 0.008 |
| M | 0.485 | 0.081 | 0.037 | 0.063 | 0.037 | 0.021 | 0.032 | 0.048 | 0.004 | 0.0251 | 0.023 | 0.018 | 0.034 | 0.009 | 0.032 |
| N | 0.036 | 0.063 | 0.047 | 0.008 | 0.047 | 0.028 | 0.034 | 0.017 | 0.015 | 0.0011 | 0.002 | 0.013 | 0.004 | 0.016 | 0.014 |
| O | 0.043 | 0.041 | 0.019 | 0.007 | 0.013 | 0.029 | 0.027 | 0.025 | 0.004 | 0.0044 | 0.009 | 0.009 | 0.002 | 0.013 | 0.014 |
| P | 0.037 | 0.011 | 0.027 | 0.026 | 0.027 | 0.035 | 0.016 | 0.031 | 0.009 | 0.0018 | 0.003 | 0.016 | 0.019 | 0.013 | 0.013 |
| Q | 0.035 | 0.018 | 0.020 | 0.015 | 0.068 | 0.046 | 0.024 | 0.027 | 0.009 | 0.0025 | 0.016 | 0.021 | 0.011 | 0.003 | 0.006 |
| R | 0.019 | 0.043 | 0.026 | 0.009 | 0.077 | 0.014 | 0.015 | 0.031 | 0.003 | 0.0005 | 0.004 | 0.019 | 0.016 | 0.004 | 0.009 |
| S | 0.030 | 0.218 | 0.327 | 0.083 | 0.037 | 0.444 | 0.021 | 0.020 | 0.028 | 0.0308 | 0.001 | 0.030 | 0.030 | 0.040 | 0.047 |
| T | 0.344 | 0.057 | 0.371 | 0.061 | 0.022 | 0.069 | 0.005 | 0.021 | 0.025 | 0.0017 | 0.028 | 0.032 | 0.012 | 0.012 | 0.005 |
| U | 0.175 | 0.496 | 0.369 | 0.024 | 0.081 | 0.390 | 0.018 | 0.040 | 0.012 | 0.0124 | 0.033 | 0.045 | 0.049 | 0.024 | 0.006 |
| V | 0.087 | 0.024 | 0.417 | 0.011 | 0.009 | 0.354 | 0.041 | 0.030 | 0.043 | 0.0007 | 0.037 | 0.046 | 0.019 | 0.040 | 0.045 |
| W | 0.385 | 0.490 | 0.100 | 0.068 | 0.002 | 0.151 | 0.040 | 0.005 | 0.041 | 0.0008 | 0.038 | 0.008 | 0.036 | 0.010 | 0.002 |
| X | 0.496 | 0.213 | 0.211 | 0.029 | 0.084 | 0.083 | 0.043 | 0.037 | 0.046 | 0.0147 | 0.006 | 0.007 | 0.026 | 0.034 | 0.032 |
| Y | 0.424 | 0.020 | 0.278 | 0.003 | 0.072 | 0.476 | 0.010 | 0.010 | 0.016 | 0.0415 | 0.035 | 0.040 | 0.024 | 0.027 | 0.015 |
| Z | <u>0.551</u> | 0.069 | 0.488 | 0.098 | 0.042 | 0.461 | 0.019 | 0.033 | 0.036 | 0.0362 | 0.020 | 0.028 | 0.034 | 0.023 | 0.001 |
| AA | 0.148 | <u>0.514</u> | 0.484 | 0.093 | 0.060 | 0.091 | 0.010 | 0.034 | 0.002 | 0.0417 | 0.045 | 0.017 | 0.035 | 0.004 | 0.005 |
| AB | 0.337 | 0.159 | <u>0.522</u> | 0.097 | 0.097 | 0.273 | 0.005 | 0.014 | 0.034 | 0.0386 | 0.005 | 0.012 | 0.040 | 0.040 | 0.017 |
| AC | 0.453 | 0.479 | 0.422 | <u>0.129</u> | 0.035 | 0.096 | 0.012 | 0.014 | 0.041 | 0.0165 | 0.011 | 0.004 | 0.038 | 0.008 | 0.014 |
| AD | 0.282 | 0.374 | 0.360 | 0.090 | <u>0.113</u> | 0.432 | 0.037 | 0.046 | 0.034 | 0.0142 | 0.044 | 0.016 | 0.007 | 0.026 | 0.031 |
| AE | 0.370 | 0.450 | 0.221 | 0.077 | 0.025 | <u>0.528</u> | 0.041 | 0.021 | 0.023 | 0.0024 | 0.002 | 0.019 | 0.001 | 0.014 | 0.007 |
| AF | 0.356 | 0.480 | 0.151 | 0.015 | 0.069 | 0.064 | <u>0.056</u> | 0.043 | 0.033 | 0.0019 | 0.042 | 0.046 | 0.041 | 0.042 | 0.025 |
| AG | 0.418 | 0.282 | 0.356 | 0.017 | 0.005 | 0.257 | 0.044 | <u>0.052</u> | 0.009 | 0.0421 | 0.020 | 0.034 | 0.001 | 0.017 | 0.024 |

TABLE 1-2-continued

| | Constituents (mass %) | | | | | | | | | | | | | | |
|---|---|---|---|---|---|---|---|---|---|---|---|---|---|---|---|
| Comp. | Nb | V | Cu | W | Ta | Ni | Sn | Sb | As | Mg | Ca | Y | Zr | La | Ce |
| AH | 0.301 | 0.420 | 0.199 | 0.099 | 0.061 | 0.189 | 0.048 | 0.012 | <u>0.054</u> | 0.0335 | 0.017 | 0.035 | 0.011 | 0.027 | 0.024 |
| AI | 0.446 | 0.016 | 0.103 | 0.072 | 0.096 | 0.422 | 0.047 | 0.033 | 0.029 | <u>0.0550</u> | 0.026 | 0.019 | 0.045 | 0.005 | 0.020 |
| AJ | 0.117 | 0.051 | 0.227 | 0.066 | 0.043 | 0.307 | 0.024 | 0.032 | 0.014 | 0.0087 | <u>0.056</u> | 0.011 | 0.046 | 0.004 | 0.040 |
| AK | 0.423 | 0.458 | 0.204 | 0.011 | 0.048 | 0.425 | 0.002 | 0.036 | 0.003 | 0.0014 | 0.028 | <u>0.057</u> | 0.050 | 0.019 | 0.017 |
| AL | 0.447 | 0.043 | 0.161 | 0.013 | 0.092 | 0.404 | 0.02 | 0.017 | 0.003 | 0.0131 | 0.002 | 0.047 | <u>0.053</u> | 0.036 | 0.005 |
| AM | 0.054 | 0.200 | 0.089 | 0.051 | 0.061 | 0.402 | 0.004 | 0.018 | 0.011 | 0.0304 | 0.010 | 0.021 | 0.028 | <u>0.059</u> | 0.009 |
| AN | 0.116 | 0.177 | 0.226 | 0.084 | 0.002 | 0.311 | 0.048 | 0.032 | 0.031 | 0.0081 | 0.029 | 0.017 | 0.025 | 0.014 | <u>0.056</u> |
| AO | 0.019 | 0.015 | 0.011 | 0.008 | 0.011 | 0.012 | 0.016 | 0.002 | 0.006 | 0.0014 | 0.003 | 0.005 | 0.002 | 0.003 | 0.007 |
| AP | 0.146 | 0.317 | 0.156 | 0.098 | 0.068 | 0.161 | 0.018 | 0.010 | 0.006 | 0.0391 | 0.003 | 0.026 | 0.005 | 0.024 | 0.039 |
| AQ | 0.014 | 0.053 | 0.008 | 0.007 | 0.008 | 0.008 | 0.013 | 0.004 | 0.002 | 0.0012 | 0.001 | 0.007 | 0.006 | 0.007 | 0.004 |
| AR | 0.046 | 0.012 | 0.038 | 0.012 | 0.015 | 0.009 | 0.006 | 0.003 | 0.007 | 0.0011 | 0.009 | 0.012 | 0.005 | 0.005 | 0.008 |
| AS | 0.017 | 0.026 | 0.037 | 0.018 | 0.017 | 0.032 | 0.014 | 0.017 | 0.006 | 0.0021 | 0.009 | 0.016 | 0.007 | 0.013 | 0.013 |
| AT | 0.028 | 0.015 | 0.021 | 0.009 | 0.007 | 0.007 | 0.009 | 0.005 | 0.013 | 0.0008 | 0.008 | 0.017 | 0.004 | 0.006 | 0.015 |
| AU | 0.015 | 0.023 | 0.476 | 0.096 | 0.056 | 0.428 | 0.003 | 0.022 | 0.031 | 0.0382 | 0.004 | 0.004 | 0.014 | 0.018 | 0.044 |
| AV | 0.026 | 0.019 | 0.014 | 0.016 | 0.007 | 0.006 | 0.013 | 0.013 | 0.003 | 0.0007 | 0.006 | 0.008 | 0.013 | 0.016 | 0.017 |
| AW | 0.054 | 0.031 | 0.015 | 0.004 | 0.006 | 0.014 | 0.004 | 0.016 | 0.009 | 0.0006 | 0.016 | 0.013 | 0.004 | 0.006 | 0.011 |
| AX | 0.086 | 0.024 | 0.006 | 0.018 | 0.010 | 0.347 | 0.024 | 0.035 | 0.045 | 0.0342 | 0.040 | 0.028 | 0.027 | 0.018 | 0.015 |
| AY | 0.040 | 0.037 | 0.044 | 0.001 | 0.089 | 0.044 | 0.010 | 0.020 | 0.002 | 0.0023 | 0.007 | 0.005 | 0.006 | 0.019 | 0.014 |
| AZ | 0.056 | 0.015 | 0.043 | 0.031 | 0.036 | 0.022 | 0.021 | 0.019 | 0.013 | 0.0013 | 0.003 | 0.012 | 0.002 | 0.019 | 0.008 |
| BA | 0.035 | 0.031 | 0.042 | 0.009 | 0.089 | 0.037 | 0.014 | 0.013 | 0.014 | 0.0028 | 0.007 | 0.015 | 0.018 | 0.018 | 0.012 |

* Underlines show not included in optimum range of composition of present invention.

TABLE 2-1

| Ex. no. | Layer configuration | | | Top layer | | | | | | | Center layer | | | | | | | Bottom layer | | | | | | |
|---|---|---|---|---|---|---|---|---|---|---|---|---|---|---|---|---|---|---|---|---|---|---|---|---|
| | | | | Ratios of structures | | | | | | | Ratios of structures | | | | | | | Ratios of structures | | | | | | |
| | Top | Center | Bottom | Ferrite | Pearlite | Bainite | Martensite | Residual austenite | Carbide volume rate | Hardness (HV) | Ferrite | Pearlite | Bainite | Martensite | Residual austenite | Carbide volume rate | Hardness (HV) | Ferrite | Pearlite | Bainite | Martensite | Residual austenite | Carbide volume rate | Hardness (HV) |
| 1 | A | AZ | B | 0.007 | 0.002 | 0.17 | 0.807 | 0.014 | 0.03 | 400 | 0.007 | 0.001 | 0.042 | 0.432 | 0.518 | 0.02 | 793 | 0.007 | 0.001 | 0.199 | 0.786 | 0.007 | 0.02 | 455 |
| 2 | D | P | J | 0.006 | 0.002 | 0.247 | 0.726 | 0.019 | 0.03 | 531 | 0.007 | 0.011 | 0.233 | 0.718 | 0.031 | 0.17 | 575 | 0.009 | 0.007 | 0.202 | 0.767 | 0.015 | 0.11 | 524 |
| 3 | P | J | AS | 0.007 | 0.011 | 0.233 | 0.718 | 0.031 | 0.17 | 575 | 0.009 | 0.007 | 0.202 | 0.767 | 0.015 | 0.11 | 524 | 0.001 | 0.001 | 0.008 | 0.244 | 0.746 | 0.02 | 791 |
| 4 | AS | C | F | 0.001 | 0.001 | 0.008 | 0.244 | 0.746 | 0.02 | 791 | 0.006 | 0.017 | 0.18 | 0.784 | 0.006 | 0.37 | 404 | 0.006 | 0.017 | 0.176 | 0.786 | 0.015 | 0.26 | 458 |
| 5 | B | A | BA | 0.007 | 0.001 | 0.199 | 0.786 | 0.007 | 0.02 | 455 | 0.005 | 0.003 | 0.17 | 0.807 | 0.014 | 0.03 | 400 | 0.005 | 0.003 | 0.291 | 0.657 | 0.044 | 0.05 | 611 |
| 6 | AZ | D | | 0.007 | 0.001 | 0.042 | 0.432 | 0.518 | 0.02 | 793 | 0.007 | 0.006 | 0.17 | 0.807 | 0.014 | 0.03 | | | | | | | | |
| 7 | BA | B | A | 0.005 | 0.003 | 0.291 | 0.657 | 0.044 | 0.05 | 611 | 0.007 | 0.002 | 0.199 | 0.786 | 0.007 | 0.02 | 455 | 0.007 | 0.002 | 0.17 | 0.807 | 0.014 | 0.03 | 400 |
| 8 | C | AY | AY | 0.006 | 0.024 | 0.18 | 0.784 | 0.006 | 0.37 | 404 | 0.006 | 0.024 | 0.18 | 0.784 | 0.006 | 0.37 | 404 | 0.006 | 0.024 | 0.18 | 0.784 | 0.006 | 0.37 | 404 |
| 9 | J | F | AZ | 0.009 | 0.007 | 0.202 | 0.767 | 0.015 | 0.11 | 524 | 0.004 | 0.028 | 0.211 | 0.735 | 0.022 | 0.43 | 570 | 0.007 | 0.001 | 0.042 | 0.432 | 0.518 | 0.02 | 793 |
| 10 | F | BA | AZ | 0.004 | 0.028 | 0.211 | 0.735 | 0.022 | 0.43 | 570 | 0.005 | 0.001 | 0.291 | 0.657 | 0.044 | 0.05 | 611 | 0.004 | 0.001 | 0.042 | 0.432 | 0.518 | 0.02 | 793 |
| 11 | AY | AS | P | 0.006 | 0.017 | 0.176 | 0.786 | 0.015 | 0.26 | 458 | 0.005 | 0.001 | 0.008 | 0.243 | 0.747 | 0.02 | 791 | 0.007 | 0.011 | 0.233 | 0.718 | 0.031 | 0.17 | 575 |
| 12 | E | P | N | 0.006 | 0.028 | 0.008 | 0.718 | 0.014 | 0.15 | 376 | 0.001 | 0.011 | 0.233 | 0.718 | 0.031 | 0.17 | 575 | 0.009 | 0.001 | 0.032 | 0.839 | 0.119 | 0.17 | 585 |
| 13 | I | J | Q | 0.01 | 0.01 | 0.183 | 0.787 | 0.014 | 0.15 | 376 | 0.007 | 0.001 | 0.233 | 0.718 | 0.015 | 0.11 | 524 | 0.005 | 0.002 | 0.215 | 0.772 | 0.006 | 0.03 | 526 |
| 14 | K | BA | R | 0.004 | 0.012 | 0.187 | 0.788 | 0.009 | 0.18 | 481 | 0.005 | 0.003 | 0.291 | 0.657 | 0.044 | 0.05 | 611 | 0.001 | 0.003 | 0.221 | 0.751 | 0.02 | 0.11 | 557 |
| 15 | N | F | O | 0.009 | 0.001 | 0.032 | 0.839 | 0.119 | 0.18 | 585 | 0.006 | 0.017 | 0.176 | 0.786 | 0.015 | 0.26 | 458 | 0.004 | 0.02 | 0.194 | 0.782 | 0.003 | 0.31 | 512 |
| 16 | O | D | K | 0.001 | 0.02 | 0.194 | 0.782 | 0.003 | 0.31 | 512 | 0.002 | 0.007 | 0.247 | 0.726 | 0.019 | 0.03 | 531 | 0.004 | 0.001 | 0.187 | 0.788 | 0.009 | 0.18 | 481 |
| 17 | Q | C | I | 0.005 | 0.002 | 0.215 | 0.772 | 0.006 | 0.03 | 526 | 0.006 | 0.024 | 0.18 | 0.784 | 0.006 | 0.37 | 404 | 0.01 | 0.01 | 0.889 | 0.001 | 0.072 | 2.04 | 814 |
| 18 | Q | R | E | 0.001 | 0.007 | 0.221 | 0.751 | 0.02 | 0.11 | 557 | 0.007 | 0.001 | 0.199 | 0.786 | 0.007 | 0.02 | 455 | 0.006 | 0.01 | 0.183 | 0.787 | 0.014 | 0.15 | 376 |
| 19 | R | B | BA | 0.006 | 0.017 | 0.176 | 0.786 | 0.015 | 0.26 | 458 | 0.007 | 0.001 | 0.291 | 0.657 | 0.044 | 0.05 | 611 | 0.005 | 0.003 | 0.291 | 0.657 | 0.044 | 0.05 | 611 |
| 20 | BA | K | P | 0.005 | 0.003 | 0.291 | 0.657 | 0.044 | 0.05 | 611 | 0.004 | 0.012 | 0.889 | 0.001 | 0.072 | 2.02 | 814 | 0.007 | 0.011 | 0.233 | 0.718 | 0.031 | 0.17 | 575 |
| 21 | C | Q | J | 0.006 | 0.024 | 0.18 | 0.784 | 0.006 | 0.37 | 404 | 0.005 | 0.002 | 0.215 | 0.772 | 0.006 | 0.03 | 526 | 0.009 | 0.007 | 0.202 | 0.767 | 0.015 | 0.11 | 524 |
| 22 | D | O | F | 0.002 | 0.007 | 0.247 | 0.726 | 0.019 | 0.03 | 531 | 0.001 | 0.02 | 0.194 | 0.782 | 0.003 | 0.31 | 512 | 0.006 | 0.017 | 0.176 | 0.786 | 0.015 | 0.26 | 458 |
| 23 | F | R | C | 0.006 | 0.017 | 0.176 | 0.786 | 0.015 | 0.26 | 458 | 0.001 | 0.007 | 0.221 | 0.751 | 0.02 | 0.11 | 557 | 0.006 | 0.024 | 0.18 | 0.784 | 0.006 | 0.37 | 404 |
| 24 | J | E | D | 0.009 | 0.007 | 0.202 | 0.767 | 0.015 | 0.11 | 524 | 0.006 | 0.01 | 0.183 | 0.787 | 0.014 | 0.15 | 376 | 0.006 | 0.002 | 0.247 | 0.726 | 0.019 | 0.03 | 531 |
| 25 | P | N | B | 0.007 | 0.011 | 0.233 | 0.718 | 0.031 | 0.17 | 575 | 0.009 | 0.001 | 0.032 | 0.839 | 0.119 | 0.18 | 585 | 0.007 | 0.001 | 0.199 | 0.786 | 0.007 | 0.02 | 455 |
| 26 | | E | Q | | | | | | | | 0.004 | 0.012 | 0.183 | 0.787 | 0.014 | 0.15 | 585 | 0.005 | 0.002 | 0.215 | 0.772 | 0.006 | 0.03 | 526 |
| 27 | | I | K | | | | | | | | 0.01 | 0.01 | 0.889 | 0.001 | 0.072 | 2.06 | 814 | 0.004 | 0.004 | 0.187 | 0.788 | 0.009 | 0.18 | 481 |
| 28 | K | R | E | 0.004 | 0.012 | 0.187 | 0.788 | 0.009 | 0.18 | 481 | 0.001 | 0.007 | 0.221 | 0.751 | 0.02 | 0.11 | 557 | 0.006 | 0.01 | 0.183 | 0.787 | 0.014 | 0.15 | 376 |
| 29 | N | K | R | 0.009 | 0.001 | 0.032 | 0.839 | 0.119 | 0.02 | 585 | 0.004 | 0.012 | 0.187 | 0.788 | 0.009 | 0.18 | 481 | 0.001 | 0.007 | 0.221 | 0.751 | 0.02 | 0.11 | 557 |
| 30 | O | Q | O | 0.001 | 0.02 | 0.194 | 0.782 | 0.003 | 0.31 | 512 | 0.005 | 0.002 | 0.215 | 0.772 | 0.006 | 0.03 | 526 | 0.001 | 0.02 | 0.194 | 0.782 | 0.003 | 0.31 | 512 |
| 31 | Q | N | | 0.005 | 0.002 | 0.215 | 0.772 | 0.006 | 0.03 | 526 | 0.009 | 0.001 | 0.032 | 0.839 | 0.119 | 0.02 | 585 | | | | | | | |
| 32 | | O | I | | | | | | | | 0.001 | 0.02 | 0.194 | 0.782 | 0.003 | 0.31 | 512 | 0.01 | 0.028 | 0.889 | 0.001 | 0.072 | 2.05 | 814 |
| 33 | L | AW | AT | 0.003 | 0.002 | 0.038 | 0.313 | 0.644 | 0.03 | 718 | 0.007 | 0.001 | 0.008 | 0.421 | 0.563 | 0.02 | 782 | 0.002 | 0.016 | 0.21 | 0.756 | 0.016 | 0.24 | 574 |
| 34 | AO | AV | AQ | 0.001 | 0.001 | 0.016 | 0.951 | 0.031 | 0.02 | 645 | 0.01 | 0.001 | 0.028 | 0.294 | 0.667 | 0.02 | 775 | 0.005 | 0.002 | 0.033 | 0.664 | 0.296 | 0.03 | 722 |
| 35 | AQ | AO | AR | 0.005 | 0.002 | 0.033 | 0.664 | 0.296 | 0.03 | 722 | 0.001 | 0.001 | 0.016 | 0.951 | 0.031 | 0.02 | 645 | 0.005 | 0.001 | 0.005 | 0.937 | 0.052 | 0.02 | 695 |
| 36 | AR | L | A | 0.005 | 0.001 | 0.005 | 0.937 | 0.052 | 0.01 | 695 | 0.005 | 0.001 | 0.016 | 0.313 | 0.644 | 0.03 | 718 | 0.007 | 0.002 | 0.17 | 0.807 | 0.014 | 0.03 | 400 |
| 37 | AT | A | L | 0.002 | 0.0016 | 0.21 | 0.756 | 0.016 | 0.24 | 574 | 0.007 | 0.002 | 0.17 | 0.807 | 0.014 | 0.03 | 400 | 0.003 | 0.002 | 0.038 | 0.313 | 0.644 | 0.03 | 718 |
| 38 | AV | AR | AW | 0.01 | 0.001 | 0.028 | 0.294 | 0.667 | 0.02 | 775 | 0.005 | 0.002 | 0.005 | 0.937 | 0.052 | 0.02 | 695 | 0.007 | 0.003 | 0.008 | 0.421 | 0.563 | 0.02 | 782 |
| 39 | AW | AQ | AV | 0.007 | 0.001 | 0.008 | 0.421 | 0.563 | 0.02 | 782 | 0.005 | 0.002 | 0.033 | 0.664 | 0.296 | 0.03 | 722 | 0.01 | 0.001 | 0.028 | 0.294 | 0.667 | 0.02 | 775 |
| 40 | A | AT | AO | 0.007 | 0.002 | 0.17 | 0.807 | 0.014 | 0.03 | 400 | 0.002 | 0.001 | 0.21 | 0.756 | 0.016 | 0.24 | 574 | 0.001 | 0.001 | 0.016 | 0.951 | 0.031 | 0.02 | 645 |

TABLE 2-2

| Ex. no. | Layer configuration | | | Top layer | | | | | | | Center layer | | | | | | | Bottom layer | | | | | | |
|---|---|---|---|---|---|---|---|---|---|---|---|---|---|---|---|---|---|---|---|---|---|---|---|---|
| | | | | Ratios of structures | | | | | | | Ratios of structures | | | | | | | Ratios of structures | | | | | | |
| | Top | Center | Bottom | Ferrite | Pearlite | Bainite | Martensite | Residual austenite | Carbide volume rate | Hardness (HV) | Ferrite | Pearlite | Bainite | Martensite | Residual austenite | Carbide volume rate | Hardness (HV) | Ferrite | Pearlite | Bainite | Martensite | Residual austenite | Carbide volume rate | Hardness (HV) |
| 41 | S | AT | U | 0.006 | 0.002 | 0.017 | 0.695 | 0.28 | 0.03 | 780 | 0.002 | 0.016 | 0.21 | 0.756 | 0.016 | 0.24 | 574 | 0.007 | 0.025 | 0.196 | 0.748 | 0.024 | 0.38 | 591 |
| 42 | T | AO | W | 0.001 | 0.002 | 0.006 | 0.937 | 0.054 | 0.03 | 655 | 0.001 | 0.001 | 0.951 | 0.951 | 0.031 | 0.02 | 645 | 0.001 | 0.001 | 0.004 | 0.817 | 0.171 | 0.02 | 727 |
| 43 | U | AV | X | 0.007 | 0.025 | 0.196 | 0.748 | 0.024 | 0.38 | 591 | 0.01 | 0.001 | 0.294 | 0.294 | 0.667 | 0.02 | 755 | 0.002 | 0.002 | 0.001 | 0.902 | 0.093 | 0.03 | 729 |
| 44 | V | AW | V | 0.004 | 0.003 | 0.031 | 0.869 | 0.093 | 0.05 | 692 | 0.007 | 0.001 | 0.421 | 0.421 | 0.563 | 0.02 | 782 | 0.004 | 0.003 | 0.031 | 0.869 | 0.093 | 0.05 | 692 |
| 45 | W | L | T | 0.007 | 0.001 | 0.004 | 0.817 | 0.171 | 0.02 | 727 | 0.003 | 0.002 | 0.313 | 0.313 | 0.644 | 0.03 | 718 | 0.006 | 0.002 | 0.006 | 0.937 | 0.054 | 0.03 | 655 |
| 46 | X | AQ | S | 0.002 | 0.002 | 0.001 | 0.903 | 0.09 | 0.03 | 729 | 0.005 | 0.002 | 0.664 | 0.664 | 0.296 | 0.03 | 722 | 0.004 | 0.001 | 0.017 | 0.695 | 0.28 | 0.03 | 780 |
| 47 | Y | AR | Y | 0.004 | 0.001 | 0.042 | 0.021 | 0.932 | 0.02 | 771 | 0.005 | 0.001 | 0.937 | 0.937 | 0.052 | 0.02 | 695 | 0.004 | 0.001 | 0.042 | 0.021 | 0.932 | 0.02 | 771 |
| 48 | AW | S | AR | 0.007 | 0.001 | 0.008 | 0.421 | 0.563 | 0.02 | 782 | 0.006 | 0.002 | 0.002 | 0.695 | 0.28 | 0.03 | 780 | 0.005 | 0.001 | 0.005 | 0.937 | 0.052 | 0.02 | 695 |
| 49 | AO | T | AO | 0.001 | 0.001 | 0.016 | 0.951 | 0.031 | 0.02 | 645 | 0.001 | 0.002 | 0.937 | 0.937 | 0.054 | 0.03 | 655 | 0.001 | 0.001 | 0.016 | 0.951 | 0.031 | 0.02 | 645 |
| 50 | AR | U | L | 0.005 | 0.001 | 0.005 | 0.937 | 0.052 | 0.02 | 695 | 0.007 | 0.025 | 0.748 | 0.748 | 0.024 | 0.38 | 591 | 0.007 | 0.025 | 0.038 | 0.313 | 0.644 | 0.03 | 718 |
| 51 | AT | V | AW | 0.002 | 0.016 | 0.21 | 0.756 | 0.016 | 0.24 | 574 | 0.004 | 0.003 | 0.869 | 0.869 | 0.093 | 0.05 | 692 | 0.002 | 0.016 | 0.21 | 0.421 | 0.563 | 0.02 | 782 |
| 52 | L | W | AT | 0.003 | 0.002 | 0.038 | 0.313 | 0.644 | 0.03 | 718 | 0.007 | 0.001 | 0.817 | 0.817 | 0.171 | 0.02 | 727 | 0.002 | 0.001 | 0.021 | 0.756 | 0.016 | 0.24 | 574 |
| 53 | AV | X | AV | 0.01 | 0.001 | 0.028 | 0.294 | 0.667 | 0.02 | 775 | 0.002 | 0.002 | 0.902 | 0.902 | 0.093 | 0.03 | 729 | 0.01 | 0.001 | 0.028 | 0.294 | 0.667 | 0.02 | 775 |
| 54 | AQ | Y | AQ | 0.005 | 0.002 | 0.033 | 0.664 | 0.296 | 0.03 | 722 | 0.004 | 0.001 | 0.021 | 0.021 | 0.932 | 0.02 | 771 | 0.005 | 0.002 | 0.033 | 0.664 | 0.296 | 0.03 | 722 |
| 55 | S | T | U | 0.006 | 0.002 | 0.017 | 0.695 | 0.28 | 0.03 | 780 | 0.001 | 0.001 | 0.937 | 0.937 | 0.054 | 0.02 | 655 | 0.007 | 0.025 | 0.196 | 0.748 | 0.024 | 0.38 | 591 |
| 56 | T | Y | X | 0.001 | 0.002 | 0.017 | 0.937 | 0.054 | 0.03 | 655 | 0.004 | 0.001 | 0.021 | 0.021 | 0.932 | 0.02 | 771 | 0.002 | 0.002 | 0.001 | 0.903 | 0.09 | 0.03 | 729 |
| 57 | U | X | W | 0.007 | 0.025 | 0.196 | 0.748 | 0.024 | 0.38 | 591 | 0.002 | 0.002 | 0.902 | 0.902 | 0.093 | 0.03 | 729 | 0.002 | 0.001 | 0.004 | 0.817 | 0.171 | 0.02 | 727 |
| 58 | | V | T | | | | | | | | 0.004 | 0.003 | 0.869 | 0.869 | 0.093 | 0.05 | 692 | 0.001 | 0.002 | 0.031 | 0.869 | 0.093 | 0.05 | 655 |
| 59 | W | D | V | 0.007 | 0.004 | 0.004 | 0.817 | 0.171 | 0.02 | 727 | 0.006 | 0.002 | 0.695 | 0.695 | 0.28 | 0.03 | 780 | 0.004 | 0.003 | 0.031 | 0.869 | 0.093 | 0.05 | 692 |
| 60 | X | U | S | 0.002 | 0.001 | 0.001 | 0.903 | 0.092 | 0.03 | 729 | 0.007 | 0.025 | 0.748 | 0.748 | 0.024 | 0.38 | 591 | 0.006 | 0.001 | 0.031 | 0.695 | 0.28 | 0.03 | 780 |
| 61 | Y | S | Y | 0.004 | 0.042 | 0.042 | 0.021 | 0.932 | 0.02 | 771 | 0.007 | 0.001 | 0.817 | 0.817 | 0.171 | 0.02 | 727 | 0.004 | 0.001 | 0.017 | 0.021 | 0.932 | 0.02 | 771 |
| 62 | G | E | N | 0.004 | 0.044 | 0.044 | 0.772 | 0.175 | 0.03 | 654 | 0.001 | 0.001 | 0.786 | 0.786 | 0.022 | 0.02 | 455 | 0.007 | 0.001 | 0.042 | 0.967 | 0.022 | 0.02 | 578 |
| 63 | H | Y | H | 0.007 | 0.003 | 0.003 | 0.967 | 0.022 | 0.02 | 578 | 0.001 | 0.001 | 0.913 | 0.913 | 0.072 | 0.02 | 686 | 0.007 | 0.003 | 0.003 | 0.967 | 0.022 | 0.02 | 578 |
| 64 | | AP | B | 0.001 | 0.229 | 0.229 | 0.744 | 0.022 | 0.02 | 654 | 0.004 | 0.002 | 0.772 | 0.772 | 0.175 | 0.03 | 654 | 0.007 | 0.001 | 0.199 | 0.786 | 0.007 | 0.02 | 455 |
| 65 | | G | AU | 0.001 | 0.013 | 0.013 | 0.913 | 0.072 | 0.02 | 686 | 0.002 | 0.001 | 0.967 | 0.967 | 0.022 | 0.02 | 578 | 0.070 | 0.001 | 0.011 | 0.867 | 0.114 | 0.02 | 694 |
| 66 | | H | AX | | | | | | | | 0.006 | 0.001 | 0.867 | 0.867 | 0.114 | 0.02 | 694 | 0.001 | 0.001 | 0.042 | 0.794 | 0.162 | 0.03 | 750 |
| 67 | B | AU | M | 0.007 | 0.199 | 0.199 | 0.786 | 0.007 | 0.02 | 455 | 0.007 | 0.001 | 0.794 | 0.794 | 0.162 | 0.03 | 750 | 0.001 | 0.002 | 0.229 | 0.744 | 0.024 | 0.03 | 611 |
| 68 | AX | AX | AP | 0.001 | 0.042 | 0.042 | 0.794 | 0.162 | 0.03 | 750 | 0.001 | 0.002 | 0.744 | 0.744 | 0.024 | 0.03 | 611 | 0.001 | 0.001 | 0.013 | 0.913 | 0.072 | 0.02 | 686 |
| 69 | Z | M | AN | 0.009 | 0.046 | 0.046 | 0.615 | 0.327 | 0.05 | 753 | 0.001 | 0.002 | 0.867 | 0.867 | 0.114 | 0.02 | 694 | 0.001 | 0.002 | 0.046 | 0.927 | 0.018 | 0.03 | 573 |
| 70 | AA | AU | AG | 0.001 | 0.004 | 0.004 | 0.975 | 0.018 | 0.03 | 604 | 0.007 | 0.001 | 0.772 | 0.772 | 0.175 | 0.03 | 654 | 0.002 | 0.001 | 0.035 | 0.904 | 0.058 | 0.05 | 660 |
| 71 | AB | G | AI | 0.008 | 0.268 | 0.268 | 0.689 | 0.034 | 0.02 | 571 | 0.007 | 0.002 | 0.807 | 0.807 | 0.014 | 0.03 | 400 | 0.006 | 0.003 | 0.035 | 0.576 | 0.384 | 0.05 | 690 |
| 72 | AC | A | AF | 0.006 | 0.038 | 0.038 | 0.912 | 0.042 | 0.05 | 632 | 0.007 | 0.001 | 0.967 | 0.967 | 0.022 | 0.02 | 578 | 0.009 | 0.003 | 0.034 | 0.63 | 0.324 | 0.05 | 698 |
| 73 | AD | H | Z | 0.006 | 0.032 | 0.032 | 0.93 | 0.03 | 0.02 | 618 | 0.002 | 0.016 | 0.756 | 0.756 | 0.016 | 0.24 | 574 | 0.009 | 0.003 | 0.046 | 0.615 | 0.327 | 0.05 | 753 |
| 74 | AE | AT | AK | 0.01 | 0.212 | 0.212 | 0.758 | 0.007 | 0.20 | 518 | 0.001 | 0.002 | 0.744 | 0.744 | 0.024 | 0.03 | 611 | 0.008 | 0.013 | 0.04 | 0.264 | 0.685 | 0.05 | 735 |
| 75 | AF | M | AE | 0.009 | 0.034 | 0.034 | 0.63 | 0.324 | 0.05 | 698 | 0.007 | 0.011 | 0.718 | 0.718 | 0.031 | 0.17 | 575 | 0.01 | 0.013 | 0.212 | 0.758 | 0.007 | 0.20 | 518 |
| 76 | AG | P | AH | 0.002 | 0.035 | 0.035 | 0.904 | 0.058 | 0.05 | 660 | 0.007 | 0.001 | 0.913 | 0.913 | 0.072 | 0.02 | 686 | 0.009 | 0.001 | 0.046 | 0.432 | 0.512 | 0.2 | 792 |
| 77 | AH | AP | AD | 0.009 | 0.046 | 0.046 | 0.432 | 0.512 | 0.2 | 792 | 0.001 | 0.001 | 0.951 | 0.951 | 0.031 | 0.02 | 645 | 0.006 | 0.001 | 0.032 | 0.931 | 0.03 | 0.03 | 618 |
| 78 | AI | F | AC | 0.002 | 0.035 | 0.035 | 0.576 | 0.384 | 0.05 | 690 | 0.006 | 0.017 | 0.786 | 0.786 | 0.015 | 0.26 | 458 | 0.006 | 0.002 | 0.035 | 0.912 | 0.042 | 0.05 | 632 |
| 79 | AJ | AV | AL | 0.005 | 0.036 | 0.036 | 0.868 | 0.088 | 0.05 | 722 | 0.02 | 0.001 | 0.294 | 0.294 | 0.667 | 0.02 | 775 | 0.007 | 0.002 | 0.235 | 0.723 | 0.033 | 0.03 | 573 |
| 80 | AK | AX | AA | 0.008 | 0.04 | 0.04 | 0.264 | 0.685 | 0.05 | 735 | 0.001 | 0.001 | 0.794 | 0.794 | 0.162 | 0.02 | 750 | 0.001 | 0.002 | 0.004 | 0.975 | 0.018 | 0.03 | 604 |

TABLE 2-3

| Ex. no. | Layer configuration Top | Layer configuration Center | Layer configuration Bottom | Top layer Ratios of structures Ferrite | Top layer Ratios of structures Pearlite | Top layer Ratios of structures Bainite | Top layer Ratios of structures Martensite | Top layer Residual austenite | Top layer Carbide volume rate | Top layer Hardness (HV) | Center layer Ratios of structures Ferrite | Center layer Ratios of structures Pearlite | Center layer Ratios of structures Bainite | Center layer Ratios of structures Martensite | Center layer Residual austenite | Center layer Carbide volume rate | Center layer Hardness (HV) | Bottom layer Ratios of structures Ferrite | Bottom layer Ratios of structures Pearlite | Bottom layer Ratios of structures Bainite | Bottom layer Ratios of structures Martensite | Bottom layer Residual austenite | Bottom layer Carbide volume rate | Bottom layer Hardness (HV) |
|---|---|---|---|---|---|---|---|---|---|---|---|---|---|---|---|---|---|---|---|---|---|---|---|---|
| 81 | AL | AW | AJ | 0.007 | 0.002 | 0.235 | 0.723 | 0.033 | 0.03 | 573 | 0.007 | 0.001 | 0.008 | 0.421 | 0.563 | 0.02 | 782 | 0.005 | 0.003 | 0.036 | 0.868 | 0.088 | 0.05 | 722 |
| 82 | AM | D | AB | 0.001 | 0.002 | 0.048 | 0.358 | 0.591 | 0.03 | 776 | 0.006 | 0.002 | 0.247 | 0.726 | 0.019 | 0.03 | 531 | 0.008 | 0.001 | 0.268 | 0.689 | 0.034 | 0.02 | 571 |
| 83 | AN | J | AM | 0.007 | 0.002 | 0.046 | 0.927 | 0.018 | 0.03 | 573 | 0.009 | 0.007 | 0.202 | 0.767 | 0.015 | 0.11 | 524 | 0.001 | 0.002 | 0.048 | 0.358 | 0.591 | 0.03 | 776 |
| 84 | AP | Z | H | 0.001 | 0.001 | 0.013 | 0.913 | 0.072 | 0.02 | 686 | 0.009 | 0.003 | 0.046 | 0.615 | 0.327 | 0.05 | 753 | 0.007 | 0.001 | 0.003 | 0.967 | 0.022 | 0.02 | 578 |
| 85 | AQ | AA | AZ | 0.005 | 0.002 | 0.033 | 0.664 | 0.296 | 0.03 | 722 | 0.001 | 0.002 | 0.004 | 0.975 | 0.018 | 0.03 | 604 | 0.007 | 0.001 | 0.042 | 0.432 | 0.518 | 0.02 | 793 |
| 86 | B | AB | C | 0.007 | 0.001 | 0.199 | 0.786 | 0.007 | 0.02 | 575 | 0.008 | 0.001 | 0.268 | 0.689 | 0.034 | 0.02 | 571 | 0.006 | 0.024 | 0.18 | 0.784 | 0.006 | 0.37 | 404 |
| 87 | AW | AC | AX | 0.007 | 0.001 | 0.008 | 0.421 | 0.563 | 0.02 | 782 | 0.008 | 0.001 | 0.038 | 0.912 | 0.042 | 0.03 | 632 | 0.001 | 0.001 | 0.042 | 0.794 | 0.162 | 0.02 | 750 |
| 88 | AZ | AD | B | 0.007 | 0.001 | 0.042 | 0.432 | 0.518 | 0.02 | 793 | 0.006 | 0.001 | 0.032 | 0.931 | 0.03 | 0.02 | 618 | 0.007 | 0.001 | 0.199 | 0.786 | 0.007 | 0.02 | 575 |
| 89 | H | AE | AQ | 0.007 | 0.001 | 0.003 | 0.967 | 0.022 | 0.02 | 578 | 0.01 | 0.013 | 0.212 | 0.758 | 0.007 | 0.20 | 518 | 0.005 | 0.002 | 0.033 | 0.664 | 0.296 | 0.03 | 722 |
| 90 | G | AF | G | 0.007 | 0.002 | 0.044 | 0.772 | 0.175 | 0.03 | 654 | 0.009 | 0.003 | 0.034 | 0.63 | 0.324 | 0.05 | 698 | 0.007 | 0.002 | 0.044 | 0.772 | 0.175 | 0.03 | 654 |
| 91 | AR | AG | AS | 0.005 | 0.001 | 0.005 | 0.937 | 0.052 | 0.02 | 695 | 0.002 | 0.001 | 0.035 | 0.904 | 0.058 | 0.02 | 660 | 0.005 | 0.001 | 0.008 | 0.244 | 0.746 | 0.02 | 791 |
| 92 | AX | AH | AP | 0.001 | 0.001 | 0.042 | 0.794 | 0.162 | 0.02 | 750 | 0.009 | 0.003 | 0.046 | 0.432 | 0.512 | 0.02 | 792 | 0.001 | 0.001 | 0.013 | 0.913 | 0.072 | 0.02 | 686 |
| 93 | AS | AI | AR | 0.001 | 0.001 | 0.008 | 0.244 | 0.746 | 0.02 | 791 | 0.002 | 0.003 | 0.035 | 0.576 | 0.384 | 0.05 | 690 | 0.005 | 0.001 | 0.005 | 0.937 | 0.052 | 0.02 | 695 |
| 94 | M | AJ | BA | 0.001 | 0.002 | 0.229 | 0.744 | 0.024 | 0.03 | 611 | 0.005 | 0.003 | 0.036 | 0.868 | 0.088 | 0.05 | 722 | 0.005 | 0.001 | 0.291 | 0.657 | 0.044 | 0.05 | 611 |
| 95 | AK | AK | M | 0.003 | 0.002 | 0.038 | 0.313 | 0.644 | 0.03 | 718 | 0.003 | 0.001 | 0.04 | 0.264 | 0.685 | 0.05 | 735 | 0.001 | 0.002 | 0.229 | 0.744 | 0.024 | 0.03 | 611 |
| 96 | C | AL | L | 0.006 | 0.024 | 0.18 | 0.784 | 0.006 | 0.37 | 404 | 0.007 | 0.002 | 0.235 | 0.723 | 0.033 | 0.03 | 573 | 0.003 | 0.002 | 0.038 | 0.313 | 0.644 | 0.03 | 718 |
| 97 | BA | AM | AU | 0.005 | 0.003 | 0.291 | 0.657 | 0.044 | 0.05 | 661 | 0.001 | 0.002 | 0.048 | 0.358 | 0.591 | 0.03 | 776 | 0.007 | 0.001 | 0.011 | 0.867 | 0.114 | 0.02 | 694 |
| 98 | AU | AN | AW | 0.007 | 0.003 | 0.011 | 0.867 | 0.114 | 0.05 | 694 | 0.007 | 0.002 | 0.046 | 0.927 | 0.018 | 0.03 | 573 | 0.007 | 0.001 | 0.008 | 0.421 | 0.563 | 0.03 | 782 |
| 99 | Z | AB | AG | 0.009 | 0.003 | 0.046 | 0.615 | 0.327 | 0.05 | 753 | 0.008 | 0.001 | 0.268 | 0.689 | 0.034 | 0.02 | 571 | 0.002 | 0.001 | 0.035 | 0.904 | 0.058 | 0.02 | 660 |
| 100 | AA | AN | AA | 0.001 | 0.002 | 0.004 | 0.975 | 0.018 | 0.03 | 604 | 0.007 | 0.002 | 0.046 | 0.927 | 0.018 | 0.03 | 573 | 0.001 | 0.002 | 0.004 | 0.975 | 0.018 | 0.03 | 604 |
| 101 | AB | AJ | AJ | 0.008 | 0.001 | 0.268 | 0.689 | 0.034 | 0.02 | 571 | 0.002 | 0.003 | 0.035 | 0.576 | 0.384 | 0.05 | 690 | 0.005 | 0.003 | 0.036 | 0.868 | 0.088 | 0.05 | 722 |
| 102 | AC | Z | AF | 0.006 | 0.002 | 0.038 | 0.912 | 0.042 | 0.03 | 632 | 0.009 | 0.003 | 0.046 | 0.615 | 0.327 | 0.05 | 753 | 0.009 | 0.003 | 0.034 | 0.63 | 0.324 | 0.05 | 698 |
| 103 | AD | AL | | 0.006 | 0.001 | 0.032 | 0.931 | 0.03 | 0.02 | 618 | 0.007 | 0.002 | 0.046 | 0.723 | 0.033 | 0.03 | 573 | | | | | | | |
| 104 | AE | AF | AN | 0.01 | 0.013 | 0.212 | 0.758 | 0.007 | 0.2 | 518 | 0.009 | 0.003 | 0.034 | 0.63 | 0.324 | 0.05 | 698 | 0.007 | 0.002 | 0.046 | 0.927 | 0.018 | 0.03 | 573 |
| 105 | AF | AA | AM | 0.009 | 0.003 | 0.034 | 0.63 | 0.324 | 0.05 | 698 | 0.001 | 0.002 | 0.004 | 0.975 | 0.018 | 0.03 | 604 | 0.001 | 0.002 | 0.048 | 0.358 | 0.591 | 0.03 | 776 |
| 106 | AG | AD | AE | 0.002 | 0.001 | 0.035 | 0.904 | 0.058 | 0.02 | 660 | 0.006 | 0.001 | 0.032 | 0.931 | 0.03 | 0.02 | 618 | 0.01 | 0.013 | 0.212 | 0.758 | 0.007 | 0.2 | 518 |
| 107 | AH | AJ | AB | 0.009 | 0.001 | 0.046 | 0.432 | 0.512 | 0.02 | 792 | 0.005 | 0.003 | 0.036 | 0.868 | 0.088 | 0.05 | 722 | 0.008 | 0.001 | 0.001 | 0.689 | 0.034 | 0.02 | 571 |
| 108 | AI | AM | AC | 0.002 | 0.003 | 0.035 | 0.576 | 0.384 | 0.05 | 690 | 0.001 | 0.002 | 0.048 | 0.358 | 0.591 | 0.03 | 776 | 0.006 | 0.002 | 0.038 | 0.912 | 0.042 | 0.03 | 632 |
| 109 | AJ | AK | AI | 0.005 | 0.003 | 0.036 | 0.868 | 0.088 | 0.05 | 722 | 0.008 | 0.003 | 0.04 | 0.264 | 0.685 | 0.05 | 735 | 0.002 | 0.003 | 0.035 | 0.576 | 0.384 | 0.05 | 690 |
| 110 | AK | AC | AD | 0.008 | 0.003 | 0.04 | 0.264 | 0.685 | 0.05 | 735 | 0.006 | 0.002 | 0.038 | 0.912 | 0.042 | 0.03 | 632 | 0.006 | 0.001 | 0.032 | 0.931 | 0.03 | 0.02 | 618 |
| 111 | AL | AE | AH | 0.007 | 0.002 | 0.235 | 0.723 | 0.033 | 0.05 | 573 | 0.01 | 0.013 | 0.212 | 0.758 | 0.007 | 0.20 | 518 | 0.009 | 0.001 | 0.046 | 0.432 | 0.512 | 0.02 | 792 |
| 112 | AM | AH | Z | 0.001 | 0.002 | 0.048 | 0.358 | 0.591 | 0.03 | 776 | 0.009 | 0.001 | 0.046 | 0.432 | 0.512 | 0.02 | 792 | 0.009 | 0.003 | 0.046 | 0.615 | 0.327 | 0.05 | 753 |
| 113 | AN | AG | AK | 0.007 | 0.002 | 0.046 | 0.927 | 0.018 | 0.03 | 573 | 0.002 | 0.001 | 0.035 | 0.904 | 0.058 | 0.02 | 660 | 0.008 | 0.003 | 0.04 | 0.264 | 0.685 | 0.05 | 735 |

TABLE 2-4

| Ex. no | Layer configuration Top | Layer configuration Center | Layer configuration Bottom | Difference of constituents C Top/center | Difference of constituents C Bottom/center | Difference of constituents Mn Top/center | Difference of constituents Mn Bottom/center | Difference of hardness (HV) Top/center | Difference of hardness (HV) Bottom/center | Tensile strength TS (MPa) | Nanohardness standard deviation Top | Nanohardness standard deviation Bottom | Screw dislocation density ($10^{13}$ m/m$^3$) | Bending resist. | Fatigue resist. | Remarks (ex.) |
|---|---|---|---|---|---|---|---|---|---|---|---|---|---|---|---|---|
| 1 | A | AZ | B | −0.43 | −0.35 | −6.22 | −5.05 | −393 | −338 | 1656 | 2.19 | 2.08 | 1.4 | Poor | Poor | Comp. ex. |
| 2 | D | P | J | −0.10 | −0.06 | 1.04 | −1.56 | −44 | −51 | 1445 | 2.30 | 2.13 | 0.5 | Poor | Poor | Comp. ex. |
| 3 | P | J | AS | 0.06 | 0.10 | 1.56 | 6.61 | 51 | 267 | 1518 | 0.24 | 0.27 | 4.8 | Good | Good | Inv. ex. |
| 4 | AS | C | F | 0.02 | 0.07 | 8.42 | 0.48 | 387 | 54 | 1297 | 0.61 | 0.99 | 6.5 | Good | Good | Inv. ex. |
| 5 | B | A | BA | 0.08 | 0.46 | 1.17 | 0.97 | 55 | 211 | 1206 | 0.86 | 0.37 | 2.3 | Good | Good | Inv. ex. |
| 6 | AZ | D |  | 0.26 |  | 1.71 |  | 262 |  | 1508 | 0.87 |  | 16 | Good | Good | Inv. ex. |
| 7 | BA | B | A | 0.38 | −0.08 | −0.20 | −1.17 | 156 | −55 | 1257 | 0.68 | 2.11 | 1.3 | Poor | Poor | Comp. ex. |
| 8 | C | AY | C | −0.24 | −0.24 | −1.05 | −1.05 | −166 | −166 | 1323 | 2.12 | 2.04 | 1.5 | Poor | Poor | Comp. ex. |
| 9 | J | F | AY | 0.02 | 0.17 | 1.33 | 0.57 | 66 | 112 | 1300 | 1.41 | 1.42 | 9.7 | Good | Good | Inv. ex. |
| 10 | F | BA | AZ | −0.27 | −0.04 | −0.39 | 5.25 | −153 | 182 | 1586 | 2.30 | 1.45 | 0.1 | Poor | Poor | Comp. ex. |
| 11 | AY | AS | P | 0.04 | −0.04 | −7.37 | −5.05 | −221 | −216 | 1787 | 2.29 | 2.27 | 0.8 | Poor | Poor | Comp. ex. |
| 12 | E | P | N | −0.31 | −0.08 | −2.35 | 5.65 | −199 | 10 | 1401 | 2.18 | 0.71 | 1.7 | Poor | Poor | Comp. ex. |
| 13 | I | J | Q | 0.29 | 0.03 | −0.60 | −0.80 | 290 | 2 | 1506 | 1.41 | 0.56 | 18.4 | Poor | Poor | Comp. ex. |
| 14 | K | BA | R | −0.28 | −0.17 | −1.05 | 0.72 | −130 | −54 | 1487 | 2.19 | 2.07 | 1.3 | Poor | Poor | Comp. ex. |
| 15 | N | F | O | 0.00 | 0.05 | 8.54 | −0.90 | 127 | 54 | 1302 | 1.00 | 0.58 | 21.5 | Poor | Poor | Comp. ex. |
| 16 | O | D | K | 0.07 | 0.01 | −4.83 | −4.59 | −19 | −50 | 1355 | 2.09 | 2.26 | 0.5 | Poor | Poor | Comp. ex. |
| 17 | Q | C | I | 0.12 | 0.39 | 1.01 | 1.21 | 122 | 410 | 1339 | 0.33 | 0.43 | 41.2 | Poor | Poor | Comp. ex. |
| 18 | R | B | E | 0.21 | −0.12 | 0.52 | −0.05 | 102 | −79 | 1221 | 0.83 | 2.22 | 0.3 | Poor | Poor | Comp. ex. |
| 19 | B | K | BA | −0.10 | 0.28 | 1.25 | 1.05 | −26 | 130 | 1319 | 2.17 | 0.47 | 88.5 | Poor | Poor | Comp. ex. |
| 20 | BA | I | P | −0.04 | −0.23 | −0.34 | 2.16 | −203 | −239 | 1838 | 2.16 | 2.12 | 1.9 | Poor | Poor | Comp. ex. |
| 21 | C | Q | J | −0.12 | −0.03 | −1.01 | 0.80 | −122 | −2 | 1318 | 2.22 | 2.02 | 1.7 | Poor | Poor | Comp. ex. |
| 22 | D | O | F | −0.07 | −0.05 | 4.83 | 0.90 | 19 | −54 | 1327 | 1.09 | 2.03 | 0.9 | Poor | Poor | Comp. ex. |
| 23 | F | R | C | −0.10 | −0.17 | −1.11 | −1.59 | −99 | −153 | 1330 | 2.25 | 2.05 | 0.9 | Poor | Poor | Comp. ex. |
| 24 | J | E | D | 0.24 | 0.21 | 0.79 | 3.39 | 148 | 155 | 1168 | 1.52 | 1.48 | 9.7 | Good | Poor | Inv. ex |
| 25 | P | N | B | 0.08 | −0.11 | −5.65 | −7.95 | −10 | −130 | 1447 | 2.24 | 2.26 | 1.7 | Poor | Poor | Comp. ex. |
| 26 |  | E | Q |  | 0.28 |  | −0.01 |  | 150 | 1097 |  | 1.34 | 78.6 | Poor | Poor | Comp. ex. |
| 27 |  | I | K |  | −0.32 |  | −1.39 |  | −33 | 1889 |  | 2.11 | 0.8 | Poor | Poor | Comp. ex. |
| 28 | K | R | E | −0.11 | −0.33 | −1.77 | −0.57 | −76 | −181 | 1328 | 2.07 | 2.02 | 1.2 | Poor | Poor | Comp. ex. |
| 29 | N | K | R | 0.01 | 0.11 | 9.20 | 1.77 | 104 | 76 | 1354 | 0.55 | 0.28 | 29.1 | Good | Poor | Inv. ex |
| 30 | O | Q | O | 0.00 | 0.00 | −1.43 | −1.43 | −14 | −14 | 1362 | 2.08 | 2.22 | 1.7 | Poor | Poor | Comp. ex. |
| 31 | Q | N |  | 0.05 |  | −8.01 |  | −59 |  | 1485 | 2.28 |  | 0.3 | Poor | Poor | Comp. ex. |
| 32 |  | O | I |  | 0.26 |  | 1.63 |  | 302 | 1504 |  | 0.26 | 37.9 | Poor | Poor | Comp. ex. |
| 33 | L | AW | AT | −0.11 | −0.04 | 1.41 | −7.01 | −64 | −208 | 1843 | 2.18 | 2.30 | 1.4 | Poor | Poor | Comp. ex. |
| 34 | AO | AV | AQ | −0.06 | −0.04 | −5.65 | −1.98 | −130 | −53 | 1868 | 2.28 | 2.23 | 0.9 | Poor | Poor | Comp. ex. |
| 35 | AQ | AO | AR | 0.01 | 0.02 | 3.67 | 1.07 | 77 | 50 | 1710 | 1.28 | 0.24 | 12.7 | Good | Good | Inv. ex |
| 36 | AR | L | A | 0.06 | −0.24 | −4.75 | −8.44 | −23 | −318 | 1663 | 2.13 | 2.07 | 1.4 | Poor | Poor | Comp. ex. |
| 37 | AT | A | L | 0.31 | 0.24 | 0.02 | 8.44 | 174 | 318 | 1311 | 0.67 | 0.68 | 38.7 | Good | Good | Inv. ex |
| 38 | AV | AR | AW | 0.04 | 0.06 | 4.58 | 3.34 | 80 | 87 | 1845 | 0.99 | 0.37 | 45.8 | Good | Good | Inv. ex |
| 39 | AW | AQ | AV | 0.06 | 0.04 | 0.74 | 1.98 | 60 | 53 | 1882 | 0.71 | 1.16 | 62.4 | Good | Good | Inv. ex. |
| 40 | A | AT | AO | −0.31 | −0.04 | −0.02 | 2.60 | −174 | 71 | 1439 | 2.16 | 0.92 | 1.2 | Poor | Poor | Comp. ex. |

TABLE 2-5

| Ex. no. | Layer configuration Top | Layer configuration Center | Layer configuration Bottom | Difference of constituents C Top/center | Difference of constituents C Bottom/center | Difference of constituents Mn Top/center | Difference of constituents Mn Bottom/center | Difference of hardness (HV) Top/center | Difference of hardness (HV) Bottom/center |
|---|---|---|---|---|---|---|---|---|---|
| 41 | S | AT | U | 0.07 | −0.09 | 5.67 | 0.76 | 206 | 17 |
| 42 | T | AO | W | −0.02 | 0.03 | 0.80 | 2.59 | 10 | 82 |
| 43 | U | AV | X | −0.11 | 0.02 | −7.49 | −5.62 | −184 | −46 |
| 44 | V | AW | V | −0.06 | −0.06 | −3.46 | −3.46 | −90 | −90 |
| 45 | W | L | T | 0.07 | 0.02 | −3.23 | −5.02 | 9 | −63 |
| 46 | X | AQ | S | 0.07 | 0.09 | −3.64 | −0.60 | 7 | 58 |
| 47 | Y | AR | Y | 0.01 | 0.01 | 4.51 | 4.51 | 76 | 76 |
| 48 | AW | S | AR | −0.03 | −0.08 | 1.34 | −2.00 | 2 | −85 |
| 49 | AO | T | AO | 0.02 | 0.02 | −0.80 | −0.80 | −10 | −10 |
| 50 | AR | U | L | 0.03 | 0.02 | 2.91 | 7.66 | 104 | 127 |
| 51 | AT | V | AW | 0.02 | 0.06 | −3.55 | 3.46 | −118 | 90 |
| 52 | L | W | AT | −0.07 | 0.01 | 3.23 | −5.19 | −9 | −153 |
| 53 | AV | X | AV | −0.02 | −0.02 | 5.62 | 5.62 | 46 | 46 |
| 54 | AQ | Y | AQ | −0.01 | −0.01 | −1.91 | −1.91 | −49 | −49 |
| 55 | S | T | U | 0.12 | −0.04 | 2.27 | −2.64 | 125 | −64 |
| 56 | T | Y | X | −0.05 | 0.05 | −4.78 | −5.55 | −116 | −42 |
| 57 | U | X | W | −0.14 | −0.05 | −1.87 | 2.56 | −138 | −2 |
| 58 |  | V | T |  | −0.04 |  | −0.15 |  | −37 |
| 59 | W | S | V | −0.08 | −0.09 | −0.48 | −2.12 | −53 | −88 |
| 60 | X | U | S | 0.14 | 0.16 | 1.87 | 4.91 | 138 | 189 |

TABLE 2-5-continued

| | | | | | | | | | |
|---|---|---|---|---|---|---|---|---|---|
| 61 | Y | W | Y | 0.00 | 0.00 | 2.99 | 2.99 | 44 | 44 |
| 62 | G | B | H | 0.13 | 0.13 | 6.60 | 2.05 | 199 | 123 |
| 63 | H | AP | B | −0.08 | −0.20 | −0.51 | −2.56 | −108 | −231 |
| 64 | M | G | | 0.06 | −0.00 | −6.15 | 0.00 | −43 | |
| 65 | AP | H | AU | 0.08 | 0.11 | 0.51 | 0.49 | 108 | 116 |
| 66 | | AU | AX | | 0.03 | | 1.52 | | 56 |
| 67 | B | AX | M | −0.27 | −0.08 | −4.06 | −3.61 | −295 | −139 |
| 68 | AX | M | AP | 0.08 | 0.01 | 3.61 | 2.11 | 139 | 75 |
| 69 | Z | AU | AN | −0.01 | −0.13 | 3.40 | −1.42 | 59 | −121 |
| 70 | AA | G | AG | 0.00 | 0.06 | −5.72 | −3.80 | −50 | 6 |
| 71 | AB | A | AI | 0.31 | 0.20 | 2.11 | 8.36 | 171 | 290 |
| 72 | AC | H | AF | 0.04 | 0.03 | 0.95 | 4.74 | 54 | 120 |
| 73 | AD | AT | Z | −0.09 | −0.01 | 2.83 | 7.09 | 44 | 179 |
| 74 | AE | M | AK | −0.08 | 0.00 | −0.44 | 6.77 | −93 | 124 |
| 75 | AF | P | AE | −0.04 | −0.08 | 4.49 | −2.29 | 123 | −57 |
| 76 | AG | AP | AH | −0.01 | 0.05 | 0.24 | 3.55 | −26 | 106 |
| 77 | AH | AO | AD | 0.06 | −0.05 | 4.66 | 0.23 | 147 | −27 |
| 78 | AI | F | AC | 0.01 | 0.06 | 7.78 | 3.59 | 232 | 174 |
| 79 | AJ | AV | AL | 0.03 | −0.13 | −4.97 | −4.26 | −53 | −202 |
| 80 | AK | AX | AA | −0.08 | −0.14 | 3.16 | −3.18 | −15 | −146 |

| Ex. no. | Tensile strength TS (MPa) | Nanohardness standard deviation | | Screw dislocation density ($10^{13}$ m/m$^3$) | Bending resist. | Fatigue resist. | Remarks (ex.) |
|---|---|---|---|---|---|---|---|
| | | Top | Bottom | | | | |
| 41 | 1590 | 0.58 | 1.38 | 12.3 | Poor | Poor | Comp.ex. |
| 42 | 1694 | 1.27 | 1.43 | 46.3 | Poor | Poor | Comp.ex. |
| 43 | 1846 | 2.03 | 2.22 | 0.2 | Poor | Poor | Comp.ex. |
| 44 | 1886 | 2.18 | 2.27 | 0.3 | Poor | Poor | Comp.ex. |
| 45 | 1796 | 0.86 | 2.11 | 1.9 | Poor | Poor | Comp.ex. |
| 46 | 1860 | 0.77 | 0.96 | 88.7 | Poor | Poor | Comp.ex. |
| 47 | 1838 | 0.46 | 1.48 | 6.6 | Good | Poor | Inv.ex. |
| 48 | 1926 | 1.17 | 2.29 | 0.6 | Poor | Poor | Comp.ex. |
| 49 | 1665 | 2.12 | 2.28 | 1 | Poor | Poor | Comp.ex. |
| 50 | 1633 | 1.01 | 1.12 | 33.5 | Good | Poor | Inv.ex. |
| 51 | 1747 | 2.06 | 0.22 | 1.1 | Poor | Poor | Comp.ex. |
| 52 | 1766 | 2.21 | 2.01 | 0.6 | Poor | Poor | Comp.ex. |
| 53 | 1889 | 1.43 | 1.50 | 71.4 | Poor | Poor | Comp.ex. |
| 54 | 1898 | 2.09 | 2.19 | 0.8 | Poor | Poor | Comp.ex. |
| 55 | 1703 | 1.32 | 2.14 | 1 | Poor | Poor | Comp.ex. |
| 56 | 1870 | 2.16 | 2.30 | 1.4 | Poor | Poor | Comp.ex. |
| 57 | 1781 | 2.24 | 2.14 | 1.6 | Poor | Poor | Comp.ex. |
| 58 | 1743 | | 2.19 | 1.7 | Poor | Poor | Comp.ex. |
| 59 | 1899 | 2.11 | 2.23 | 1.4 | Poor | Poor | Comp.ex. |
| 60 | 1678 | 1.02 | 0.24 | 78.7 | Good | Poor | Inv.ex. |
| 61 | 1882 | 0.28 | 1.46 | 56.6 | Poor | Poor | Comp.ex. |
| 62 | 1360 | 1.49 | 0.60 | 15 | Good | Good | Inv.ex. |
| 63 | 1589 | 2.05 | 2.04 | 0.6 | Poor | Poor | Comp.ex. |
| 64 | 1652 | 2.26 | | 1.5 | Poor | Poor | Comp.ex. |
| 65 | 1600 | 0.96 | 0.42 | 18.1 | Good | Good | Inv.ex. |
| 66 | 1791 | | 0.75 | 78.4 | Good | Good | Inv.ex. |
| 67 | 1694 | | 2.21 | 1 | Poor | Poor | Comp.ex. |
| 68 | 1672 | 0.86 | 0.67 | 8.7 | Good | Good | Inv.ex. |
| 69 | 1736 | 2.10 | 2.30 | 1.9 | Poor | Poor | Comp.ex. |
| 70 | 1652 | 0.45 | 0.68 | 0.4 | Poor | Poor | Comp.ex. |
| 71 | 1297 | 0.80 | 0.34 | 14.1 | Good | Poor | Inv.ex. |
| 72 | 1577 | 1.10 | 1.18 | 83.9 | Good | Poor | Inv.ex. |
| 73 | 1590 | 1.25 | 1.29 | 9 | Poor | Poor | Comp.ex. |
| 74 | 1587 | 2.28 | 1.26 | 1.3 | Poor | Poor | Comp.ex. |
| 75 | 1520 | 0.41 | 2.08 | 0.3 | Poor | Poor | Comp.ex. |
| 76 | 1784 | 2.03 | 0.50 | 1.8 | Poor | Poor | Comp.ex. |
| 77 | 1707 | 0.33 | 2.23 | 1.5 | Poor | Poor | Comp.ex. |
| 78 | 1406 | 1.47 | 1.47 | 14.9 | Good | Poor | Inv.ex. |
| 79 | 1835 | 2.21 | 2.05 | 0.4 | Poor | Poor | Comp.ex. |
| 80 | 1820 | 2.19 | 2.02 | 1.9 | Poor | Poor | Comp.ex. |

TABLE 2-6

| Ex. no. | Layer configuration | | | Difference of constituents | | | |
|---|---|---|---|---|---|---|---|
| | | | | C | | Mn | |
| | Top | Center | Bottom | Top/center | Bottom/center | Top/center | Bottom/center |
| 81 | AL | AW | AJ | −0.15 | 0.01 | −3.02 | −3.73 |
| 82 | AM | D | AB | 0.18 | 0.14 | 2.47 | −2.40 |
| 83 | AN | J | AM | −0.01 | 0.14 | 0.38 | 5.07 |
| 84 | AP | Z | H | −0.02 | −0.10 | −3.38 | −3.89 |
| 85 | AQ | AA | AZ | 0.08 | 0.22 | 4.24 | 4.17 |
| 86 | B | AB | c | −0.23 | −0.20 | −0.94 | −2.01 |
| 87 | AW | AC | AX | 0.11 | 0.11 | 2.86 | 1.06 |
| 88 | AZ | AD | B | 0.20 | −0.14 | 3.37 | −1.68 |
| 89 | H | AE | AQ | 0.02 | 0.10 | 2.04 | 5.11 |
| 90 | G | AF | G | −0.03 | −0.03 | −0.19 | −0.19 |
| 91 | AR | AG | AS | 0.03 | 0.04 | −0.28 | 4.55 |
| 92 | AX | AH | AP | 0.02 | −0.05 | −2.05 | −3.55 |
| 93 | AS | AI | AR | 0.11 | 0.10 | 0.16 | −4.67 |
| 94 | M | AJ | BA | −0.09 | 0.10 | −1.68 | −2.33 |
| 95 | L | AK | M | −0.03 | 0.00 | 0.05 | −6.77 |
| 96 | C | AL | L | −0.09 | 0.04 | −3.91 | 4.43 |
| 97 | BA | AM | AU | 0.11 | −0.03 | −6.01 | −3.27 |
| 98 | AU | AN | AW | 0.13 | 0.16 | 1.42 | 4.74 |
| 99 | Z | AB | AG | −0.01 | −0.04 | 5.00 | 1.86 |
| 100 | AA | AN | AA | 0.02 | 0.02 | −0.24 | −0.24 |
| 101 | AB | AI | AJ | 0.11 | 0.16 | −6.25 | −5.06 |
| 102 | AC | Z | AF | −0.06 | −0.07 | −2.94 | 0.85 |
| 103 | AD | AL | | 0.02 | | −1.16 | |
| 104 | AE | AF | AN | −0.04 | −0.04 | −6.78 | −5.67 |
| 105 | AF | AA | AM | 0.03 | 0.14 | 5.91 | 4.93 |
| 106 | AG | AD | AE | 0.05 | −0.03 | 1.12 | −1.67 |
| 107 | AH | AJ | AB | −0.02 | −0.05 | 3.98 | −1.19 |
| 108 | AI | AM | AC | −0.15 | −0.11 | 1.38 | −2.81 |
| 109 | AJ | AK | AI | 0.09 | −0.07 | −5.09 | −0.03 |
| 110 | AK | AC | AD | 0.02 | −0.02 | 4.22 | −1.32 |
| 111 | AL | AE | AH | 0.01 | 0.15 | 2.83 | 6.10 |
| 112 | AM | AH | Z | 0.02 | −0.03 | −0.30 | −0.17 |
| 113 | AN | AG | AK | −0.08 | 0.00 | −1.68 | 4.42 |

| Ex. no. | Difference of hardness (HV) | | Tensile strength TS (MPa) | Nanohardness standard deviation | |
|---|---|---|---|---|---|
| | Top/center | Bottom/center | | Top | Bottom |
| 81 | −209 | −60 | 1844 | 2.05 | 2.31 |
| 82 | 245 | 40 | 1519 | 1.36 | 1.18 |
| 83 | 49 | 252 | 1510 | 1.43 | 0.79 |
| 84 | −67 | −175 | 1790 | 2.18 | 2.02 |
| 85 | 118 | 189 | 1699 | 0.70 | 1.38 |
| 86 | 4 | −167 | 1404 | 1.49 | 2.12 |
| 87 | 150 | 118 | 1746 | 0.39 | 0.42 |
| 88 | 175 | −43 | 1650 | 0.94 | 2.13 |
| 89 | 60 | 204 | 1479 | 0.97 | 1.30 |
| 90 | −44 | −44 | 1734 | 2.23 | 2.29 |
| 91 | 35 | 131 | 1763 | 1.36 | 0.52 |
| 92 | −42 | −106 | 1924 | 2.16 | 2.12 |
| 93 | 101 | 5 | 1805 | 0.85 | 0.78 |
| 94 | −111 | −111 | 1727 | 2.24 | 2.27 |
| 95 | −17 | −124 | 1795 | 2.16 | 2.27 |
| 96 | −169 | 145 | 1473 | 2.13 | 1.41 |
| 97 | −165 | −82 | 1841 | 2.09 | 2.09 |
| 98 | 121 | 209 | 1637 | 0.48 | 1.08 |
| 99 | 182 | 89 | 1605 | 1.07 | 0.63 |
| 100 | 31 | 31 | 1513 | 1.31 | 0.81 |
| 101 | −119 | 32 | 1715 | 2.20 | 0.65 |
| 102 | −121 | −55 | 1820 | 2.22 | 2.18 |
| 103 | 45 | | 1505 | 0.94 | |
| 104 | −180 | −125 | 1633 | 2.12 | 2.11 |
| 105 | 94 | 172 | 1680 | 0.87 | 1.51 |
| 106 | 42 | −100 | 1562 | 1.14 | 2.03 |
| 107 | 70 | −151 | 1792 | 0.22 | 2.21 |
| 108 | −86 | −144 | 1849 | 2.17 | 2.28 |
| 109 | −13 | −45 | 1833 | 2.08 | 2.29 |
| 110 | 103 | −14 | 1663 | 1.11 | 2.20 |
| 111 | 55 | 274 | 1509 | 1.06 | 0.79 |
| 112 | −16 | −39 | 1967 | 2.25 | 2.14 |
| 113 | −87 | 75 | 1681 | 2.06 | 0.65 |

TABLE 2-6-continued

| Ex. no. | Screw dislocation density ($10^{13}$ m/m³) | Bending resist. | Fatigue resist. | Remarks (ex.) |
|---|---|---|---|---|
| 81 | 1 | Poor | Poor | Comp.ex. |
| 82 | 86.9 | Poor | Poor | Comp.ex. |
| 83 | 57.2 | Poor | Poor | Comp.ex. |
| 84 | 1.8 | Poor | Poor | Comp.ex. |
| 85 | 71.5 | Good | Poor | Inv.ex. |
| 86 | 1.7 | Poor | Poor | Comp.ex. |
| 87 | 45 | Good | Poor | Inv.ex. |
| 88 | 1 | Poor | Poor | Comp.ex. |
| 89 | 55.8 | Good | Poor | Inv.ex. |
| 90 | 1 | Poor | Poor | Comp.ex. |
| 91 | 21.5 | Poor | Poor | Comp.ex. |
| 92 | 1.4 | Poor | Poor | Comp.ex. |
| 93 | 1.2 | Poor | Poor | Comp.ex. |
| 94 | 0.2 | Poor | Poor | Comp.ex. |
| 95 | 0.6 | Poor | Poor | Comp.ex. |
| 96 | 1 | Poor | Poor | Comp.ex. |
| 97 | 1.9 | Poor | Poor | Comp.ex. |
| 98 | 31.2 | Good | Poor | Inv.ex. |
| 99 | 51.7 | Poor | Poor | Comp.ex. |
| 100 | 80.1 | Poor | Poor | Comp.ex. |
| 101 | 0.8 | Poor | Poor | Comp.ex. |
| 102 | 0.5 | Poor | Poor | Comp.ex. |
| 103 | 50.9 | Poor | Poor | Comp.ex. |
| 104 | 1.9 | Poor | Poor | Comp.ex. |
| 105 | 37.3 | Good | Poor | Inv.ex. |
| 106 | 1.1 | Poor | Poor | Comp.ex. |
| 107 | 0.4 | Poor | Poor | Comp.ex. |
| 108 | 1.2 | Poor | Poor | Comp.ex. |
| 109 | 0.2 | Poor | Poor | Comp.ex. |
| 110 | 0.7 | Poor | Poor | Comp.ex. |
| 111 | 25.7 | Good | Poor | Inv.ex. |
| 112 | 0.4 | Poor | Poor | Comp.ex. |
| 113 | 1.4 | Poor | Poor | Comp.ex. |

TABLE 3

| Ex. no. | Layer configuration | | | Carbide volume rate | | | Top/bottom layer target thickness | | Actual thickness (μm) | |
|---|---|---|---|---|---|---|---|---|---|---|
| | Top | Center | Bottom | Top | Center | Bottom | Fraction | % | Top | Bottom |
| 114 | B | A | BA | 0.02 | 0.03 | 0.05 | 1/400 | 0.25% | 5 | 4 |
| 115 | AT | A | L | 0.23 | 0.03 | 0.03 | 1/200 | 0.50% | 11 | 12 |
| 116 | AQ | AO | AR | 0.03 | 0.02 | 0.02 | 3/400 | 0.75% | 14 | 16 |
| 117 | AW | AQ | AV | 0.02 | 0.03 | 0.02 | 1/100 | 1% | 22 | 21 |
| 118 | AV | AR | AW | 0.02 | 0.02 | 0.02 | 1/50 | 2% | 47 | 48 |
| 119 | — | AU | AX | — | 0.02 | 0.02 | 1/25 | 4% | — | 96 |
| 120 | G | B | H | 0.03 | 0.02 | 0.02 | 3/40 | 8% | 180 | 179 |
| 121 | AS | C | F | 0.02 | 0.36 | 0.26 | 1/10 | 10% | 240 | 238 |
| 122 | AZ | D | — | 0.02 | 0.03 | — | 3/20 | 15% | 363 | — |
| 123 | J | F | AY | 0.11 | 0.25 | 0.42 | 1/5 | 20% | 477 | 473 |
| 124 | AP | H | AU | 0.02 | 0.02 | 0.02 | 3/10 | 30% | 722 | 719 |
| 125 | P | J | AS | 0.18 | 0.11 | 0.02 | 2/5 | 40% | 960 | 951 |
| 126 | AX | M | AP | 0.02 | 0.03 | 0.02 | 9/20 | 45% | 1078 | 1083 |

| Ex. no. | Difference of hardness (HV) | | Nanohardness standard deviation | | Tensile strength TS (MPa) | Screw dislocation density ($10^{13}$ m/m³) | Bending resist. | Fatigue resist. | Remarks (ex.) |
|---|---|---|---|---|---|---|---|---|---|
| | Top/center | Bottom/center | Top | Bottom | | | | | |
| 114 | 55 | 211 | 0.85 | 0.36 | 1084 | 0.6 | Poor | Poor | Comp.ex. |
| 115 | 174 | 318 | 0.65 | 0.65 | 1090 | 1.3 | Poor | Poor | Comp.ex. |
| 116 | 77 | 50 | 1.23 | 0.23 | 1654 | 1.7 | Poor | Poor | Comp.ex. |
| 117 | 60 | 53 | 0.71 | 1.14 | 1833 | 2.2 | Good | Good | Inv.ex. |
| 118 | 80 | 87 | 0.97 | 0.36 | 1775 | 2.6 | Good | Good | Inv.ex. |
| 119 | — | 56 | — | 0.73 | 1704 | 7.6 | Good | Good | Inv.ex. |
| 120 | 199 | 123 | 1.47 | 0.6 | 1266 | 6.1 | Good | Good | Inv.ex. |
| 121 | 387 | 54 | 0.6 | 0.96 | 1196 | 4.8 | Good | Good | Inv.ex. |
| 122 | 262 | — | 0.85 | — | 1295 | 11.2 | Good | Good | Inv.ex. |

TABLE 3-continued

| 123 | 66 | 112 | 1.36 | 1.41 | 1301 | 9.6 | Good | Good | Inv.ex. |
| 124 | 108 | 116 | 0.93 | 0.4 | 1655 | 36.4 | Poor | Poor | Comp.ex. |
| 125 | 51 | 267 | 0.23 | 0.27 | 1664 | 43.2 | Poor | Poor | Comp.ex. |
| 126 | 139 | 75 | 0.85 | 0.64 | 1797 | 86.8 | Poor | Poor | Comp.ex. |

*Underlines show outside scope of present invention.

TABLE 4-1

| | Layer configuration | | Position of | Hot rolling conditions | | | | | | |
|---|---|---|---|---|---|---|---|---|---|---|
| Ex. no. | Top/ bottom | Center | hard layer | Heating temp. (° C.) | Holding time (min) | Finishing temp. (° C.) | Cooling rate (° C./s.) | Coiling temp. (° C.) | Skin pass rolling rate (%) | Remarks |
| 127 | A | D | 2 sides | 1168 | 207 | 866 | 86.1 | 154 | 0.97 | Comp.ex. |
| 128 | AO | M | 2 sides | 1142 | 27 | 678 | 78.2 | 426 | 1.23 | Inv.ex. |
| 129 | AP | P | 2 sides | 1091 | 247 | 764 | 37.4 | 477 | 1.19 | Inv.ex. |
| 130 | AQ | AP | 2 sides | 1291 | 67 | 945 | 45.9 | 360 | 1.31 | Inv.ex. |
| 131 | AR | B | 2 sides | 1168 | 130 | 813 | 46.3 | 73 | 2.69 | Inv.ex. |
| 132 | AS | L | 2 sides | 1123 | 15 | 779 | 63.9 | 728 | 0.61 | Comp.ex. |
| 133 | AT | A | 2 sides | 1111 | 87 | 817 | 84.9 | 248 | 4.1 | Inv.ex. |
| 134 | AU | AO | 2 sides | 1192 | 106 | 831 | 9.4 | 586 | 0.96 | Inv.ex. |
| 135 | AV | G | 2 sides | 1183 | 103 | 738 | 24.5 | 694 | 0.44 | Inv.ex. |
| 136 | AW | J | 2 sides | 1285 | 235 | 872 | 13.1 | 337 | 5.27 | Inv.ex. |
| 137 | AX | AU | 2 sides | 1199 | 282 | 917 | 41.6 | 592 | 0.51 | Inv.ex. |
| 138 | AY | AT | 2 sides | 1101 | 189 | 958 | 55.8 | 413 | 1.38 | Comp.ex. |
| 139 | AZ | AX | 2 sides | 1187 | 176 | 855 | 55.5 | 680 | 0.6 | Inv.ex. |
| 140 | B | AR | 2 sides | 1103 | 121 | 862 | 82.3 | 342 | 1.36 | Comp.ex. |
| 141 | BA | AY | 2 sides | 1196 | 43 | 800 | 44.1 | 232 | 0.22 | Comp.ex. |
| 142 | C | AZ | 2 sides | 1112 | 253 | 896 | 79.9 | 221 | 4.9 | Comp.ex. |
| 143 | D | C | 2 sides | 1268 | 34 | 671 | 63.7 | 54 | 4.54 | Inv.ex. |
| 144 | F | AQ | 2 sides | 1289 | 16 | 721 | 23.7 | 115 | 3.86 | Comp.ex. |
| 145 | G | AV | 2 sides | 1107 | 152 | 949 | 39.3 | 582 | 3.97 | Comp.ex. |
| 146 | H | AS | 2 sides | 1295 | 176 | 836 | 28.7 | 32 | 2.3 | Comp.ex. |
| 147 | J | F | 1 side | 1265 | 26 | 688 | 14.8 | 124 | 2.53 | Inv.ex. |
| 148 | L | BA | 2 sides | 1239 | 80 | 738 | 48.2 | 91 | 0.52 | Comp.ex. |
| 149 | M | AW | 2 sides | 1161 | 211 | 889 | 37.3 | 27 | 1.61 | Comp.ex. |
| 150 | P | H | 2 sides | 1256 | 14 | 883 | 16.1 | 381 | 3.31 | Inv.ex. |

TABLE 4-2

| | Layer configuration | | Position of | Hot rolling conditions | | | | | | |
|---|---|---|---|---|---|---|---|---|---|---|
| Ex. no. | Top/ bottom | Center | hard layer | Heating temp. (° C.) | Holding time (min) | Finishing temp. (° C.) | Cooling rate (° C./s) | Coiling temp. (° C.) | Skin pass rolling rate (%) | Remarks |
| 151 | AO | J | 2 sides | 1183 | 316 | 806 | 81.8 | 233 | 2.92 | Inv.ex. |
| 152 | AP | H | 2 sides | 1283 | 230 | 839 | 77.4 | 379 | 1.93 | Inv.ex. |
| 153 | AQ | D | 2 sides | 1231 | 158 | 671 | 84.8 | 270 | 1.15 | Inv.ex. |
| 154 | AR | P | 2 sides | 1201 | 151 | 735 | 42.3 | 165 | 0.04 | Comp.ex. |
| 155 | AS | M | 2 sides | 1140 | 31 | 932 | 36.3 | 282 | 1.75 | Inv.ex. |
| 156 | AU | AT | 2 sides | 1299 | 62 | 711 | 28.6 | 335 | 3.92 | Inv.ex. |
| 157 | AV | AQ | 2 sides | 1246 | 92 | 647 | 60.6 | 43 | 3.91 | Comp.ex. |
| 158 | AW | AP | 2 sides | 1265 | 70 | 729 | 71.4 | 48 | 0.41 | Inv.ex. |
| 159 | AX | AO | 2 sides | 1308 | 180 | 841 | 69.8 | 423 | 3.06 | Inv.ex. |
| 160 | AY | C | 2 sides | 1197 | 237 | 907 | 79.8 | 257 | 2.61 | Inv.ex. |
| 161 | AZ | P | 2 sides | 1140 | 62 | 711 | 39 | 640 | 0.4 | Inv.ex. |
| 162 | B | A | 2 sides | 1241 | 208 | 824 | 96.5 | 186 | 0.76 | Inv.ex. |
| 163 | BA | F | 2 sides | 1116 | 296 | 670 | 91.5 | 484 | 0.74 | Inv.ex. |
| 164 | C | A | 2 sides | 1241 | 271 | 832 | 63.3 | 198 | 4.88 | Inv.ex. |
| 165 | F | C | 2 sides | 1133 | 179 | 788 | 78.5 | 141 | 4.04 | Inv.ex. |
| 166 | G | B | 2 sides | 1179 | 46 | 868 | 107.3 | 118 | 0.12 | Inv.ex. |
| 167 | H | B | 2 sides | 1166 | 105 | 826 | 74.2 | 19 | 3.59 | Inv.ex. |
| 168 | L | G | 2 sides | 1297 | 37 | 940 | 58 | 532 | 1.77 | Inv.ex. |
| 169 | M | F | 2 sides | 1260 | 184 | 736 | 13.8 | 22 | 1.04 | Inv.ex. |

TABLE 4-3

| Ex. no. | Top/bottom layers Ratios of structures | | | | | Carbide volume rate | Hardness (HV) | Center layer Ratios of structures Ferrite |
|---|---|---|---|---|---|---|---|---|
| | Ferrite | Pearlite | Bainite | Martensite | Residual austenite | | | |
| 127 | 0.008 | 0.022 | 0.169 | 0.796 | 0.005 | 0.34 | 408 | 0.009 |
| 128 | 0.011 | 0.001 | 0.015 | 0.929 | 0.044 | 0.02 | 688 | 0.005 |
| 129 | 0.004 | 0.001 | 0.038 | 0.884 | 0.073 | 0.02 | 685 | 0.008 |
| 130 | 0.008 | 0.003 | 0.003 | 0.687 | 0.299 | 0.05 | 736 | 0.005 |
| 131 | 0.001 | 0.001 | 0.006 | 0.945 | 0.047 | 0.02 | 707 | 0.01 |
| 132 | 0.004 | 0.002 | 0.046 | 0.237 | 0.711 | 2.34 | 694 | 0.003 |
| 133 | 0.007 | 0.023 | 0.202 | 0.753 | 0.015 | 0.35 | 554 | 0.007 |
| 134 | 0.004 | 0.001 | 0.003 | 0.871 | 0.121 | 0.02 | 766 | 0.007 |
| 135 | 0.007 | 0.001 | 0.007 | 0.296 | 0.689 | 0.02 | 778 | 0.001 |
| 136 | 0.009 | 0.003 | 0.001 | 0.419 | 0.568 | 0.05 | 785 | 0.001 |
| 137 | 0.005 | 0.001 | 0.038 | 0.796 | 0.16 | 0.02 | 740 | 0.002 |
| 138 | 0.003 | 0.008 | 0.971 | 0.012 | 0.006 | 0.12 | 428 | 0.001 |
| 139 | 0.001 | 0.001 | 0.003 | 0.452 | 0.543 | 0.02 | 797 | 0.003 |
| 140 | 0.011 | 0.01 | 0.183 | 0.789 | 0.007 | 0.15 | 403 | 0.008 |
| 141 | 0.005 | 0.015 | 0.92 | 0.01 | 0.05 | 0.23 | 467 | 0.011 |
| 142 | 0.009 | 0.02 | 0.175 | 0.783 | 0.013 | 0.31 | 406 | 0.008 |
| 143 | 0.001 | 0.002 | 0.258 | 0.726 | 0.013 | 0.03 | 595 | 0.008 |
| 144 | 0.007 | 0.024 | 0.186 | 0.78 | 0.003 | 0.37 | 495 | 0.005 |
| 145 | 0.006 | 0.001 | 0.046 | 0.771 | 0.177 | 0.02 | 656 | 0.002 |
| 146 | 0.003 | 0.002 | 0.036 | 0.932 | 0.027 | 0.03 | 518 | 0.01 |
| 147 | 0.006 | 0.028 | 0.184 | 0.762 | 0.02 | 0.43 | 557 | 0.01 |
| 148 | 0.01 | 0.002 | 0.027 | 0.311 | 0.65 | 0.03 | 710 | 0.005 |
| 149 | 0.007 | 0.001 | 0.24 | 0.739 | 0.014 | 0.02 | 667 | 0.007 |
| 150 | 0.005 | 0.028 | 0.929 | 0.014 | 0.024 | 0.43 | 499 | 0.01 |

| Ex. no. | Center layer Ratios of structures | | | | Carbide volume rate | Hardness (HV) | Remarks |
|---|---|---|---|---|---|---|---|
| | Pearlite | Bainite | Martensite | Residual austenite | | | |
| 127 | 0.002 | 0.236 | 0.733 | 0.02 | 0.03 | 554 | Comp.ex. |
| 128 | 0.003 | 0.983 | 0.003 | 0.006 | 0.05 | 584 | Inv.ex. |
| 129 | 0.029 | 0.951 | 0.005 | 0.007 | 0.44 | 494 | Inv.ex. |
| 130 | 0.002 | 0.006 | 0.917 | 0.07 | 0.03 | 683 | Inv.ex. |
| 131 | 0.001 | 0.202 | 0.786 | 0.001 | 0.02 | 490 | Inv.ex. |
| 132 | 0.003 | 0.003 | 0.318 | 0.673 | 2.06 | 670 | Comp.ex. |
| 133 | 0.019 | 0.179 | 0.788 | 0.007 | 0.29 | 385 | Inv.ex. |
| 134 | 0.003 | 0.013 | 0.933 | 0.044 | 0.05 | 690 | Inv.ex. |
| 135 | 0.003 | 0.043 | 0.774 | 0.179 | 0.05 | 657 | Inv.ex. |
| 136 | 0.016 | 0.964 | 0.004 | 0.015 | 0.24 | 430 | Inv.ex. |
| 137 | 0.001 | 0.004 | 0.868 | 0.125 | 0.02 | 682 | Inv.ex. |
| 138 | 0.007 | 0.982 | 0.005 | 0.005 | 0.11 | 438 | Comp.ex. |
| 139 | 0.003 | 0.013 | 0.82 | 0.161 | 0.05 | 739 | Inv.ex. |
| 140 | 0.002 | 0.001 | 0.942 | 0.047 | 0.03 | 642 | Comp.ex. |
| 141 | 0.012 | 0.209 | 0.738 | 0.03 | 0.18 | 570 | Comp.ex. |
| 142 | 0.001 | 0.038 | 0.439 | 0.515 | 0.02 | 794 | Comp.ex. |
| 143 | 0.016 | 0.179 | 0.79 | 0.007 | 0.24 | 468 | Inv.ex. |
| 144 | 0.001 | 0.009 | 0.684 | 0.301 | 0.02 | 741 | Comp.ex. |
| 145 | 0.001 | 0.041 | 0.29 | 0.666 | 0.02 | 787 | Comp.ex. |
| 146 | 0.002 | 0.029 | 0.242 | 0.717 | 0.03 | 787 | Comp.ex. |
| 147 | 0.001 | 0.202 | 0.785 | 0.002 | 0.02 | 498 | Inv.ex. |
| 148 | 0.018 | 0.252 | 0.67 | 0.055 | 0.27 | 687 | Comp.ex. |
| 149 | 0.003 | 0.006 | 0.42 | 0.564 | 0.05 | 792 | Comp.ex. |
| 150 | 0.002 | 0.003 | 0.969 | 0.016 | 0.03 | 439 | Inv.ex. |

TABLE 4-4

| Ex. no. | Top/bottom layers Ratios of structures | | | | | Carbide volume rate | Hardness (HV) | Center layer Ratios of structures Ferrite |
|---|---|---|---|---|---|---|---|---|
| | Ferrite | Pearlite | Bainite | Martensite | Residual austenite | | | |
| 151 | 0.004 | 0.002 | 0.033 | 0.919 | 0.042 | 0.03 | 692 | 0.008 |
| 152 | 0.003 | 0.001 | 0.041 | 0.881 | 0.074 | 0.02 | 686 | 0.002 |
| 153 | 0.006 | 0.002 | 0.003 | 0.689 | 0.3 | 0.03 | 739 | 0.011 |
| 154 | 0.01 | 0.001 | 0.036 | 0.907 | 0.046 | 0.02 | 655 | 0.003 |
| 155 | 0.007 | 0.002 | 0.032 | 0.239 | 0.72 | 0.03 | 789 | 0.008 |

TABLE 4-4-continued

| | | | | | | | | |
|---|---|---|---|---|---|---|---|---|
| 156 | 0.005 | 0.001 | 0.042 | 0.839 | 0.113 | 0.02 | 766 | 0.006 |
| 157 | 0.058 | 0.001 | 0.153 | 0.296 | 0.492 | 0.02 | 678 | 0.052 |
| 158 | 0.008 | 0.003 | 0.048 | 0.406 | 0.535 | 0.05 | 792 | 0.006 |
| 159 | 0.005 | 0.001 | 0.048 | 0.786 | 0.16 | 0.02 | 740 | 0.008 |
| 160 | 0.004 | 0.01 | 0.228 | 0.734 | 0.024 | 0.15 | 558 | 0.007 |
| 161 | 0.007 | 0.001 | 0.04 | 0.43 | 0.522 | 0.02 | 794 | 0.002 |
| 162 | 0.002 | 0.018 | 0.182 | 0.786 | 0.012 | 0.27 | 452 | 0.009 |
| 163 | 0.01 | 0.009 | 0.265 | 0.669 | 0.047 | 0.14 | 625 | 0.005 |
| 164 | 0.005 | 0.015 | 0.176 | 0.79 | 0.014 | 0.23 | 439 | 0.005 |
| 165 | 0.002 | 0.02 | 0.188 | 0.782 | 0.008 | 0.31 | 489 | 0.007 |
| 166 | 0.01 | 0.001 | 0.028 | 0.786 | 0.175 | 0.02 | 652 | 0.011 |
| 167 | 0.001 | 0.001 | 0.001 | 0.977 | 0.021 | 0.02 | 569 | 0.003 |
| 168 | 0.01 | 0.001 | 0.043 | 0.314 | 0.633 | 0.02 | 715 | 0.002 |
| 169 | 0.011 | 0.001 | 0.229 | 0.736 | 0.024 | 0.02 | 666 | 0.005 |

| | Center layer | | | | | |
|---|---|---|---|---|---|---|
| | Ratios of structures | | | Carbide | | |
| Ex. no. | Pearlite | Bainite | Martensite | Residual austenite | volume rate | Hardness (HV) | Remarks |
| 151 | 0.006 | 0.205 | 0.772 | 0.009 | 0.09 | 518 | Inv.ex. |
| 152 | 0.002 | 0.034 | 0.933 | 0.029 | 0.03 | 524 | Inv.ex. |
| 153 | 0.003 | 0.958 | 0.015 | 0.013 | 0.05 | 518 | Inv.ex. |
| 154 | 0.025 | 0.231 | 0.717 | 0.024 | 0.38 | 573 | Comp.ex. |
| 155 | 0.001 | 0.971 | 0.005 | 0.016 | 0.02 | 584 | Inv.ex. |
| 156 | 0.021 | 0.948 | 0.005 | 0.02 | 0.32 | 433 | Inv.ex. |
| 157 | 0.002 | 0.143 | 0.594 | 0.209 | 0.03 | 658 | Comp.ex. |
| 158 | 0.001 | 0.048 | 0.87 | 0.075 | 0.02 | 721 | Inv.ex. |
| 159 | 0.001 | 0.033 | 0.922 | 0.036 | 0.02 | 689 | Inv.ex. |
| 160 | 0.002 | 0.19 | 0.789 | 0.012 | 0.03 | 399 | Inv.ex. |
| 161 | 0.097 | 0.886 | 0.006 | 0.009 | 1.48 | 463 | Inv.ex. |
| 162 | 0.021 | 0.166 | 0.797 | 0.007 | 0.32 | 401 | Inv.ex. |
| 163 | 0.01 | 0.187 | 0.782 | 0.016 | 0.15 | 471 | Inv.ex. |
| 164 | 0.025 | 0.165 | 0.797 | 0.008 | 0.38 | 384 | Inv.ex. |
| 165 | 0.02 | 0.171 | 0.793 | 0.009 | 0.31 | 436 | Inv.ex. |
| 166 | 0.019 | 0.18 | 0.783 | 0.007 | 0.29 | 469 | Inv.ex. |
| 167 | 0.022 | 0.171 | 0.79 | 0.014 | 0.34 | 504 | Inv.ex. |
| 168 | 0.003 | 0.004 | 0.808 | 0.183 | 0.05 | 654 | Inv.ex. |
| 169 | 0.027 | 0.171 | 0.789 | 0.008 | 0.41 | 538 | Inv.ex. |

TABLE 4-5

| | Difference of constituents | | Difference of hardness | | | | | | |
|---|---|---|---|---|---|---|---|---|---|
| Ex. no. | C Top/bottom layers-center layer | Mn Top/bottom layers-center layer | (HV) Top/bottom layers-center layer | Tensile strength Ts (MPa) | Nanohardness standard error Top/bottom layers | Screw dislocation density ($10^{13}$ m/m$^3$) | Bonding resistance | Fatigue resistance | Remarks |
| 127 | −0.169 | −4.51 | −146 | 1373 | 2.18 | 1.2 | Poor | Poor | Comp.ex. |
| 128 | 0.008 | 1 | 104 | 1558 | 0.47 | 87.1 | Good | Good | Inv.ex. |
| 129 | 0.011 | 0.26 | 191 | 1390 | 0.44 | 83.1 | Good | Poor | Inv.ex. |
| 130 | 0.008 | 2.56 | 53 | 1764 | 0.36 | 57.1 | Good | Good | Inv.ex. |
| 131 | 0.217 | 2.52 | 217 | 1392 | 0.3 | 79.6 | Good | Good | Inv.ex. |
| 132 | 0.072 | 0.08 | 24 | 1721 | 1.26 | 0.2 | Poor | Poor | Comp.ex. |
| 133 | 0.311 | 0.02 | 169 | 1127 | 0.75 | 18.7 | Good | Good | Inv.ex. |
| 134 | 0.042 | 1.09 | 76 | 1791 | 1.04 | 53.9 | Good | Poor | Inv.ex. |
| 135 | 0.127 | 0.5 | 121 | 1735 | 1.44 | 61.8 | Good | Good | Inv.ex. |
| 136 | 0.144 | 5.12 | 355 | 1317 | 1.12 | 8.6 | Good | Good | Inv.ex. |
| 137 | 0.033 | 1.52 | 57 | 1764 | 0.3 | 44.9 | Good | Good | Inv.ex. |
| 138 | 0.043 | 1.13 | −10 | 1167 | 2.11 | 1.1 | Poor | Poor | Comp.ex. |
| 139 | 0.074 | 0.99 | 58 | 1895 | 1.3 | 56.2 | Good | Good | Inv.ex. |
| 140 | −0.217 | −2.52 | −239 | 1534 | 2.03 | 0.6 | Poor | Poor | Comp.ex. |
| 141 | 0.108 | −0.18 | −103 | 1430 | 2.19 | 0.4 | Poor | Poor | Comp.ex. |
| 142 | −0.31 | −6.12 | −388 | 1817 | 2.23 | 0.7 | Poor | Poor | Comp.ex. |
| 143 | 0.054 | 4.41 | 127 | 1300 | 0.86 | 12.5 | Good | Good | Inv.ex. |
| 144 | −0.101 | −5.71 | −246 | 1760 | 2.25 | 0.9 | Poor | Poor | Comp.ex. |
| 145 | −0.127 | −0.5 | −131 | 1919 | 2.08 | 1.7 | Poor | Poor | Comp.ex. |
| 146 | −0.105 | −5.3 | −269 | 1856 | 2.27 | 0.9 | Poor | Poor | Comp.ex. |
| 147 | 0.019 | 1.33 | 59 | 1324 | 1.33 | 61.3 | Good | Good | Inv.ex. |

TABLE 4-5-continued

| | Difference of constituents | | Difference of hardness | | | | | | |
|---|---|---|---|---|---|---|---|---|---|
| Ex. no. | C Top/bottom layers-center layer | Mn Top/bottom layers-center layer | (HV) Top/bottom layers-center layer | Tensile strength Ts (MPa) | Nanohardness standard error Top/bottom layers | Screw dislocation density ($10^{13}$ m$^3$) | Bonding resistance | Fatigue resistance | Remarks |
| 148 | −0.223 | 7.47 | 23 | 1760 | 2.21 | 0.8 | Poor | Poor | Comp.ex. |
| 149 | −0.083 | −5.41 | −125 | 1934 | 2.07 | 0.5 | Poor | Poor | Comp.ex. |
| 150 | 0.064 | 0.25 | 60 | 1201 | 0.45 | 58.3 | Good | Poor | Inv.ex. |

TABLE 4-6

| | Difference of constituents | | Difference of hardness | | | | | | |
|---|---|---|---|---|---|---|---|---|---|
| Ex. no. | C Top/bottom layers-center layer | Mn Top/bottom layers-center layer | (HV) Top/bottom layers-center layer | Tensile strength Ts (MPa) | Nanohardness standard error Top/bottom layers | Screw dislocation density ($10^{13}$ m$^3$) | Bonding resistance | Fatigue resistance | Remarks |
| 151 | 0.069 | 0.71 | 174 | 1437 | 0.66 | 44.6 | Good | Poor | Inv.ex. |
| 152 | 0.075 | 0.51 | 162 | 1446 | 0.26 | 72 | Good | Good | Inv.ex. |
| 153 | 0.12 | 1.78 | 221 | 1459 | 1.13 | 90.4 | Good | Good | Inv.ex. |
| 154 | 0.026 | 0.22 | 82 | 1522 | 1.43 | 1.8 | Poor | Poor | Comp.ex. |
| 155 | 0.043 | 6.9 | 205 | 1605 | 1.07 | 56.7 | Good | Good | Inv.ex. |
| 156 | 0.007 | 3.69 | 333 | 1314 | 0.23 | 13.4 | Good | Good | Inv.ex. |
| 157 | 0.043 | 1.98 | 20 | 1691 | 2.35 | 1 | Poor | Poor | Comp.ex. |
| 158 | 0.07 | 3.3 | 71 | 1860 | 0.49 | 56.1 | Good | Good | Inv.ex. |
| 159 | 0.075 | 2.61 | 51 | 1777 | 1.48 | 54.9 | Good | Poor | Inv.ex. |
| 160 | 0.239 | 1.05 | 159 | 1154 | 0.61 | 32 | Good | Good | Inv.ex. |
| 161 | 0.155 | 2.75 | 331 | 1383 | 0.37 | 68.4 | Good | Good | Inv.ex. |
| 162 | 0.079 | 1.17 | 51 | 1109 | 0.95 | 8 | Good | Good | Inv.ex. |
| 163 | 0.274 | 0.39 | 154 | 1319 | 1.3 | 73.6 | Good | Good | Inv.ex. |
| 164 | 0.115 | 0.1 | 55 | 1071 | 1.18 | 36.8 | Good | Good | Inv.ex. |
| 165 | 0.073 | 0.48 | 53 | 1191 | 0.7 | 88.3 | Good | Good | Inv.ex. |
| 166 | 0.126 | 6.6 | 183 | 1328 | 1.02 | 50 | Good | Poor | Inv.ex. |
| 167 | 0.127 | 2.05 | 65 | 1354 | 1.29 | 10.2 | Good | Good | Inv.ex. |
| 168 | 0.034 | 0.67 | 61 | 1701 | 1.36 | 26 | Good | Good | Inv.ex. |
| 169 | 0.08 | 1.04 | 128 | 1463 | 0.66 | 31.8 | Good | Good | Inv.ex. |

TABLE 5-1

| | Layer configuration | | | Hot rolling conditions | | | | | |
|---|---|---|---|---|---|---|---|---|---|
| Ex. no. | Top/bottom layers | Center layer | Position of hard layer | Heating temp. (° C.) | Holding time (min) | Finishing temp. (° C.) | Cooling rate (° C./s) | Coiling temp. (° C.) | Pickling |
| 170 | AS | M | 2 sides | 1140 | 31 | 932 | 36.3 | 282 | Hydrochloric acid |
| 171 | AY | C | 2 sides | 1197 | 237 | 907 | 79.8 | 257 | Sulfuric acid |
| 172 | AZ | AX | 2 sides | 1187 | 176 | 855 | 55.5 | 680 | Sulfuric acid |
| 173 | AZ | P | 2 sides | 1140 | 62 | 711 | 39 | 640 | Hydrochloric acid |
| 174 | B | A | 2 sides | 1241 | 208 | 824 | 96.5 | 186 | Hydrochloric acid |
| 175 | BA | F | 2 sides | 1116 | 296 | 670 | 91.5 | 484 | Hydrochloric acid |
| 176 | C | A | 2 sides | 1241 | 271 | 832 | 63.3 | 198 | Hydrochloric acid |
| 177 | D | C | 2 sides | 1268 | 34 | 671 | 63.7 | 54 | Sulfuric acid |
| 178 | F | C | 2 sides | 1133 | 179 | 788 | 78.5 | 141 | Sulfuric acid |
| 179 | J | F | 1 side | 1265 | 26 | 688 | 14.8 | 124 | Hydrochloric acid |
| 180 | AO | M | 2 sides | 1142 | 27 | 678 | 78.2 | 426 | Hydrochloric acid |
| 181 | AQ | AP | 2 sides | 1291 | 67 | 945 | 45.9 | 360 | Sulfuric acid |
| 182 | AQ | D | 2 sides | 1231 | 158 | 671 | 84.8 | 270 | Sulfuric acid |
| 183 | AR | B | 2 sides | 1168 | 130 | 813 | 46.3 | 73 | Hydrochloric acid |
| 184 | AT | A | 2 sides | 1111 | 87 | 817 | 84.9 | 248 | Sulfuric acid |
| 185 | AV | G | 2 sides | 1183 | 103 | 738 | 24.5 | 694 | Hydrochloric acid |
| 186 | AW | AP | 2 sides | 1265 | 70 | 729 | 71.4 | 48 | Sulfuric acid |
| 187 | L | G | 2 sides | 1297 | 37 | 940 | 58 | 532 | Sulfuric acid |
| 188 | AP | H | 2 sides | 1283 | 230 | 839 | 77.4 | 379 | Hydrochloric acid |
| 189 | AU | AT | 2 sides | 1299 | 62 | 711 | 28.6 | 335 | Sulfuric acid |
| 190 | AX | AU | 2 sides | 1199 | 282 | 917 | 41.6 | 592 | Hydrochloric acid |

TABLE 5-1-continued

| | Layer configuration | | | Hot rolling conditions | | | | | |
|---|---|---|---|---|---|---|---|---|---|
| Ex. no. | Top/ bottom layers | Center layer | Position of hard layer | Heating temp. (° C.) | Holding time (min) | Finishing temp. (° C.) | Cooling rate (° C./s) | Coiling temp. (° C.) | Pickling |
| 191 | H | B | 2 sides | 1166 | 105 | 826 | 74.2 | 19 | Hydrochloric acid |
| 192 | M | F | 2 sides | 1260 | 184 | 736 | 13.8 | 22 | Sulfuric acid |

TABLE 5-2

| Ex. no. | Annealing of hot rolled sheet | | | | | | | Cold rolling rate (%) | Annealing of cold rolled sheet | | |
|---|---|---|---|---|---|---|---|---|---|---|---|
| | Pattern | Cond. (1) | Cond. (2) | Cond. (3) | Cond. (4) | Cond. (5) | Cond. (6) | Cond. (7) | Pattern | Cond. (1) | Cond. (2) |
| 170 | BAF | 7 | 403 | 46 | 47 | | | | 34 | C-CAL | 58 | 895 |
| 171 | C-CAL | 73 | 855 | 120 | 27 | 322 | 404 | 55 | 37 | C-CAL | 68 | 797 |
| 172 | BAF | 56 | 631 | 15 | 19 | | | | 61 | R-CAL | 72 | 709 |
| 173 | None | | | | | | | | 78 | C-CAL | 10 | 652 |
| 174 | C-CAL | 52 | 888 | 243 | 78 | 261 | 267 | 9 | 26 | R-CAL | 16 | 841 |
| 175 | C-CAL | 16 | 801 | 62 | 9 | 205 | 487 | 28 | 47 | C-CAL | 6 | 844 |
| 176 | None | | | | | | | | 60 | R-CAL | 61 | 749 |
| 177 | C-CAL | 34 | 653 | 24 | 49 | 493 | 149 | 43 | 56 | C-CAL | 26 | 808 |
| 178 | BAF | 21 | 468 | 2 | 28 | | | | 52 | R-CAL | 28 | 770 |
| 179 | None | | | | | | | | 75 | R-CAL | 77 | 874 |
| 180 | None | | | | | | | | 24 | C-CAL | 53 | 711 |
| 181 | C-CAL | 6 | 787 | 287 | 60 | 458 | 54 | 61 | 76 | R-CAL | 6 | 829 |
| 182 | BAF | 11 | 616 | 66 | 77 | | | | 61 | C-CAL | 37 | 738 |
| 183 | BAF | 37 | 711 | 142 | 59 | | | | 64 | C-CAL | 19 | 697 |
| 184 | None | | | | | | | | 26 | C-CAL | 78 | 824 |
| 185 | BAF | 72 | 568 | 110 | 7 | | | | 79 | R-CAL | 22 | 768 |
| 186 | None | | | | | | | | 45 | C-CAL | 48 | 835 |
| 187 | None | | | | | | | | 65 | R-CAL | 37 | 894 |
| 188 | None | | | | | | | | 28 | R-CAL | 53 | 861 |
| 189 | None | | | | | | | | 24 | R-CAL | 18 | 784 |
| 190 | C-CAL | 45 | 751 | 164 | 40 | 366 | 197 | 76 | 71 | R-CAL | 44 | 744 |
| 191 | None | | | | | | | | 71 | C-CAL | 14 | 815 |
| 192 | None | | | | | | | | 27 | R-CAL | 32 | 807 |

| Ex. no. | Cold rolling rate (%) | Annealing of cold rolled sheet | | | | | | | | | Remarks |
|---|---|---|---|---|---|---|---|---|---|---|---|
| | | Pattern | Cond. (3) | Cond. (4) | Cond. (5) | Cond. (6) | Cond. (7) | Cond. (8) | Cond. (9) | Cond. (10) | |
| 170 | 34 | C-CAL | 92 | 61 | 347 | 330 | 62 | | | | Inv.ex. |
| 171 | 37 | C-CAL | 130 | 72 | 496 | 244 | 20 | | | | Inv.ex. |
| 172 | 61 | R-CAL | 110 | 42 | 288 | 40 | 63 | 380 | 53 | 73 | Inv.ex. |
| 173 | 78 | C-CAL | 203 | 24 | 279 | 409 | 48 | | | | Inv.ex. |
| 174 | 26 | R-CAL | 23 | 53 | 337 | 53 | 27 | 474 | 150 | 47 | Inv.ex. |
| 175 | 47 | C-CAL | 291 | 48 | 387 | 64 | 7 | | | | Inv.ex. |
| 176 | 60 | R-CAL | 81 | 27 | 153 | 18 | 11 | 447 | 214 | 8 | Inv.ex. |
| 177 | 56 | C-CAL | 54 | 7 | 432 | 134 | 15 | | | | Inv.ex. |
| 178 | 52 | R-CAL | 157 | 64 | 244 | 33 | 6 | 402 | 350 | 12 | Inv.ex. |
| 179 | 75 | R-CAL | 55 | 8 | 105 | 7 | 35 | 354 | 437 | 55 | Inv.ex. |
| 180 | 24 | C-CAL | 21 | 14 | 206 | 187 | 31 | | | | Inv.ex. |
| 181 | 76 | R-CAL | 202 | 39 | 206 | 22 | 20 | 392 | 285 | 22 | Inv.ex. |
| 182 | 61 | C-CAL | 166 | 31 | 316 | 457 | 42 | | | | Inv.ex. |
| 183 | 64 | C-CAL | 241 | 54 | 449 | 93 | 24 | | | | Inv.ex. |
| 184 | 26 | C-CAL | 264 | 41 | 238 | 363 | 36 | | | | Inv.ex. |
| 185 | 79 | R-CAL | 291 | 12 | 187 | 29 | 44 | 430 | 490 | 30 | Inv.ex. |
| 186 | 45 | C-CAL | 67 | 78 | 418 | 491 | 11 | | | | Inv.ex. |
| 187 | 65 | R-CAL | 245 | 78 | 221 | 41 | 75 | 382 | 408 | 39 | Inv.ex. |
| 188 | 28 | R-CAL | 134 | 31 | 139 | 57 | 41 | 409 | 103 | 51 | Inv.ex. |
| 189 | 24 | R-CAL | 97 | 46 | 262 | 47 | 31 | 391 | 242 | 78 | Inv.ex. |
| 190 | 71 | R-CAL | 169 | 24 | 205 | 15 | 58 | 403 | 351 | 64 | Inv.ex. |
| 191 | 71 | C-CAL | 143 | 71 | 343 | 289 | 54 | | | | Inv.ex. |
| 192 | 27 | R-CAL | 134 | 18 | 271 | 11 | 52 | 368 | 87 | 18 | Inv.ex. |

TABLE 5-3

| Ex. no. | Top/bottom layers | | | | | | | Center layer |
|---|---|---|---|---|---|---|---|---|
| | Ratios of structures | | | | | Carbide volume rate | Hardness (HV) | Ratios of structures |
| | Ferrite | Pearlite | Bainite | Martensite | Residual austenite | | | Ferrite |
| 170 | 0.004 | 0.003 | 0.05 | 0.242 | 0.701 | 0.05 | 719 | 0.002 |
| 171 | 0.005 | 0.021 | 0.971 | 0.001 | 0.002 | 0.32 | 410 | 0.12 |
| 172 | 0.164 | 0.001 | 0.049 | 0.004 | 0.782 | 0.02 | 735 | 0.005 |
| 173 | 0.138 | 0.001 | 0.051 | 0.001 | 0.809 | 0.02 | 761 | 0.378 |
| 174 | 0.068 | 0.017 | 0.039 | 0.789 | 0.087 | 0.26 | 402 | 0.064 |
| 175 | 0.004 | 0.017 | 0.919 | 0.005 | 0.055 | 0.26 | 481 | 0.004 |
| 176 | 0.271 | 0.016 | 0.007 | 0.704 | 0.002 | 0.24 | 454 | 0.232 |
| 177 | 0.01 | 0.001 | 0.978 | 0.01 | 0.001 | 0.02 | 482 | 0.057 |
| 178 | 0.179 | 0.004 | 0.05 | 0.688 | 0.079 | 0.06 | 417 | 0.146 |
| 179 | 0.004 | 0.006 | 0.208 | 0.769 | 0.013 | 0.09 | 486 | 0.009 |
| 180 | 0.317 | 0.001 | 0.05 | 0.003 | 0.629 | 0.02 | 595 | 0.316 |
| 181 | 0.003 | 0.002 | 0.006 | 0.683 | 0.306 | 0.03 | 688 | 0.066 |
| 182 | 0.232 | 0.001 | 0.049 | 0.002 | 0.716 | 0.02 | 652 | 0.158 |
| 183 | 0.299 | 0.002 | 0.049 | 0.363 | 0.287 | 0.03 | 599 | 0.271 |
| 184 | 0.311 | 0.018 | 0.529 | 0.014 | 0.128 | 0.27 | 415 | 0.059 |
| 185 | 0.004 | 0.002 | 0.05 | 0.285 | 0.659 | 0.03 | 737 | 0.024 |
| 186 | 0.005 | 0.001 | 0.004 | 0.425 | 0.565 | 0.02 | 753 | 0.009 |
| 187 | 0.001 | 0.002 | 0.008 | 0.327 | 0.662 | 0.03 | 638 | 0.008 |
| 188 | 0.005 | 0.003 | 0.049 | 0.866 | 0.077 | 0.05 | 649 | 0.001 |
| 189 | 0.281 | 0.001 | 0.05 | 0.22 | 0.448 | 0.02 | 629 | 0.358 |
| 190 | 0.007 | 0.002 | 0.049 | 0.78 | 0.162 | 0.03 | 701 | 0.257 |
| 191 | 0.009 | 0.002 | 0.05 | 0.917 | 0.022 | 0.03 | 556 | 0.199 |
| 192 | 0.008 | 0.003 | 0.955 | 0.01 | 0.024 | 0.05 | 567 | 0.003 |

| Ex. no. | Center layer | | | | | | Remarks |
|---|---|---|---|---|---|---|---|
| | Ratios of structures | | | | Carbide volume rate | Hardness (HV) | |
| | Pearlite | Bainite | Martensite | Residual austenite | | | |
| 170 | 0.002 | 0.962 | 0.007 | 0.027 | 0.03 | 571 | Inv.ex. |
| 171 | 0.022 | 0.244 | 0.405 | 0.209 | 0.34 | 351 | Inv.ex. |
| 172 | 0.002 | 0.305 | 0.523 | 0.165 | 0.03 | 653 | Inv.ex. |
| 173 | 0.001 | 0.05 | 0.052 | 0.519 | 0.02 | 536 | Inv.ex. |
| 174 | 0.016 | 0.317 | 0.241 | 0.362 | 0.24 | 351 | Inv.ex. |
| 175 | 0.014 | 0.559 | 0.412 | 0.011 | 0.21 | 358 | Inv.ex. |
| 176 | 0.024 | 0.726 | 0.016 | 0.002 | 0.37 | 359 | Inv.ex. |
| 177 | 0.085 | 0.067 | 0.548 | 0.243 | 1.30 | 360 | Inv.ex. |
| 178 | 0.03 | 0.25 | 0.572 | 0.002 | 0.46 | 361 | Inv.ex. |
| 179 | 0.017 | 0.551 | 0.414 | 0.009 | 0.26 | 355 | Inv.ex. |
| 180 | 0.101 | 0.347 | 0.003 | 0.233 | 1.54 | 500 | Inv.ex. |
| 181 | 0.002 | 0.05 | 0.815 | 0.067 | 0.03 | 610 | Inv.ex. |
| 182 | 0.001 | 0.802 | 0.01 | 0.029 | 0.02 | 445 | Inv.ex. |
| 183 | 0.028 | 0.518 | 0.001 | 0.182 | 0.43 | 500 | Inv.ex. |
| 184 | 0.066 | 0.074 | 0.796 | 0.005 | 1.01 | 352 | Inv.ex. |
| 185 | 0.046 | 0.05 | 0.709 | 0.171 | 0.7 | 562 | Inv.ex. |
| 186 | 0.001 | 0.049 | 0.864 | 0.077 | 0.02 | 648 | Inv.ex. |
| 187 | 0.064 | 0.434 | 0.372 | 0.122 | 0.98 | 587 | Inv.ex. |
| 188 | 0.003 | 0.003 | 0.97 | 0.023 | 0.05 | 561 | Inv.ex. |
| 189 | 0.003 | 0.05 | 0.003 | 0.586 | 0.05 | 544 | Inv.ex. |
| 190 | 0.001 | 0.049 | 0.002 | 0.691 | 0.02 | 649 | Inv.ex. |
| 191 | 0.012 | 0.201 | 0.517 | 0.071 | 0.18 | 359 | Inv.ex. |
| 192 | 0.005 | 0.619 | 0.368 | 0.005 | 0.08 | 354 | Inv.ex. |

TABLE 5-4

| Ex. no. | Difference of constituents | | Difference of hardness (HV) Top/bottom layers-center layer | Tensile strength TS (MPa) | Nanohardness standard deviation Top/bottom layers | Screw dislocation density ($10^{13}$ m/m$^3$) | Bending resistance | Fatigue resistance | Remarks |
|---|---|---|---|---|---|---|---|---|---|
| | C Top/bottom layers-center layer | Mn Top/bottom layers-center layer | | | | | | | |
| 170 | 0.043 | 6.9 | 148 | 1548 | 1.31 | 47.8 | Good | Good | Inv.ex. |
| 171 | 0.239 | 1.05 | 59 | 997 | 0.96 | 63.2 | Good | Good | Inv.ex. |
| 172 | 0.074 | 0.99 | 82 | 1708 | 1.1 | 11.3 | Good | Good | Inv.ex. |
| 173 | 0.155 | 2.75 | 225 | 1503 | 0.27 | 31.4 | Good | Good | Inv.ex. |
| 174 | 0.079 | 1.17 | 51 | 993 | 0.36 | 82.7 | Good | Good | Inv.ex. |

TABLE 5-4-continued

| | Difference of constituents | | Difference of | | | | | | |
|---|---|---|---|---|---|---|---|---|---|
| Ex. no. | C Top/bottom layers-center layer | Mn Top/bottom layers-center layer | hardness (HV) Top/bottom layers-center layer | Tensile strength TS (MPa) | Nanohardness standard deviation Top/ bottom layers | Screw dislocation density ($10^{13}$ m/m³) | Bending resistance | Fatigue resistance | Remarks |
| 175 | 0.274 | 0.39 | 123 | 1043 | 1.39 | 59.8 | Good | Good | Inv.ex. |
| 176 | 0.115 | 0.1 | 95 | 1032 | 1.28 | 17.3 | Good | Good | Inv.ex. |
| 177 | 0.054 | 4.41 | 122 | 1047 | 1.47 | 79.8 | Good | Good | Inv.ex. |
| 178 | 0.073 | 0.48 | 56 | 1019 | 1.3 | 51.8 | Good | Good | Inv.ex. |
| 179 | 0.019 | 1.33 | 131 | 1009 | 0.85 | 36.9 | Good | Good | Inv.ex. |
| 180 | 0.008 | 1 | 95 | 1359 | 1.11 | 52.5 | Good | Good | Inv.ex. |
| 181 | 0.008 | 2.56 | 78 | 1606 | 0.29 | 27.2 | Good | Good | Inv.ex. |
| 182 | 0.12 | 1.78 | 207 | 1283 | 0.35 | 88.2 | Good | Good | Inv.ex. |
| 183 | 0.217 | 2.52 | 99 | 1361 | 1.13 | 5.7 | Good | Good | Inv.ex. |
| 184 | 0.311 | 0.02 | 63 | 1001 | 0.52 | 40.1 | Good | Good | Inv.ex. |
| 185 | 0.127 | 0.5 | 175 | 1540 | 0.55 | 83.4 | Good | Good | Inv.ex. |
| 186 | 0.07 | 3.3 | 105 | 1707 | 1.29 | 63.6 | Good | Good | Inv.ex. |
| 187 | 0.034 | 0.67 | 51 | 1541 | 1.48 | 21.1 | Good | Good | Inv.ex. |
| 188 | 0.075 | 0.51 | 88 | 1497 | 0.51 | 61.8 | Good | Good | Inv.ex. |
| 189 | 0.007 | 3.69 | 85 | 1457 | 1.51 | 80.2 | Good | Good | Inv.ex. |
| 190 | 0.033 | 1.52 | 52 | 1685 | 0.84 | 23.7 | Good | Good | Inv.ex. |
| 191 | 0.127 | 2.05 | 197 | 1079 | 0.72 | 43.6 | Good | Good | Inv.ex. |
| 192 | 0.08 | 1.04 | 213 | 1075 | 1.1 | 69.7 | Good | Good | Inv.ex. |

TABLE 6-1

| | Layer configuration | | Position | Hydrogen | Dew | | | | |
|---|---|---|---|---|---|---|---|---|---|
| Ex. no. | Top/bottom layers | C++nter layer | of hard layer | concentration (%) | point (° C.) | Balance gas | Plating species | Alloying | Remarks (ex.) |
| 193 | AS | M | 2 sides | 14 | −32 | Nitrogen and impurity gas | Zn + Mg | Yes | Inv.ex. |
| 194 | AY | C | 2 sides | 23.7 | −14 | | Al | No | Inv.ex. |
| 195 | AZ | AX | 2 sides | 1.2 | −49 | | Al | Yes | Inv.ex. |
| 196 | AZ | P | 2 sides | 21.6 | −36 | | Al | Yes | Inv.ex. |
| 197 | B | A | 2 sides | 12 | −41 | | Zn + Al + Mg | Yes | Inv.ex. |
| 198 | BA | F | 2 sides | 6.5 | −36 | | Zn + Al | Yes | Inv.ex. |
| 199 | C | A | 2 sides | 5.9 | 10 | | Zn + Al | No | Inv.ex. |
| 200 | D | C | 2 sides | 24.1 | 0 | | Zn + Mg | No | Inv.ex. |
| 201 | F | C | 2 sides | 26.4 | −58 | | Zn + Al | No | Inv.ex. |
| 202 | J | F | 1 side | 13.3 | −13 | | Zn + Al + Mg | No | Inv.ex. |
| 203 | AO | M | 2 sides | 12.8 | 5 | | Zn + Mg | No | Inv.ex. |
| 204 | AQ | AP | 2 sides | 1 | −55 | | Zn + Al + Mg | Yes | Inv.ex. |
| 205 | AQ | D | 2 sides | 15.5 | −16 | | Al | No | Inv.ex. |
| 206 | AR | B | 2 sides | 18.2 | 6 | | Zn + Mg | Yes | Inv.ex. |
| 207 | AT | A | 2 sides | 28.6 | −30 | | Zn | No | Inv.ex. |
| 208 | AV | G | 2 sides | 2.4 | −67 | | Zn + Al + Mg | No | Inv.ex. |
| 209 | AW | AP | 2 sides | 25.9 | −59 | | Zn | Yes | Inv.ex. |
| 210 | L | G | 2 sides | 28.3 | −69 | | Zn | No | Inv.ex. |
| 211 | AP | H | 2 sides | 9.3 | −19 | | Zn | Yes | Inv.ex. |
| 212 | AU | AT | 2 sides | 22.9 | 6 | | Zn + Al + Mg | No | Inv.ex. |
| 213 | AX | AU | 2 sides | 8.9 | −40 | | Al | No | Inv.ex. |
| 214 | H | B | 2 sides | 10.4 | 10 | | Zn | Yes | Inv.ex. |
| 215 | M | F | 2 sides | 25.7 | −8 | | Zn + Al + Mg | Yes | Inv.ex. |

TABLE 6-2

| | Layer configuration | | Position | Carbide volume rate | | Hard layer | Center layer | Difference of hard layer hardness and center |
|---|---|---|---|---|---|---|---|---|
| Ex. no. | Top/bottom layers | Center layer | of hard layer | Top/bottom layers | Center layer | hardness (HV) | hardness (HV) | layer hardness (HV) |
| 193 | AS | M | 2 sides | 0.06 | 0.13 | 725 | 571 | 154 |
| 194 | AY | C | 2 sides | 0.32 | 0.38 | 409 | 351 | 58 |
| 195 | AZ | AX | 2 sides | 0.12 | 0.04 | 733 | 653 | 80 |
| 196 | AZ | P | 2 sides | 0.02 | 0.1 | 754 | 536 | 218 |
| 197 | B | A | 2 sides | 0.33 | 0.3 | 402 | 351 | 51 |
| 198 | BA | F | 2 sides | 0.29 | 0.31 | 476 | 358 | 118 |
| 199 | C | A | 2 sides | 0.24 | 0.43 | 451 | 359 | 92 |

TABLE 6-2-continued

| | | | | | | | | |
|---|---|---|---|---|---|---|---|---|
| 200 | D | C | 2 sides | 0.03 | 1.43 | 484 | 360 | 124 |
| 201 | F | C | 2 sides | 0.13 | 0.53 | 416 | 361 | 55 |
| 202 | J | F | 1 side | 0.15 | 0.35 | 482 | 355 | 127 |
| 203 | AO | M | 2 sides | 0.08 | 1.58 | 598 | 500 | 98 |
| 204 | AQ | AP | 2 sides | 0.04 | 0.09 | 686 | 610 | 76 |
| 205 | AQ | D | 2 sides | 0.03 | 0.04 | 661 | 445 | 216 |
| 206 | AR | B | 2 sides | 0.09 | 0.45 | 598 | 500 | 98 |
| 207 | AT | A | 2 sides | 0.37 | 1.02 | 418 | 352 | 66 |
| 208 | AV | G | 2 sides | 0.13 | 0.67 | 738 | 562 | 176 |
| 209 | AW | AP | 2 sides | 0.11 | 0.06 | 748 | 648 | 100 |
| 210 | L | G | 2 sides | 0.13 | 1.1 | 637 | 587 | 50 |
| 211 | AP | H | 2 sides | 0.06 | 0.05 | 647 | 561 | 86 |
| 212 | AU | AT | 2 sides | 0.1 | 0.07 | 628 | 544 | 84 |
| 213 | AX | AU | 2 sides | 0.09 | 0.09 | 700 | 649 | 51 |
| 214 | H | B | 2 sides | 0.07 | 0.19 | 552 | 359 | 193 |
| 215 | M | F | 2 sides | 0.14 | 0.16 | 575 | 354 | 221 |

| Ex. no. | Tensile strength TS (MPa) | Nanohardness standard deviation Top/bottom layers | Screw dislocation density ($10^{13}$ m/m$^3$) | Bending resistance | Fatigue resistance | Remarks (ex.) |
|---|---|---|---|---|---|---|
| 193 | 1518 | 1.51 | 42.0 | Good | Good | Inv.ex. |
| 194 | 975 | 1.15 | 55.5 | Good | Good | Inv.ex. |
| 195 | 1677 | 1.31 | 9.7 | Good | Good | Inv.ex. |
| 196 | 1466 | 0.30 | 29.2 | Good | Good | Inv.ex. |
| 197 | 966 | 0.40 | 75.4 | Good | Good | Inv.ex. |
| 198 | 1012 | 1.65 | 56.3 | Good | Good | Inv.ex. |
| 199 | 1009 | 1.46 | 14.7 | Good | Good | Inv.ex. |
| 200 | 1025 | 1.64 | 70.2 | Good | Good | Inv.ex. |
| 201 | 983 | 1.48 | 46.4 | Good | Good | Inv.ex. |
| 202 | 979 | 0.94 | 34.4 | Good | Good | Inv.ex. |
| 203 | 1339 | 1.24 | 49.0 | Good | Good | Inv.ex. |
| 204 | 1571 | 0.35 | 24.9 | Good | Good | Inv.ex. |
| 205 | 1249 | 0.40 | 78.0 | Good | Good | Inv.ex. |
| 206 | 1330 | 1.33 | 5.3 | Good | Good | Inv.ex. |
| 207 | 969 | 0.59 | 38.1 | Good | Good | Inv.ex. |
| 208 | 1518 | 0.61 | 72.9 | Good | Good | Inv.ex. |
| 209 | 1686 | 1.50 | 59.2 | Good | Good | Inv.ex. |
| 210 | 1512 | 1.76 | 18.2 | Good | Good | Inv.ex. |
| 211 | 1468 | 0.58 | 57.4 | Good | Good | Inv.ex. |
| 212 | 1429 | 1.68 | 72.0 | Good | Good | Inv.ex. |
| 213 | 1653 | 1.00 | 20.7 | Good | Good | Inv.ex. |
| 214 | 1041 | 0.80 | 40.9 | Good | Good | Inv.ex. |
| 215 | 1039 | 1.29 | 63.2 | Good | Good | Inv.ex. |

INDUSTRIAL APPLICABILITY

The steel sheet of the present invention is excellent in bending resistance and can be suitably used for auto parts and infrastructure members.

The invention claimed is:

1. A multilayer steel sheet comprising: an inner layer; and a hard layer formed on at least one surface of the inner layer, wherein
   a content of C in the hard layer is more than a content of C in the inner layer, and a content of Mn in the hard layer is more than a content of Mn in the inner layer,
   a thickness of the hard layer is 20 μm or more and a total thickness of the hard layer is ⅖ or less of an entire thickness of the steel sheet,
   an average micro-Vickers hardness of the hard layer is 400 HV or more and less than 800 HV,
   an average micro-Vickers hardness of the inner layer is 350 HV or more and is 50 HV or more smaller than the average micro-Vickers hardness of the hard layer, and
   a screw dislocation density of the inner layer is $2.0 \times 10^{13}$ m/m$^3$ or more,
   each of the hard layer and the inner layer comprises, by mass %,
   C: 0.10 to 0.60%,
   Si: 0.01 to 3.00%,
   Mn: 1.000 to 10.00%,
   P: 0.0200% or less,
   S: 0.0200% or less,
   N: 0.0200% or less,
   O: 0.0200% or less,
   Al: 0.500% or less,
   Cr: 2.000% or less,
   Mo: 1.000% or less,
   Ti: 0.500% or less,
   B: 0.0100% or less,
   Nb: 0.500% or less,
   V: 0.500% or less
   Cu: 0.500% or less,
   W: 0.100% or less,
   Ta: 0.100% or less,
   Ni: 0.500% or less,
   Sn: 0.050% or less,
   Sb: 0.050% or less,
   As: 0.050% or less,
   Mg: 0.0500% or less,
   Ca: 0.050% or less,
   Y: 0.050% or less,
   Zr: 0.050% or less,
   La: 0.050% or less,
   Ce: 0.050% or less, and
   a balance of Fe and impurities.

2. The multilayer steel sheet according to claim 1, wherein at least one of the hard layer and the inner layer comprises, by mass %, one or more of Al: 0.001% or more and 0.500% or less,
Cr: 0.001% or more and 2.000% or less,
Mo: 0.001% or more and 1.000% or less,
Ti: 0.001% or more and 0.500% or less,
B: 0.0001% or more and 0.0100% or less,
Nb: 0.001% or more and 0.500% or less,
V: 0.001% or more and 0.500% or less,
Cu: 0.001% or more and 0.500% or less,
W: 0.001% or more and 0.100% or less,
Ta: 0.001% or more and 0.100% or less,
Ni: 0.001% or more and 0.500% or less,
Sn: 0.001% or more and 0.050% or less,
Sb: 0.001% or more and 0.050% or less,
As: 0.001% or more and 0.050% or less,
Mg: 0.0001% or more and 0.0500% or less,
Ca: 0.001% or more and 0.050% or less,
Y: 0.001% or more and 0.050% or less,
Zr: 0.001% or more and 0.050% or less,
La: 0.001% or more and 0.050% or less, and
Ce: 0.001% or more and 0.050% or less.

\* \* \* \* \*